(12) United States Patent
Kojima et al.

(10) Patent No.: US 10,389,393 B2
(45) Date of Patent: Aug. 20, 2019

(54) RECEPTION DEVICE, RECEIVING METHOD, AND PROGRAM

(71) Applicant: Sony Corporation, Tokyo (JP)

(72) Inventors: Tomoya Kojima, Tokyo (JP); Yuichi Hirayama, Tokyo (JP); Shigeru Sawai, Kanagawa (JP); Hirofumi Maruyama, Kanagawa (JP); Takashi Horiguti, Chiba (JP); Bostamam Anas, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/753,980

(22) PCT Filed: Aug. 17, 2016

(86) PCT No.: PCT/JP2016/073960
§ 371 (c)(1),
(2) Date: Feb. 21, 2018

(87) PCT Pub. No.: WO2017/038462
PCT Pub. Date: Mar. 9, 2017

(65) Prior Publication Data
US 2018/0248573 A1 Aug. 30, 2018

(30) Foreign Application Priority Data
Aug. 31, 2015 (JP) ................. 2015-170129

(51) Int. Cl.
*H04B 1/10* (2006.01)
*H04J 11/00* (2006.01)
*H04B 1/16* (2006.01)

(52) U.S. Cl.
CPC ................ *H04B 1/10* (2013.01); *H04B 1/16* (2013.01); *H04J 11/00* (2013.01)

(58) Field of Classification Search
None
See application file for complete search history.

(56) References Cited

U.S. PATENT DOCUMENTS

| 5,594,453 A * | 1/1997 | Rodal .................. G01S 19/235 342/352 |
| 7,010,307 B2 * | 3/2006 | Abraham .............. G01S 19/235 331/158 |

(Continued)

FOREIGN PATENT DOCUMENTS

| JP | 2004-165896 A | 6/2004 |
| JP | 2004-165896 A | 6/2004 |

(Continued)

*Primary Examiner* — Mohammed Rachedine
(74) *Attorney, Agent, or Firm* — Michael Best & Friedrich LLP

(57) ABSTRACT

The present technology relates to a reception device, a receiving method, and a program capable of improving a reception state.
A delay wave by multipath is estimated on the basis of sensor information detected by a sensor unit, a replica of the delay wave is generated by a sum of products of a coefficient for each delay wave and a signal of a reception wave according to delay time on the basis of the estimated delay wave by the multipath, and the generated replica of the delay wave is subtracted from the signal of the reception wave, thereby removing the delay wave from the signal of the reception wave. The present technology may be applied to a receiver which receives a broadcast wave.

17 Claims, 45 Drawing Sheets

(56) References Cited

U.S. PATENT DOCUMENTS

| | | | |
|---|---|---|---|
| 8,175,291 B2* | 5/2012 | Chan | G10L 21/0208 381/94.7 |
| 2007/0057843 A1* | 3/2007 | Chang | H01Q 3/2605 342/368 |
| 2007/0104298 A1 | 5/2007 | Filipovic et al. | |

FOREIGN PATENT DOCUMENTS

| | | | |
|---|---|---|---|
| JP | 2004-235827 A | 8/2004 |
| JP | 2006-322840 A | 11/2006 |
| JP | 2007-336317 A | 12/2007 |
| JP | 2011-141226 A | 7/2011 |

\* cited by examiner

*FIG. 41*

| SNR [dB] REQUIRED WITHOUT ERROR | | | |
|---|---|---|---|
| Cod<br>Mod | 1/2 | 2/3 | 3/4 |
| 16QAM | 7 | 10 | 11 |
| 64QAM | 12 | 15 | 16 |
| SNR OF RECEIVER 32-1: 13dB<br>SNR OF RECEIVER 32-2: 17dB<br>SELECT 64QAM R1/2 WITH WHICH<br>RECEIVERS 32-1 AND 32-2 MAY<br>RECEIVE | | | |

FIG. 43

| MAXIMUM DISTURBANCE WAVE ESTIMATED TIME [usec] | | | |
|---|---|---|---|
| GI<br>FFT | 1/32 | 1/8 | 1/4 |
| 2k | 7 | 28 | 56 |
| 8k | 56 | 112 | 224 |

DISTURBANCE WAVE DELAY OF
RECEIVER 32-11: 100usec
DISTURBANCE WAVE DELAY OF
RECEIVER 32-12: 50usec
SELECT FFT size 8k, GI1/8 WITH WHICH
RECEIVERS 32-11 AND 32-12 MAY
RECEIVE

FIG. 44

| GAIN FOR EACH TRANSMISSION PATH | | |
|---|---|---|
| TRANSMISSION ANTENNA<br>RECEPTION ANTENNA | 31a-1 | 31a-2 |
| 100-1 | LARGE | MEDIUM |
| 100-2 | MEDIUM | SMALL |

SINCE GAIN OF TRANSMISSION
ANTENNA 31a-1 — RECEPTION ANTENNA 100-1
IS LARGE, MAKE POWER OF THIS PATH LARGE
AND MAKE PHASE WITH WHICH INTERFERENCE
IS HARDLY RECEIVED

*FIG. 45*

| CHANNEL ANALYSIS RESULT [RECEPTION IS POSSIBLE or NOT POSSIBLE] | | |
|---|---|---|
| MISO CODE RATE | RECEIVER 32-51 | RECEIVER 32-52 |
| 1/2 | POSSIBLE | POSSIBLE |
| 2/3 | POSSIBLE | POSSIBLE |
| 3/4 | POSSIBLE | NOT POSSIBLE |
| USE MISO CODE RATE 2/3 WITH WHICH BOTH RECEIVERS 32-51 AND 32-52 MAY RECEIVE | | |

RECEPTION DEVICE, RECEIVING METHOD, AND PROGRAM

TECHNICAL FIELD

The present technology relates to a reception device, a receiving method, and a program, and especially relates to a reception device, a receiving method, and a program capable of improving a reception state in the reception device.

BACKGROUND ART

Technologies of improving a reception state of radio waves to be transmitted are widely used.

For example, in a portable phone and the like equipped with a global positioning system (GPS) and the like, a device on a reception side detects a reception state of radio waves transmitted from a base station which is a transmission side device, and when it enters a state in which the radio wave cannot be received or reception sensitivity is deteriorated, reception difficult position information is stored on the basis of the GPS. Then, when the reception state improves, the reception side device transmits the reception difficult position information to the base station. There is suggested the technology of improving the reception status of the portable phone by a method in which the base station receives the reception difficult position information from a plurality of portable phones, thereby specifying an area where it is difficult to receive the radio wave, and the base station is increased, for example, in order to improve the reception status of the specified area by such a configuration (refer to Patent Document 1.

CITATION LIST

Patent Document

Patent Document 1: Japanese Patent Application Laid-Open No. 2004-235827

SUMMARY OF THE INVENTION

Problems to be Solved by the Invention

However, in the case of the technology of Patent Document 1, it is required to physically change a configuration of a transmitting/receiving system to increase the base station such that the reception state in the reception difficult position is improved after the reception difficult position information of the reception side device is collected and the reception difficult position is specified, and it takes trouble and time until the reception state is improved.

The present technology is achieved in view of such a situation, and an object thereof is especially to improve a reception state in a reception device without physically changing a configuration of a transmitting/receiving system.

Solutions to Problems

A receiver according to one aspect of the present technology is a reception device provided with a sensor unit that detects a state inside and outside the device, and a reception unit that receives a transmission wave transmitted from a transmitter as a reception wave, in which the reception unit switches operation on the basis of sensor information detected by the sensor unit.

A storage unit that stores map information may be further included, in which the sensor unit may be allowed to detect a position, orientation, and altitude as the sensor information, and the reception unit may include a waveform estimation unit that estimates a delay wave by multipath on the basis of the reception wave, the map information, and the information of the position, the orientation, and the altitude, a filter that generates a replica of the delay wave by a sum of products of a coefficient for each delay wave and a signal of a reception wave according to delay time on the basis of the delay wave by the multipath estimated by the waveform estimation unit, and a delay wave removal unit that subtracts the replica of the delay wave generated by the filter from the signal of the reception wave.

The waveform estimation unit may be allowed to estimate a transmission path of the multipath on the basis of the reception wave, the map information, and the information of the position, the orientation, and the altitude, and estimate the delay wave corresponding to the transmission path of the estimated multipath.

In a case where it is estimated that the multipath is scarcely present by the waveform estimation unit, the filter may be allowed to stop operation regarding a part of coefficients among the coefficients for respective delay waves.

A gain control unit that adjusts a gain of the received signal to be constant may be further included, in which the sensor unit may be allowed to detect acceleration as the sensor information, and the reception unit may be allowed to calculate a speed on the basis of the acceleration and control a response speed of the gain control unit on the basis of information of the calculated speed.

In a case where the speed is higher than a predetermined value and it is regarded that the reception unit is provided on a moving body, the reception unit may be allowed to make the response speed high to control the gain control unit, and in a case where the speed is lower than a predetermined value and it is regarded that the reception unit is provided on a fixed body, the reception unit may be allowed to make the response speed low to control the gain control unit.

The sensor unit may be allowed to detect temperature as sensor information, and the reception unit further may further include a resample unit that resamples the signal of the reception wave digitalized by a predetermined clock signal by crystal oscillation at a predetermined frequency, and an error detection unit that detects an error between the signal resampled by the resample unit and the predetermined sampling frequency, and the reception unit may be allowed to correct the error of the sampling frequency on the basis of the temperature.

In the signal of the reception wave, a received signal to be received and a non-received signal which is not required to be received are alternately arranged in time series, and the reception unit may be allowed to correct the error of the sampling frequency by adding difference in frequency error in the crystal oscillation corresponding to each of first difference between temperature at a timing at which the received signal immediately preceding is received and reference temperature in the crystal oscillation and second difference between temperature at a timing at which reception of a next received signal starts and the reference temperature to the sampling frequency error at the timing at which the reception of the immediately preceding received signal ends.

A table that stores a frequency error of the crystal corresponding to the difference between the temperature and the reference temperature may be further included.

The reception unit may be allowed to correct the error of the sampling frequency by adding the sampling frequency error corresponding to difference between temperature at a timing at which the received signal is received and reference temperature in the crystal oscillation to the sampling frequency error at the timing at which the received signal is received.

A table that stores the sampling frequency error corresponding to the difference between the temperature and the reference temperature may be further included.

A receiving method according to one aspect of the present technology is a receiving method in which a sensor unit detects a state inside and outside a device, a reception unit includes a step of receiving a transmission wave transmitted from a transmitter as a reception wave, and a process of the step of receiving switches operation on the basis of sensor information detected by the sensor unit.

A program according to one aspect of the present technology is a program that allows a computer to serve as a sensor unit that detects a situation inside and outside a device, and a reception unit that receives a transmission wave transmitted from a transmitter as a reception wave, in which the reception unit switches operation on the basis of sensor information detected by the sensor unit.

In one aspect of the present technology, a status inside and outside of a device is detected by a sensor unit, a transmission wave transmitted by a transmitter is received by a reception unit as a reception wave, and operation of the reception unit is switched on the basis of sensor information detected by the sensor unit.

A reception device according to one aspect of the present technology may be an independent device or may be blocks that serve as the reception devices.

Effects of the Invention

According to one aspect of the present technology, it is possible to improve the reception state in the receiving device without making physical change.

BRIEF DESCRIPTION OF DRAWINGS

FIG. 41 is a view illustrating setting of the demodulation system and the error code rate in the optimization process of FIG. 39.

FIG. 43 is a view illustrating setting of the FIT size and the guard interval in the optimization process of FIG. 39.

FIG. 44 is a view illustrating setting of antennas of the transmitter and the receiver in the optimization process of FIG. 39.

FIG. 45 is a view illustrating setting of a MISO code rate in the optimization process of FIG. 39.

MODE FOR CARRYING OUT THE INVENTION

<Configuration Example of Broadcasting System>

Figure 1:
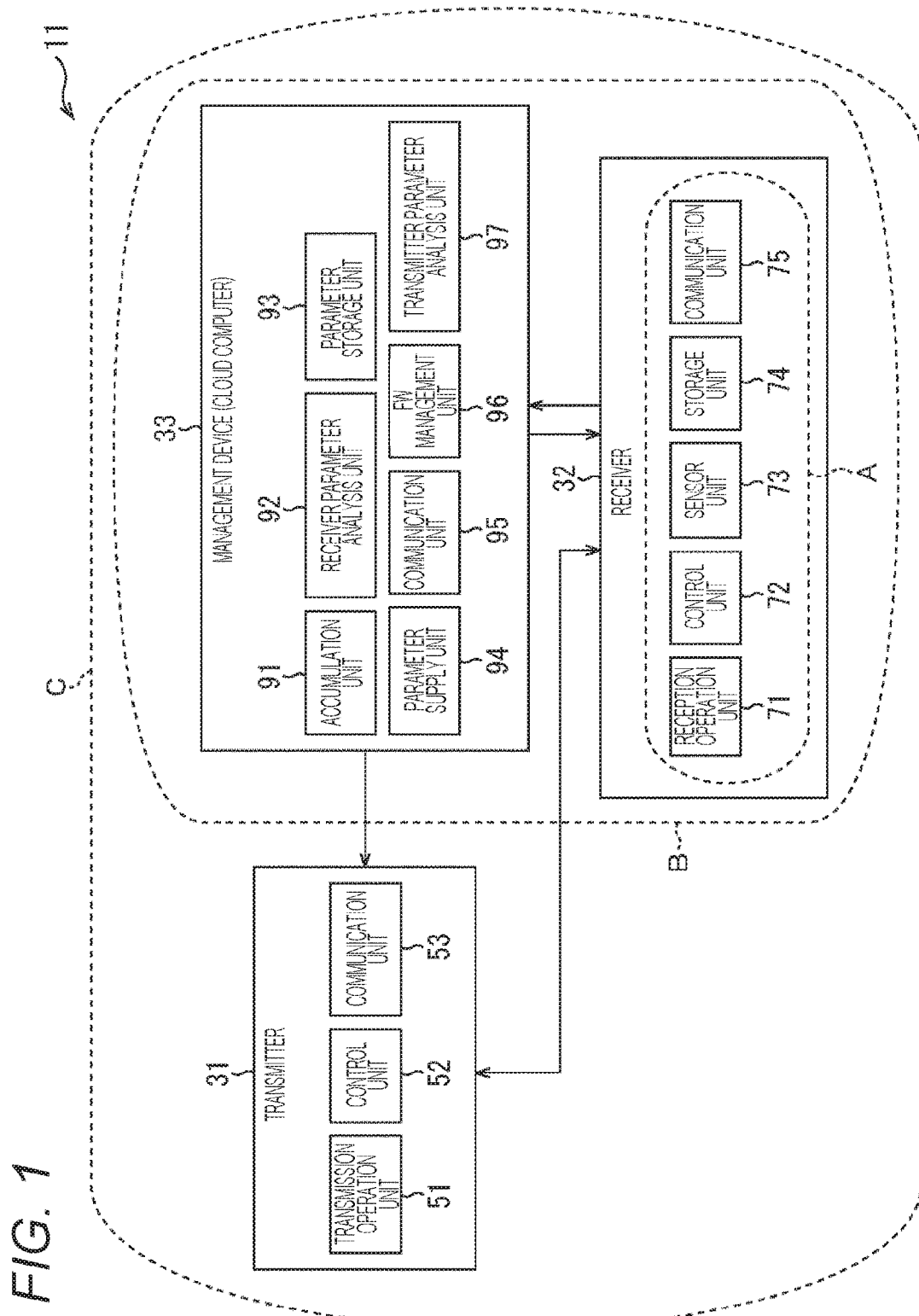
FIG. 1 is a view illustrating a configuration example of a broadcasting system to which the present technology is applied.

FIG. 1 illustrates a configuration example of a broadcasting system to which the present technology is applied. A broadcasting system 11 in FIG. 1 includes a transmitter 31, a receiver 32, and a management device 33.

First, functions of the transmitter 31, the receiver 32, and the management device 33 are described. The transmitter 31 transmits a broadcast signal using a broadcast wave of an OFDM system such as integrated services digital broadcasting-terrestrial (ISDB-T) or digital video broadcasting-terrestrial 2 (DVB-T/T2). Also, the receiver 32 receives the broadcast signal transmitted from the transmitter 31 via the broadcast wave. Meanwhile, although terrestrial OFDM broadcasting of ISDB-T is hereinafter described as an example in this embodiment, a broadcasting format may be other than the same; this may be, for example, terrestrial digital broadcasting (DVB-T/T2) and a system other than the OFDM system, such as, for example, satellite broadcasting (DVB-S/S2).

Furthermore, the receiver 32 provided with a sensor unit 73 which detects various pieces of information such as a position, orientation, temperature, acceleration, traffic information, and weather transmits sensor information being a detection result of the sensor unit 73 to the management device 33 together with receiver information indicating a reception status. At that time, the reception unit 32 sets a parameter required for a process regarding reception on the basis of the receiver information and the sensor information, and improves the reception state by itself.

Also, the management device 33 analyzes the parameter required for the process regarding the reception by the receiver 32 on the basis of the receiver information and the sensor information by the sensor unit 73 transmitted from the receiver 32, obtains an optimum parameter, and transmits the same to the receiver 32. The receiver 32 improves the reception state by executing the process regarding the reception on the basis of the optimized parameter transmitted from the management device 33 in this manner.

Furthermore, on the basis of the receiver information and the sensor information transmitted from the receiver 32, the management device 33 optimizes the parameter required for a process regarding transmission of the transmitter 31, and transmits the same to the transmitter 31.

The transmitter 31 adjusts the process regarding the transmission on the basis of the optimized parameter transmitted from the management device 33, and transmits the broadcast signal by using the broadcast wave. The receiver 32 improves the reception state by receiving a transmitted signal from the transmitter 31 subjected to the transmission process according to the parameter optimized by the management device 33 in this manner.

Summarizing the above-described operations, it becomes possible to improve the reception state of the receiver 32 by three kinds of methods by the operations of the transmitter 31, the receiver 32, and the management device 33.

That is, as illustrated in an area A enclosed by a dotted line, the receiver 32 may control the parameter regarding the operation of a reception operation unit 71 thereof on the basis of the sensor information detected by the sensor unit 73 thereof, thereby improving the reception state.

Also, as illustrated in an area B enclosed by a dotted line, the receiver 32 transmits to the management device 33 on the basis of the sensor information detected by the sensor unit 73 thereof and the receiver information regarding the reception state (signal quality (for example, signal to noise ratio: SNR) and signal intensity of a received signal, and delay time of disturbance wave). Then, the management device 33 generates the optimum parameter required for the operation regarding the reception by the receiver 32 on the basis of the sensor information and the receiver information and transmits the same to the receiver 32. The receiver 32 may improve the reception state by receiving with the optimized parameter regarding the operation of the reception operation unit 71 transmitted from the management device 33.

Furthermore, as illustrated in an area C enclosed by a dotted line, the management device 33 optimizes the parameter required for the process regarding the transmission by the transmitter 31 and the parameter required for the process regarding the reception by the receiver 32 on the basis of the sensor information and the receiver information of the receiver 32, and transmits them to the transmitter 31 and the receiver 32, respectively. The transmitter 31 may improve the reception state in the receiver 32 by controlling the operation of the transmission operation unit according to the optimized parameter transmitted from the management device 33. At the same time, the receiver 32 may improve the reception state in the receiver 32 by controlling the operation of the reception operation unit on the basis of the optimized parameter transmitted from the management device 33.

Next, detailed configurations of the transmitter 31, the receiver 32, and the management device 33 are described. Meanwhile, in FIG. 1, an example in which there is one receiver 32 is illustrated, but it is assumed that there is a plurality of receivers.

The transmitter 31 is provided with a transmission operation unit 51, a control unit 52, and a communication unit 53. The transmission operation unit 51 is controlled by the control unit 52 to actually output the transmitted signal as the broadcast wave from an antenna. The control unit 52 controls an entire operation of the transmitter 31. The communication unit 53 communicates with the management device 33 via the Internet, a public network and the like, and receives, for example, the parameter required in the process regarding the transmission of the transmission operation unit 51. The control unit 52 operates the communication unit 53 in this manner and installs the parameter required in the process regarding the transmission from the management device 33 to the transmission operation unit 51 to control the transmission operation The receiver 32 is provided with a reception operation unit 71, a control unit 72, the sensor unit 73, a storage unit 74, and a communication unit 75. The reception operation unit 71 has a configuration for receiving the broadcast wave and is provided with an antenna 100, a tuner 101, an analogue digital converter (ADC) 102, an orthogonal demodulation unit 103, a calculation unit 121, a waveform estimation unit 122, a tap coefficient update unit 123, an adaptive equalization filter 124, a subtraction unit 125, a fast Fourier transform (FFT) unit 104, an error correction unit 106 and a payload extraction unit 107 as illustrated in FIG. 11 to be described later.

The control unit 72 controls an entire operation of the receiver 32.

Figure 11:
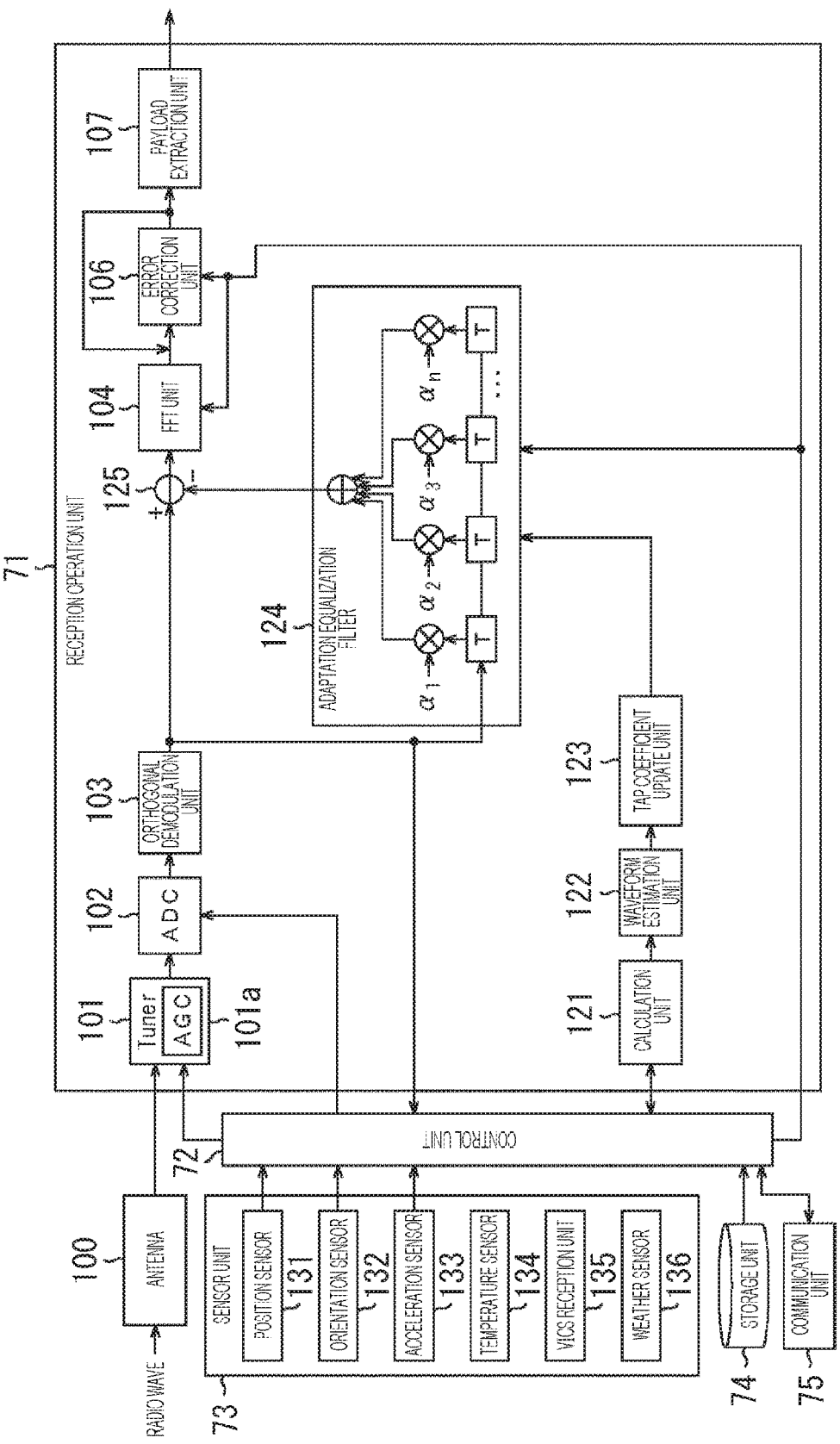
FIG. 11 is a view illustrating a configuration example of a first embodiment of a receiver to which the present technology is applied.

The sensor unit 73 is provided with various sensors; this includes, for example, a global positioning system (GPS) reception unit and the like, and is provided with, for example, a position sensor 131 which detects information of latitude and longitude on earth, an orientation sensor 132 including an electronic compass and the like which measures orientation, an acceleration sensor 133 which measures acceleration, a temperature sensor 134 which measures temperature, a vehicle information and communication system (VICS (registered trademark)) reception unit 135 which receives the traffic information, a weather sensor (atmospheric pressure sensor) 136 which detects the weather on the basis of atmospheric pressure and the like as illustrated in FIG. 11.

The storage unit 74 stores the parameter required for operating the reception operation unit 71 and the information measured by the sensor unit 73.

The communication unit 75 communicates with the management device 33 including a cloud computer using the Internet and the public communication network.

The management device 33 including the cloud computer and the like is provided with an accumulation unit 91, a receiver parameter analysis unit 92, a parameter storage unit 93, a parameter supply unit 94, a communication unit 95, a firmware (FW) management unit 96, and a transmitter parameter analysis unit 97.

The accumulation unit 91 accumulates the sensor information by the sensor unit 73 and the receiver information including the reception status and the like transmitted from the receiver 32 via the communication unit 95 in a time series manner.

The receiver parameter analysis unit 92 analyzes a detection result supplied from the receiver 32 and generates the optimum parameter for an appropriate receiver.

The parameter storage unit 93 stores the parameter regarding the reception operation of the receiver 32 and the parameter regarding the transmission operation of the transmitter 31 in association with the receiver information and the sensor information of each receiver 32.

The parameter supply unit 94 controls the communication unit 95 to supply the optimum parameter regarding the reception operation of the receiver 32 stored in the parameter storage unit 93 to the receiver 32 and supplies the optimum parameter regarding the transmission operation of the transmitter 31 stored in the parameter storage unit 93 to the transmitter 31 on the basis of the receiver information and the sensor information of the receiver 32.

The communication unit 95 communicates with the transmitter 31 and the receiver 32 by using the Internet and the public network to receive the receiver information and the sensor information of the receiver 32, transmit the optimum parameter regarding the reception operation of the receiver 32 to the receiver 32, and transmit the optimum parameter regarding the transmission operation of the transmitter 31 to the transmitter 31.

When firmware (FW) of the transmitter 31 and the receiver 32 capable of improving the reception state is developed by a developer and the like on the basis of the receiver information and the sensor information accumulated in the accumulation unit 91 to be supplied to the FW management unit 96, this controls the communication unit 95 to transmit the same to the transmitter 31 and the receiver 32 for installation The transmitter parameter analysis unit 97 analyzes the optimum parameter regarding the transmission operation of the transmission operation unit 51 of the transmitter 31 on the basis of the receiver information and the sensor information supplied from the receiver 32, and allows the parameter storage unit 93 to store the same.

As a modulation system of terrestrial digital broadcasting such as integrated services digital broadcasting-terrestrial (ISDB-T) or digital video broadcasting-terrestrial 2 (DVB-T/T2) described above, the modulation system referred to as orthogonal frequency division multiplexing (OFDM) system) is used.

In the OFDM system, a large number of orthogonal subcarriers are provided in a transmission band, data is assigned to amplitude and phase of each subcarrier, and digital modulation is performed by phase shift keying (PSK) or quadrature amplitude modulation (QAM).

The OFDM system has a characteristic that, since the entire transmission band is divided by a large number of subcarriers, the band per subcarrier becomes narrower and a transmission speed decreases, but a total transmission speed is the same as that of the conventional modulation scheme. Also, the OFDM system is characterized in that multipath resistance may be improved by providing a guard interval to be described later.

Furthermore, since the data is assigned to a plurality of subcarriers, the OFDM system has a characteristic that a transmission circuit may be formed by using an inverse fast Fourier transform (IFFT) arithmetic circuit which performs inverse Fourier transform at the time of modulation and a reception circuit may be formed by using a fast Fourier transform (FFT) arithmetic circuit which performs Fourier transform at the time of demodulation By the above-described characteristic, the OFDM system is often applied to terrestrial digital broadcasting which is strongly affected by multipath disturbance.

<Regarding Multipath>

Figure 2:
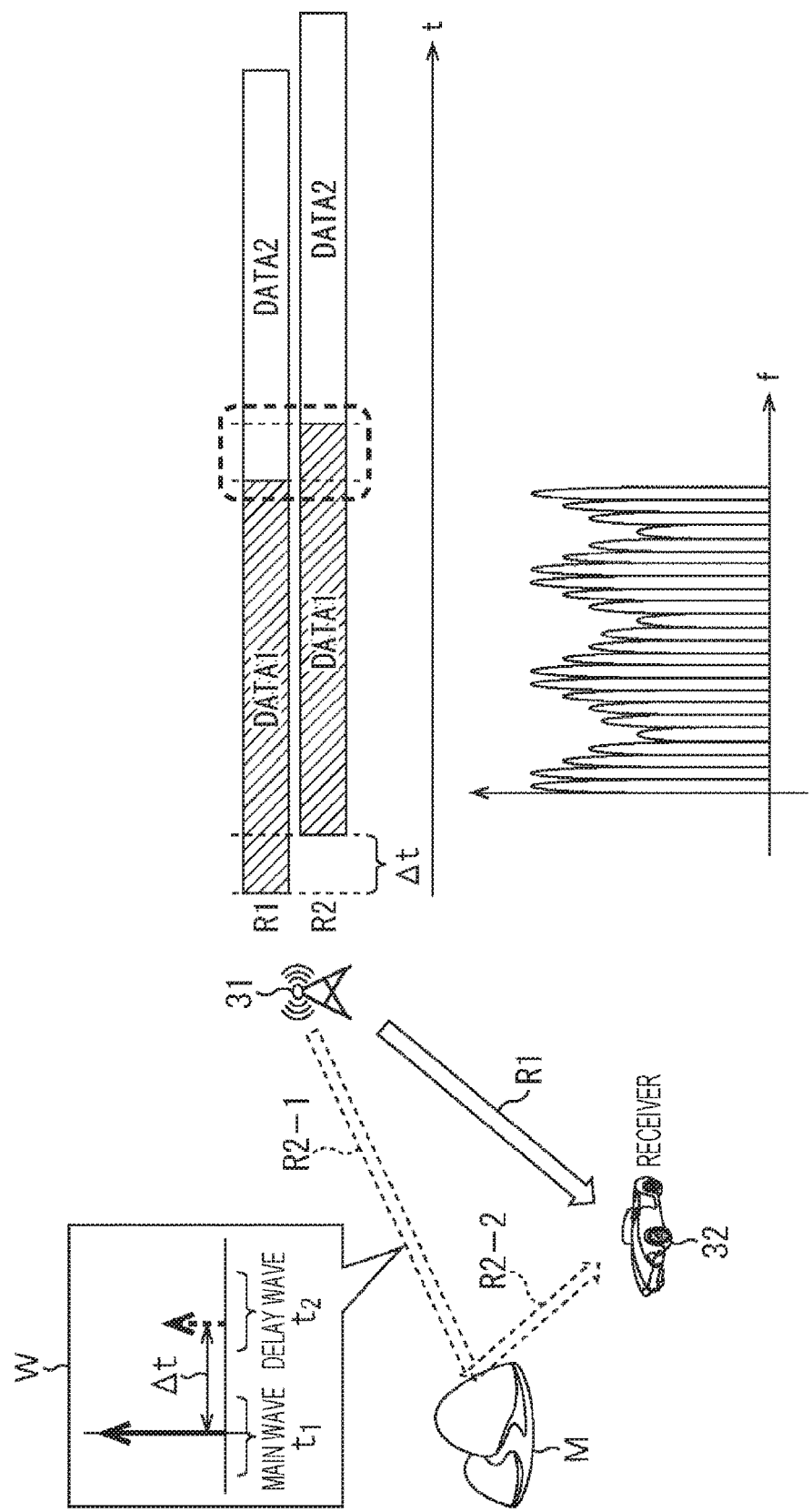
FIG. 2 is a view illustrating multipath.

Herein, multipath is described. For example, in a case where the broadcast signal is transmitted from the transmitter 31 to the receiver 32 by the broadcast wave, a first path R1 to directly transmit indicated by a solid line in a left part of FIG. 2 is conceivable. Furthermore, second paths R2-1 and R2-2 including the path R2-1 directed to a high mountain M and the path R2-2 reflected by the mountain M indicated by a dotted line in the left part of FIG. 2 (hereinafter collectively referred to as paths R2) are conceivable. A phenomenon that radio waves from the same transmitter 31 reach the receiver 32 via a plurality of paths in this manner is referred to as the multipath.

In this multipath, a main wave received by the receiver 32 via the direct path R1 with a short route and a delay wave received via the path R2 with a long route are generated. As a result, the main wave indicated by a solid line is received at time t1, and the delay wave with deteriorated reception sensitivity indicated by a dotted line is received at time t2 delayed by a delay time Δt, for example, as illustrated in an upper left part in the left part of FIG. 2.

The transmitted signal transmitted from the transmitter 31 is transmitted/received in units referred to as OFDM symbols, and as illustrated in an upper right part of FIG. 2, for example, in a case where DATA 1 and DATA 2 which are the OFDM symbols are transmitted in time series to the right in the drawing, the delay wave is received with delay by the delay time Δt with respect to a timing at which the main wave is received.

Then, as illustrated in an area enclosed by a dotted line in the upper right part of FIG. 2, interference occurs between the main wave and the delay wave while delaying by the delay time Δt, and for example, as illustrated in a lower right part of FIG. 2, the waveform is disturbed. This is an effect of the interference caused by the multipath.

<Guard Interval>

Figure 3:
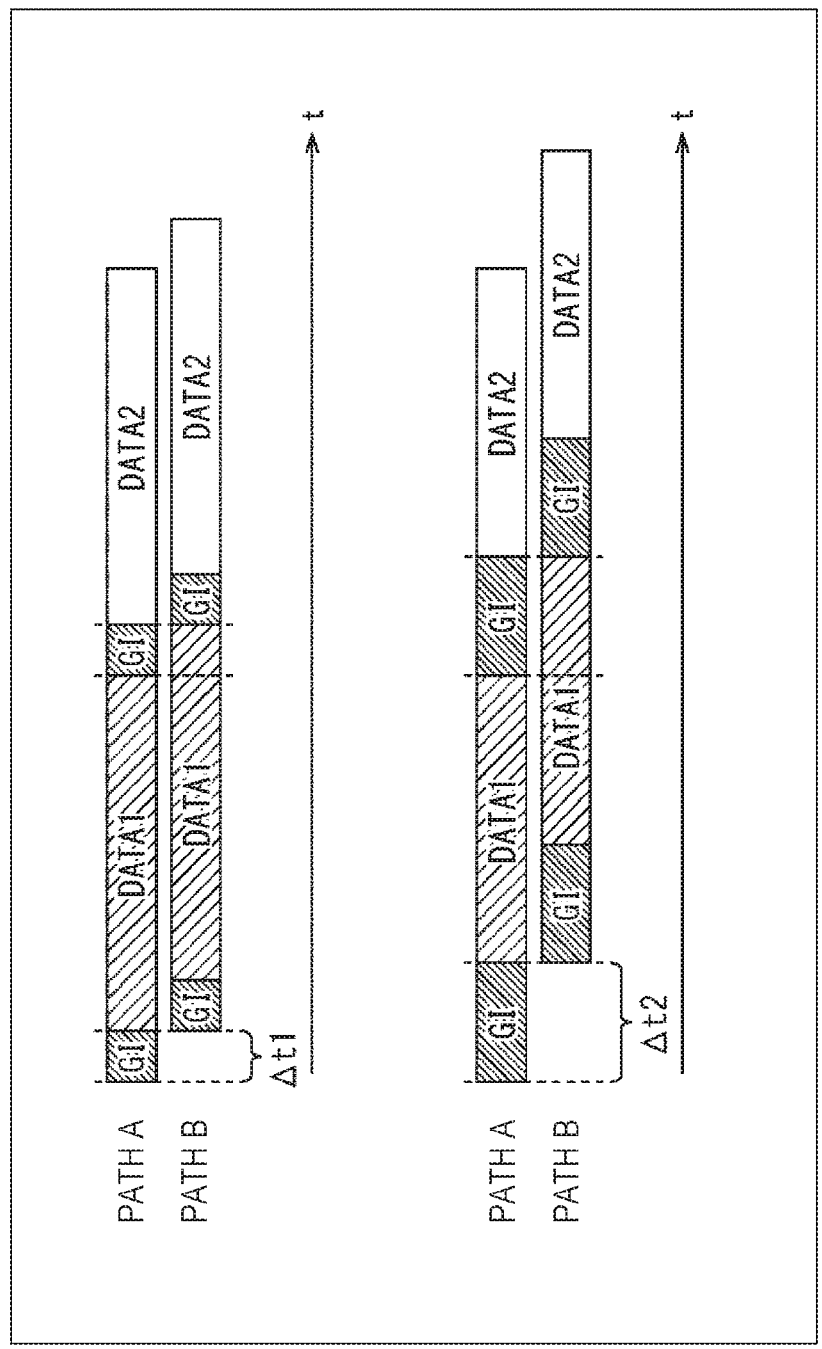
FIG. 3 is a view illustrating a guard interval.

Therefore, as illustrated in FIG. 3, by providing a guard interval ((GI) in which a waveform of a part of a latter half of an effective symbol is copied by a time corresponding to the delay time Δt, the effect by the interference is decreased. In upper and lower parts of FIG. 3, it is illustrated that the effective symbols reaching via the path B are delayed by delay times Δt1 and Δt2, respectively, with respect to the effective symbols reaching via the path A (effective OFDM symbols) in the multipath of the paths A and B, and that the guard intervals GI are provided by the delay times Δt1 and Δt2, respectively, so that the interference is decreased.

In DVB-T2, a ratio of the guard interval GI to the effective symbol may be set to any one of 1/4, 1/8, 1/16, 1/32, 1/64, 1/128, 19/128, and 19/256. However, as illustrated in the lower part of FIG. 3, there is a trade-off relationship that, as the ratio of the guard interval GI to the effective symbol is increased. (Δt2> Δt1), it becomes possible to cope with long delay but data rate decreases.

A plurality of such OFDM symbols is gathered to form one OFDM transmission frame. For example, in the ISDB-T standard, 204 OFDM symbols form one OFDM transmission frame. An insertion position of a pilot signal is determined on the basis of a unit of the OFDM transmission frame.

In the OFDM system using a QAM modulation system as the modulation system for each subcarrier, due to an effect of the multipath and the like at the time of transmission, the amplitude and the phase at the time of transmission and those at the time of reception are different for each subcarrier. Therefore, on a reception side, it is necessary to perform signal equalization so that the amplitude and the phase of the received signal are equal to those transmitted.

<Scattered Pilot Signal>

In the OFDM system, the pilot signals of predetermined amplitude and a predetermined phase are discretely inserted in the transmission symbol on a transmission side, and a frequency characteristic of a transmission path is obtained on the basis of the amplitude and the phase of the pilot signal on the reception side, and the received signal is equalized according to the obtained characteristic of the transmission path.

Figure 4:
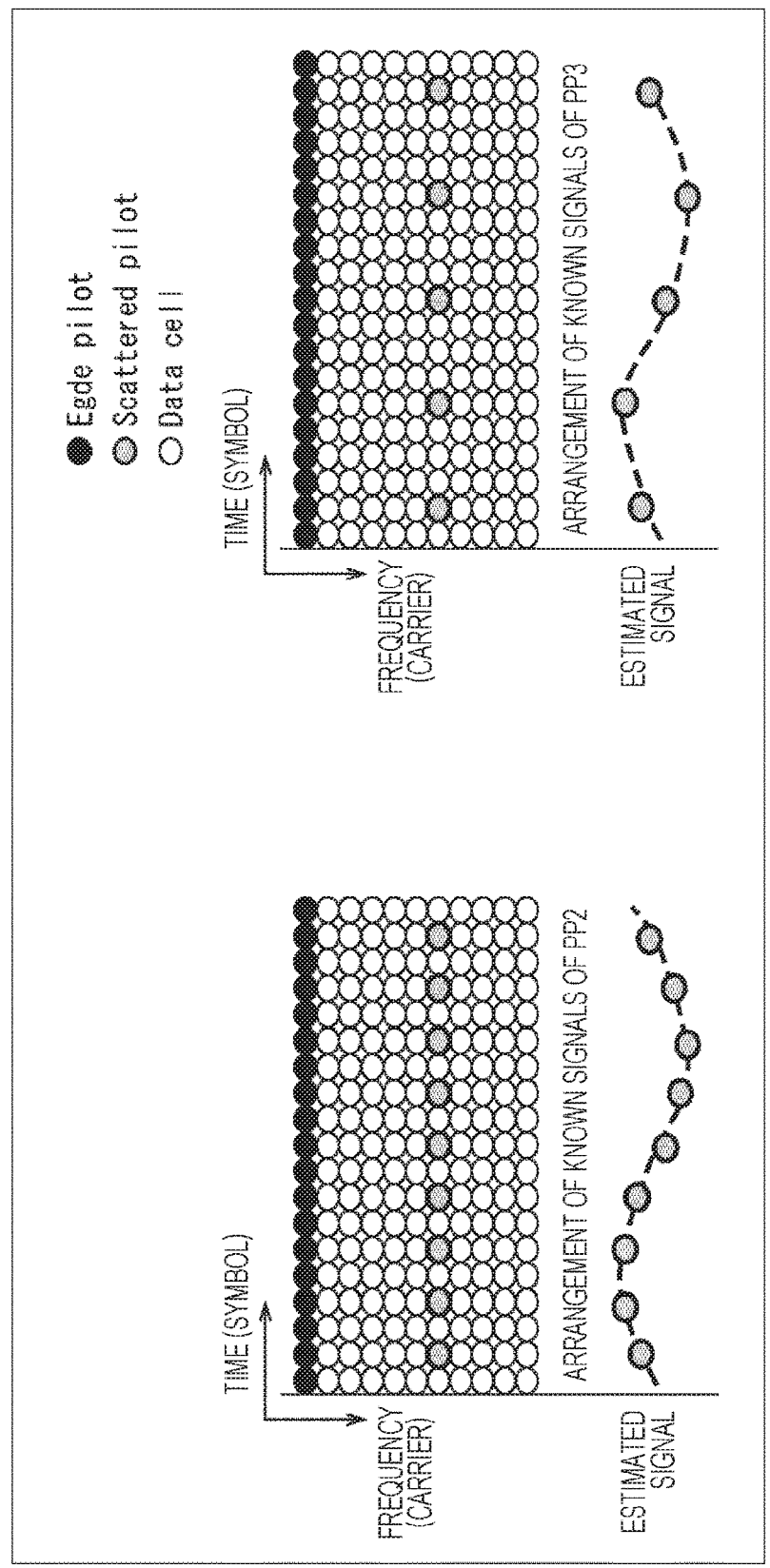
FIG. 4 is a view illustrating a pilot pattern.

The pilot signal used for calculating the transmission path characteristic in this manner is referred to as a scattered pilot signal (hereinafter referred to as SP signal). An estimated signal is obtained by interpolating the SP signals, and the received signal is equalized by the estimated signal. FIG. 4 illustrates an arrangement pattern of the SP signal in the OFDM symbol adopted in the DVB-T2 standard and the ISDB-T standard. In FIG. 4, a horizontal direction is a time (symbol) direction and a vertical direction is a frequency (carrier) direction An insertion pattern (pilot pattern: PP) of this pilot signal may be changed; for example, in DVB-T2, PP1, PP2, PP3, PP4, PP5, PP6, PP7 and PP8 may be set. Herein, "n" in PPn represents an identifier for identifying the pilot patterns with different intervals at which the SP signals are arranged with respect to the symbol (time direction).

Left and right parts of FIG. 4 illustrate examples of PP2 and PP3, respectively. That is, as illustrated in the left part of FIG. 4, if the SP signals are dense, it becomes strong against time variation and strong against long delay, but the data rate decreases. In contrast, as illustrated in the right part of FIG. 4, if the SP signals are sparse, it becomes weak against the time variation and weak against the long delay, but the data rate increases. That is, density of the SP signals is a trade-off relationship between resistance to time variation and data rate.

<Configuration Example of Reception Operation Unit in General Receiver>

Next, a configuration of the general reception operation unit 71 which is an OFDM reception device is described with reference to FIG. 5.

Figure 5:
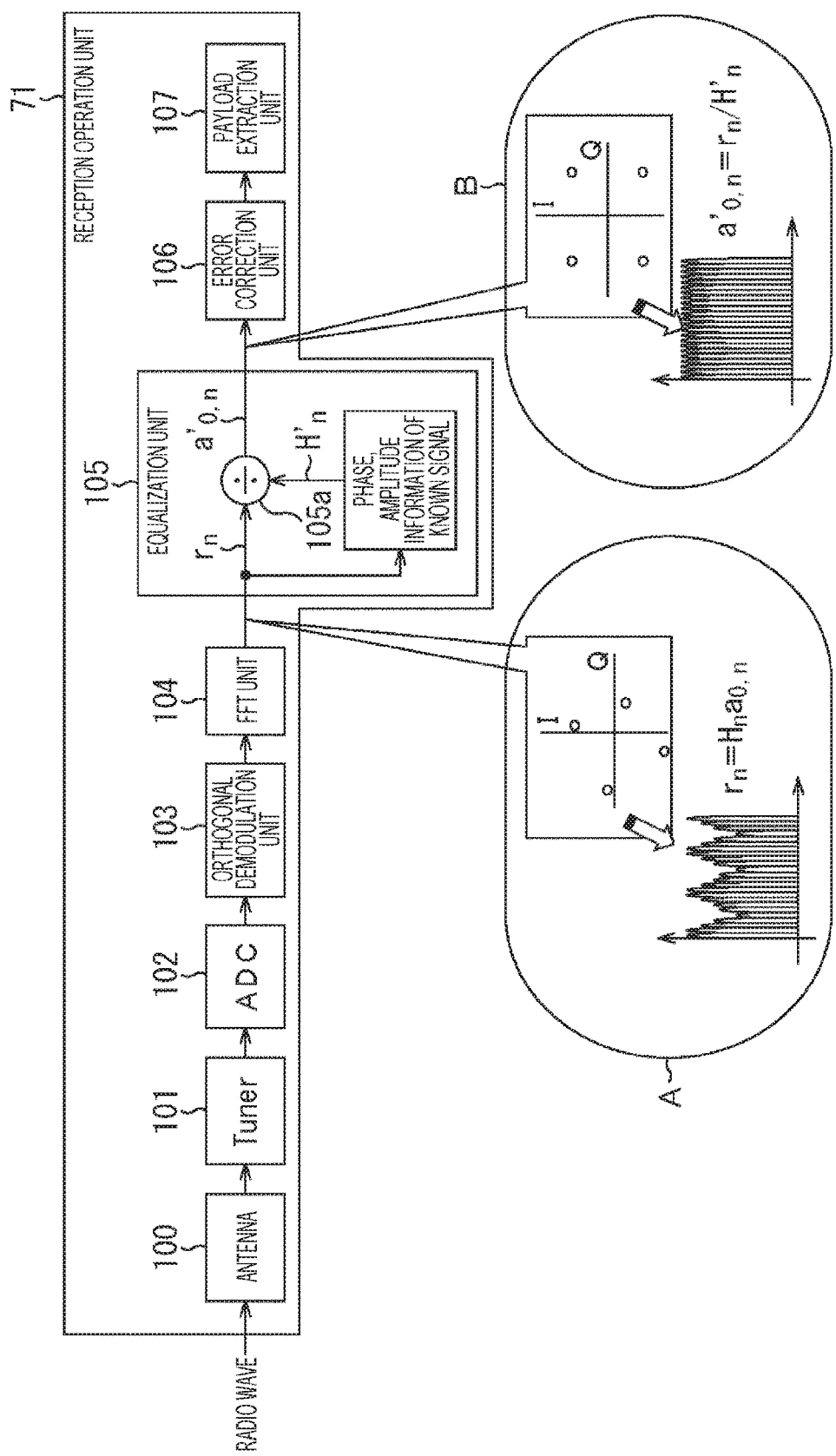
FIG. 5 is a view illustrating a configuration example of a reception operation unit in a general receiver.

As illustrated in FIG. 5, the reception operation unit 71 includes a reception antenna 100, the tuner 101, the analog/digital converter (ADC) 102, the orthogonal demodulation unit 103, the FFT unit 104, an equalization unit 105, the error correction unit 106, and the payload extraction unit 107.

The reception antenna 100 receives the broadcast wave broadcasted from a broadcasting station and outputs an RF signal to the tuner 101.

The tuner 101 provided with a multiplying circuit and a local oscillator frequency-converts the RF signal received by the reception antenna 100 into an IF signal, performs filtering on the IF signal, and outputs a signal obtained by the filtering to the ADC 102.

The ADC 102 performs A/D conversion on the signal supplied from the tuner 101, and outputs a digital IF signal to the orthogonal demodulation unit 103.

The orthogonal demodulation unit 103 performs the orthogonal demodulation using a carrier signal of a predetermined frequency (carrier wave frequency), thereby obtaining a baseband OFDM signal from the IF signal supplied from the ADC 102. This baseband OFDM signal is a so-called time domain signal before FFT arithmetic operation is performed.

Hereinafter, the baseband OFDM signal before the FFT arithmetic operation is performed is referred to as an OFDM time domain signal. As a result of the orthogonal demodulation, the OFDM time domain signal becomes a complex signal including a real axis component (I channel signal) and an imaginary axis component. (Q channel signal). The orthogonal demodulation unit 103 outputs the OFDM time domain signal to the FFT unit 104.

Figure 6:
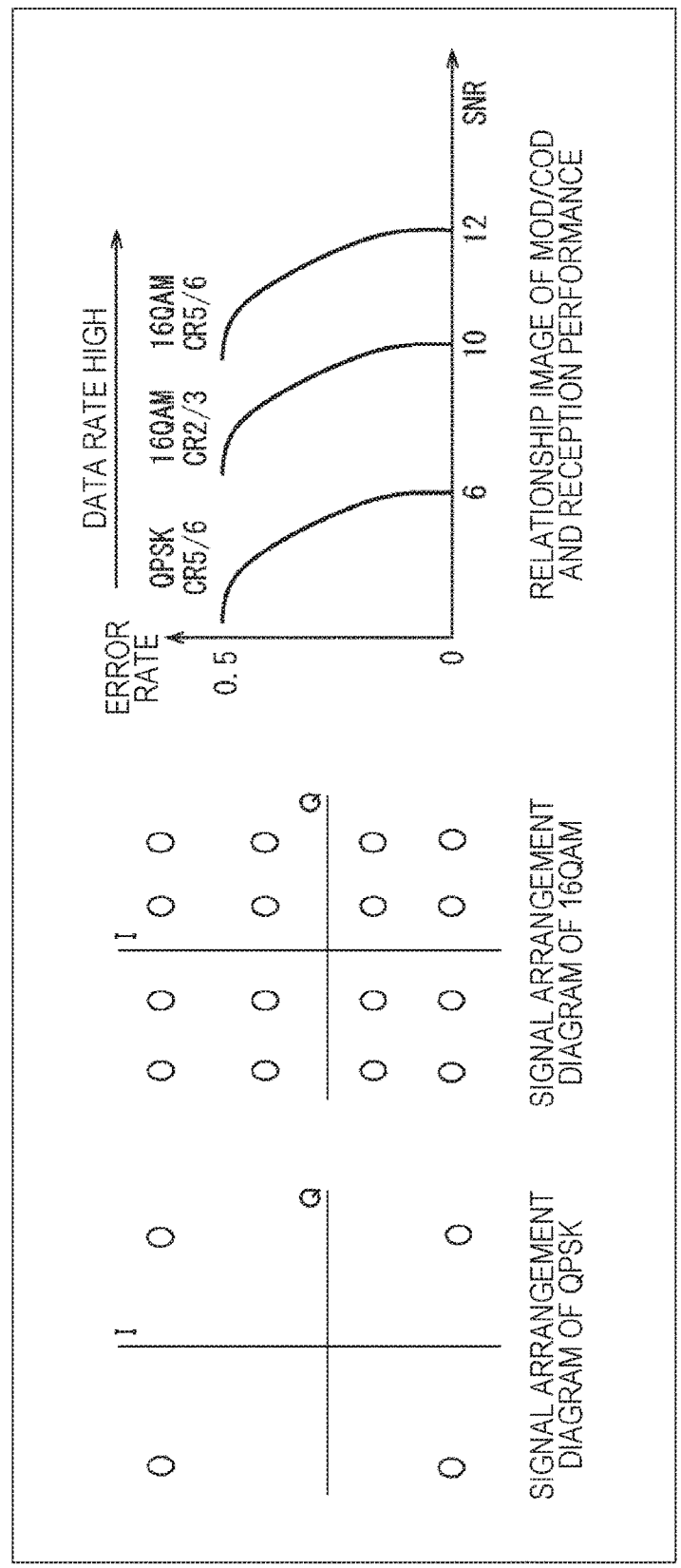
FIG. 6 is a view illustrating a modulation system and a code error rate.

The complex signal obtained by the orthogonal demodulation is different depending on the modulation system (Modulation: type of signal arrangement) and a code rate CR (Code Rate: transmission rate for error correction). For example, in DVB-T2, quadrature phase shift keying (QPSK), 16 quadrature amplitude modulation (16 QAM), 64 QAM, and 256 QAM are prepared as Modulation, and 1/2, 3/5, 2/3, 3/4, 4/5, and 5/6 are prepared as the code rate CR (Code Rate). FIG. 6 is a view illustrating the signal arrangement in QPSK, the signal arrangement in 16 QAM, and a relationship between a signal to nose ratio (SNR) and an error rate for each modulation system from the left.

That is, in QPSK, two-bit information is transmitted by one OFDM symbol, and in 16 QAM, four-bit information is transmitted by one OFDM symbol. That is, in a case of X QAM, as X becomes larger, a transmission data rate increases. However, as illustrated in a right part of FIG. 6, there is a trade-off relationship that as the data rate increases, it is weak against noise.

The FFT unit 104 extracts a signal in a range of an effective symbol length by removing a signal in a range of GI from the signal of one OFDM symbol according to a symbol synchronization signal. The FFT unit 104 performs the FFT arithmetic operation on the extracted OFDM time domain signal, thereby extracting the data orthogonally modulated to each subcarrier.

The FFT unit 104 outputs the OFDM representing the extracted data to the equalization unit 105. The OFDM signal output from the FFT unit 104 is a signal in a so-called frequency domain after the FFT arithmetic operation is performed. Hereinafter, the OFDM signal after the FFT arithmetic operation is performed is referred to as an OFDM frequency domain signal.

The equalization unit 105 calculates the transmission path characteristics of all the subcarriers using the SP signals arranged as illustrated in FIG. 4, and compensates distortion by the transmission path of the OFDM frequency domain signal on the basis of the calculated transmission path characteristics. The equalization unit 105 outputs the signal obtained by compensating the distortion by the transmission path as an equalized signal to the error correction unit 106.

That is, in a case where the transmitted OFDM symbol is represented as $a_{0,n}$ and a frequency response of the transmission path is represented as $H_n$, an OFDM symbol $r_n$ received via the transmission path is represented as $H_n \times a_{0,n}$. The OFDM symbol $r_n$ received via the transmission path has a waveform in which distortion is generated as illustrated in a lower left part of FIG. 5.

The equalization unit 105 provided with a division unit 105a divides the received OFDM symbol $r''$ by a frequency response $H'_n$ of the transmission path estimated from the SP signal to obtain a received symbol $a'_{0,n} = r_n / H'_n$ as the equalized signal to compensate for the waveform.

The error correction unit 106 performs a deinterleaving process on the signal interleaved on the transmission side and further performs processes such as depuncturing, Viterbi decoding, spreading signal removal, and RS decoding. The error correction unit 106 outputs the data obtained by performing various processes to the payload extraction unit 107 as decoded data. Meanwhile, although error correction in a case of IDB-T (same applies to DVB-T) is herein described, for example, in a case of DVB-T2, the error correction unit 106 performs, for example, error correction using low density parity check (LDPC) and Bose Chandhuri Hocquenohem (BCH) codes.

The payload extraction unit 107 extracts payload data on the basis of the decoded data and outputs the same to a subsequent stage.

The OFDM system is characterized in that a demodulation process may be performed without causing intersymbol interference even in a multipath environment in which delay spread falls within the GI by inserting the GI before the effective symbol.

However, in an environment in which long delay multipath might occur such as a single frequency network (SFN), the delay spread might exceed the guard interval GI. In this case, the intersymbol interference and inter-carrier interference occur, and reception performance is significantly deteriorated.

Therefore, in DVB-T2 and the like, it is possible to set a FFT size which is the number of transmission carriers for the guard interval GI. For example, it is possible to set to any one of 1k, 2k, 4k, 8k, 16k, and 32k in DVB-T2 (ETSI EN 302 755 V1.3.1). That is, as illustrated in the upper left part of FIG. 7, in a case where the FFT size is 2k, 2048 may be set as the number of transmission carriers. However, in this case, since an updating cycle is short and the guard interval GI becomes short, there is a risk that the interference wave with long delay cannot be estimated. In contrast, as illustrated in an upper right part of FIG. 7, for example, when the FFT size is set to 8k, the number of transmission carriers may be set to 8192. By setting the FFT size in this manner, the updating cycle becomes longer, and it becomes possible to estimate also the interference wave with long delay.

Figure 7:
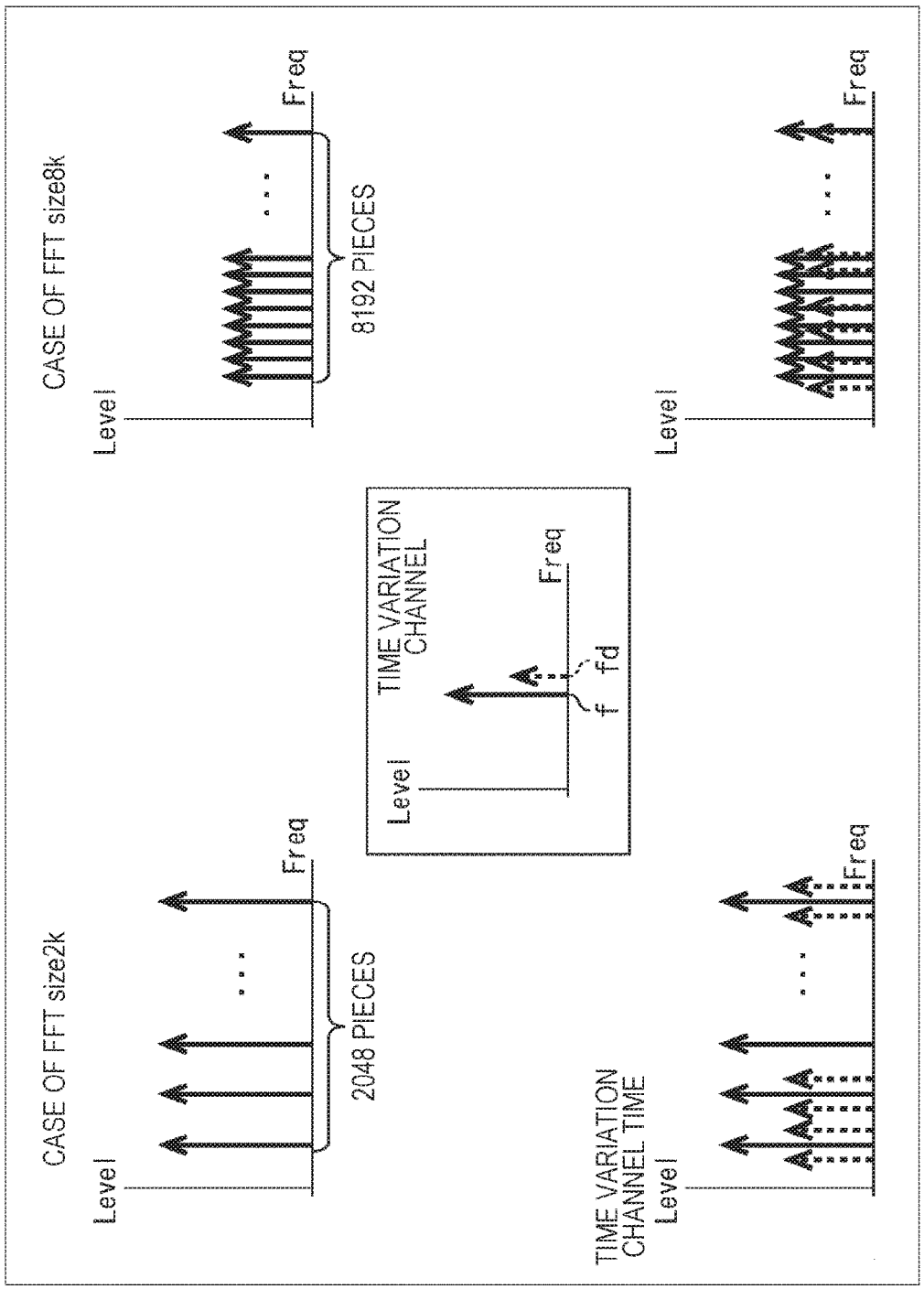
FIG. 7 is a view illustrating an effect by a disturbance wave according to a FFT size.

However, there is a trade-off relationship that if the FFT size is made larger, the interference wave of long time may be estimated, but it is weak against time variation That is, as illustrated in a central part of FIG. 7, it is known that the disturbance wave such as a time-varying channel of frequency fd as indicated by a dotted line arrow is generated with respect to the transmission carrier of a frequency f indicated by a solid line arrow. In a case where the FFT size is 2k as illustrated in a lower left part of FIG. 7, since the frequencies between the transmission carriers are separated, interference with the disturbance waves is unlikely to occur, but in a case where the FFT size is 8k as illustrated in a lower right part of FIG. 7, since the frequencies between the transmission carriers are close, it is easily affected by the disturbance wave, and as a result, it becomes weak against the time variation.

<General Technology by Transmitter and Receiver>

There is a technology of improving transmission efficiency by providing a plurality of antennas in each of the transmitter and the receiver.

Figure 8:
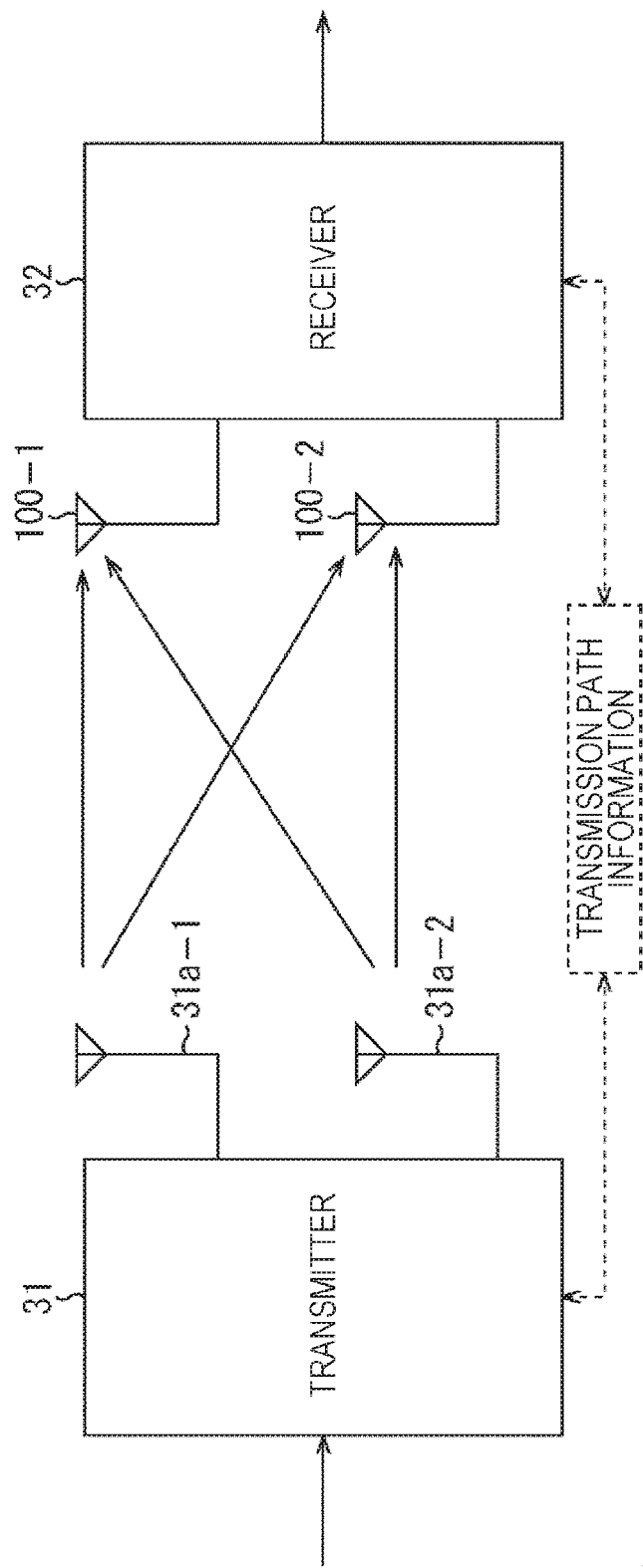
FIG. 8 is a view illustrating a MIMO.

That is, for example, as illustrated in FIG. 8, the transmitter 31 is provided with transmission antennas 31a-1 and 31a-2, and the receiver 32 is provided with reception antennas 100-1 and 100-2. The technology of transmitting and receiving with such a configuration is especially referred to as a multi input multi output (MIMO) technology.

In the case of MIMO, the path from the antenna 31a-1 becomes two paths to the antennas 100-1 and 100-2, and similarly, the path from the antenna 31a-2 also becomes the two paths to the antennas 100-1 and 100-2.

With such a configuration, communication efficiency may be improved. Also, since it is possible to obtain an eigenvector which is a gain value for each transmission path, it is possible to improve the communication efficiency by optimizing power and a phase for each antenna.

A configuration is also proposed in which transmission efficiency is improved by a configuration in which a plurality of antennas is provided in the transmitter, and the receiver receives with one antenna.

Figure 9:
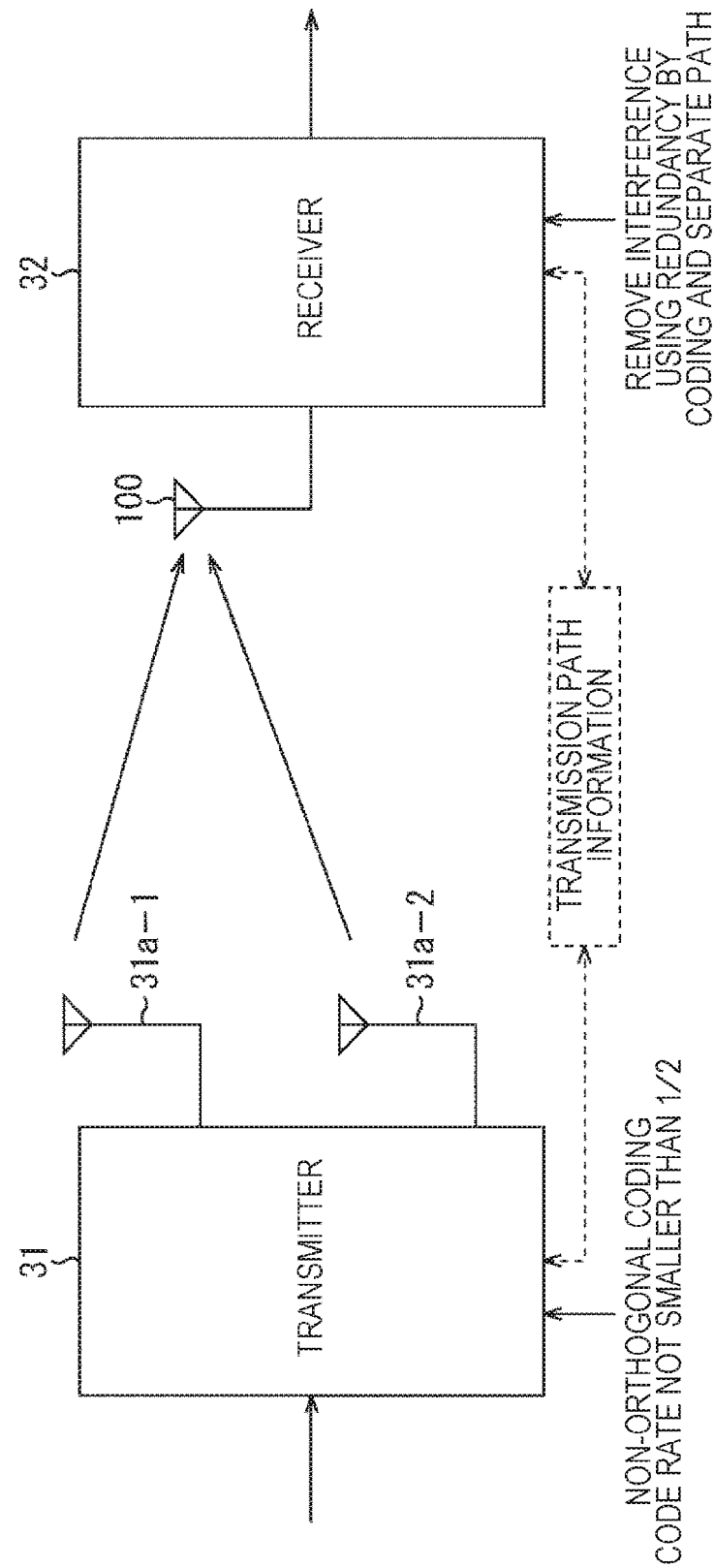
FIG. 9 is a view illustrating an overload MISO.

For example, as illustrated in FIG. 9, this is a configuration in which the antennas 31a-1 and 31a-2 are provided on the transmitter 31, and only the antenna 100 is provided on the receiver 32. The technology of transmitting and receiving with such a configuration is especially referred to as a multi input single output (MISO) technology. Furthermore, in a case of non-orthogonal coding and the code rate of 1/2 or larger, this is especially referred to as an overload MISO technology.

In overload MISO, two paths from the antennas 31a-1 and 31a-2 of the transmitter 31 are formed for the antenna 100 of the receiver 32. Since a signal of the code rate of 1/2 or larger non-orthogonally encoded is transmitted via two paths, mutual interference occurs. However, the receiver 32 may improve the code rate by removing the interference by using redundancy by encoding to obtain a gain of transmission capacity.

<Effect of Doppler Shift>

Figure 10:
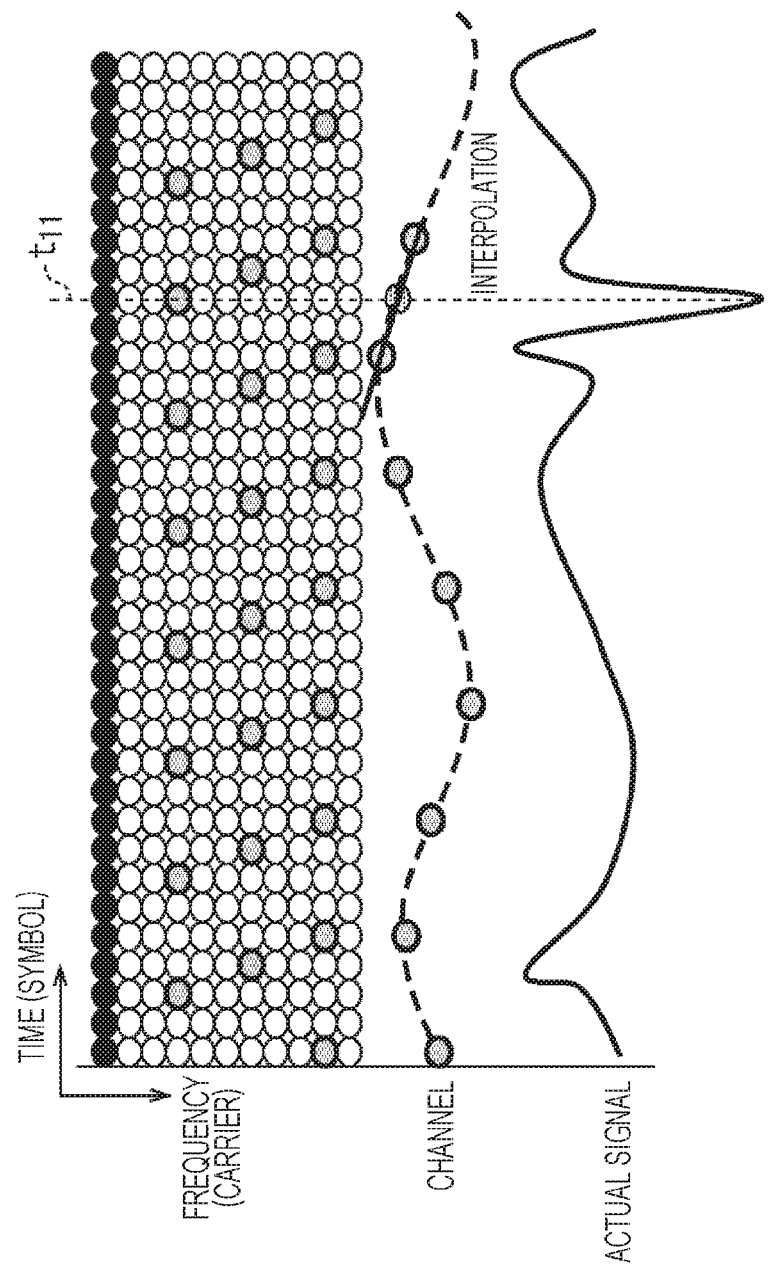
FIG. 10 is a view illustrating an error caused by interpolation using a pilot pattern.

For example, in the case of ISDB-T, as illustrated in FIG. 10, one symbol of known signal (pilot signal) is inserted every four symbols in the time direction, and the symbols therebetween are interpolated symbols interpolated to be generated on the basis of the known signals.

However, in the receiver and the like of a moving body as illustrated at time t11 in FIG. 4, the signal might drastically drop due to, for example, a Doppler shift, and when there is the drastic drop in a section in which there is no known signal in the interpolation in the time direction, there is a case that difference from the interpolation signal becomes large and it is not possible to correct the same correctly.

First Embodiment

<Receiver to Which Present Technology Is Applied>

A configuration example of a first embodiment of a receiver capable of decreasing an effect of a drastic drop in signal due to a Doppler shift in the above-described moving body is next described with reference to FIG. 11.

Meanwhile, regarding a configuration of a reception operation unit 71 in FIG. 11, the configuration having a function similar to that of the configuration in FIG. 5 is assigned with the same reference sign and the same name, and the description thereof is appropriately omitted.

That is, the reception operation unit 71 in FIG. 11 is different from the reception operation unit in FIG. 5 in that this operates on the basis of a detection result supplied from a sensor unit 73, specifically in that a calculation unit 121, a waveform estimation unit 122, a tap coefficient update unit 123, an adaptive equalization filter 124, and a subtractor 125 are provided, and an equalization unit 105 is deleted.

The calculation unit 121 calculates a positional relationship between a transmitter 31 and a receiver 32 on the basis of sensor information supplied from a position sensor 131 and an orientation sensor 132 of the sensor unit 73 and reads information of a position on a map to supply to the waveform estimation unit 122.

The waveform estimation unit 122 estimates a main wave and a delay wave received by a receiver 32 on the basis of a transmitter 31, the receiver 32, and the information on the map, and supplies an estimation result to the tap coefficient update unit 123.

The tap coefficient update unit 123 updates a tap coefficient used in the adaptive equalization filter 124 on the basis of the main wave and the delay wave being the estimation result.

The adaptive equalization filter 124 generates a replica of a multipath component included in an orthogonally demodulated OFDM time domain signal output by an orthogonal demodulation unit 103 to output to the subtraction unit 125 and cancels the multipath component. As illustrated in FIG. 11, for example, the adaptive equalization filter 124 obtains a value obtained by multiplying coefficients α1, α2, . . . , and αn by the OFDM time domain signals sequentially output from a delay circuit indicated by "T" and add them as the replica, and outputs the same to the subtraction unit 125.

Meanwhile, regarding a detailed configuration of the adaptive equalization filter 124, please refer to Japanese Patent Application Laid-Open No. 2009-153096 filed by the present applicant. In addition, although the equalization unit 105 is omitted on the basis of an effect by the adaptive equalization filter 124, it is also possible not to omit the same, With such a configuration, the multipath component included in the OFDM time domain signal may be removed on the basis of the detection result of the sensor unit 73 of the receiver 31, and as a result, the effect of the Doppler shift in the moving body may be decreased.

<Multipath Countermeasure Process in Reception Operation Unit in FIG. 11>

Figure 12:
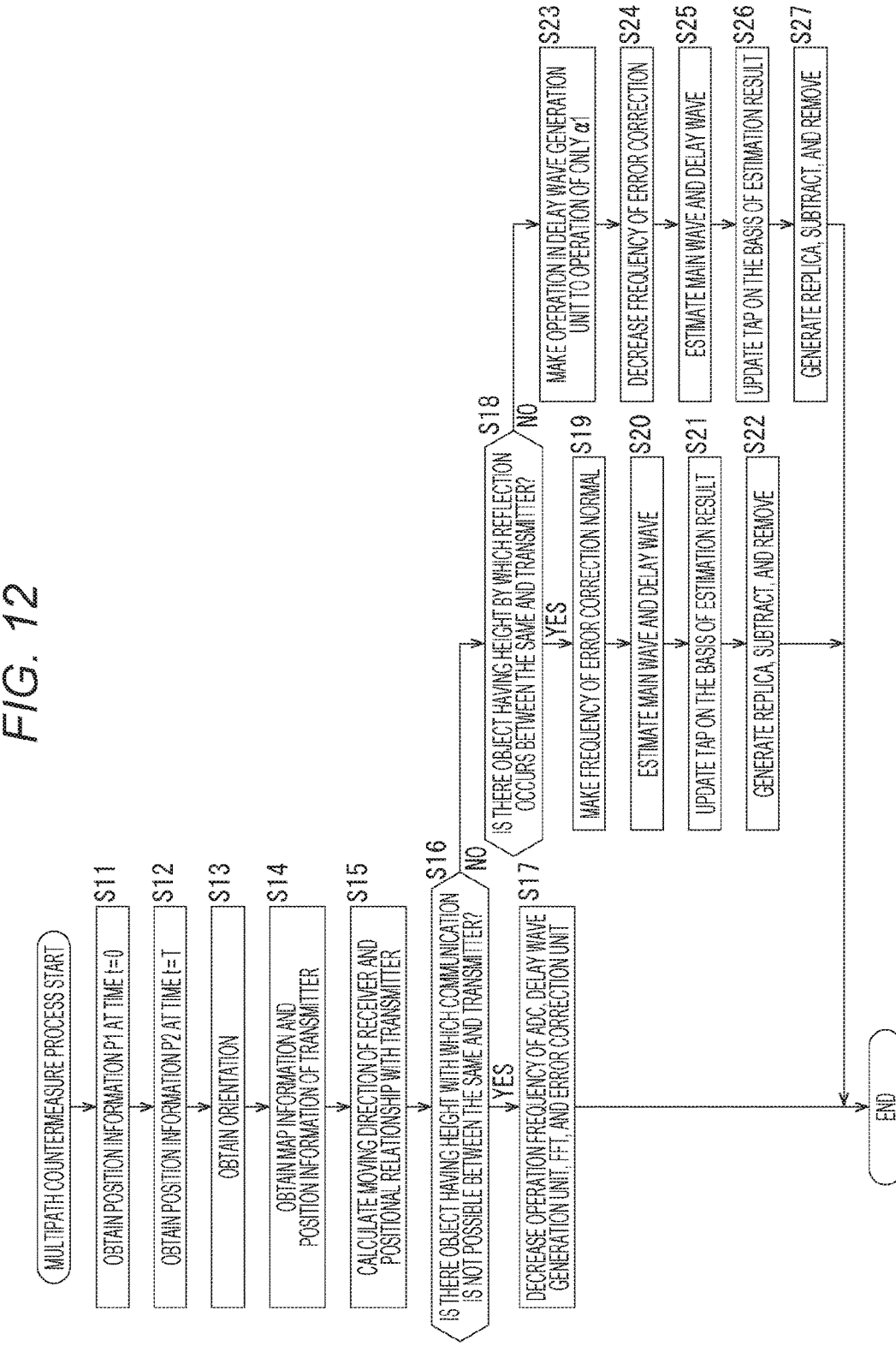
FIG. 12 is a flowchart illustrating a multipath countermeasure process by the receiver of FIG. 1.

Next, with reference to a flowchart in FIG. 12, a multipath countermeasure process by the receiver 32 provided with the reception operation unit 71 in FIG. 11 is described.

At step S11, the position sensor 131 in the sensor unit 73 detects position information in the receiver 32 at a predetermined timing as position information P1 of the receiver 32 at time t=0 and supplies the same to the control unit 72. The control unit 72 outputs the detected position information P1 to the calculation unit 121.

At step S12, the position sensor 131 in the sensor unit 73 detects the position information in the receiver 32 at a timing predetermined time after the timing at step S11 as position information P2 of the receiver 32 at time t=T and supplies the same to the control unit 72. The control unit 72 outputs the detected position information P2 to the calculation unit 121.

At step S13, the orientation sensor 132 in the sensor unit 73 measures orientation in the receiver 32 and supplies a measurement result to the control unit 72. The control unit 72 outputs the detected orientation information to the calculation unit 121.

At step S14, the calculation unit 121 obtains map information, a position of the transmitter 31 (broadcasting station transmission device), and altitude information on the map stored is the storage unit 74.

At step S15, the calculation unit 121 calculates the positional relationship between the receiver 32 and the transmitter 31 on the basis of the map information, the position of the transmitter 31 (broadcasting station transmission device), and the altitude information on the map stored in the storage unit 74, and outputs the same to the control unit 72 and the waveform estimation unit 122.

At step S16, the control unit 72 determines whether there is an object having a height such that communication is disabled between the receiver 32 and the transmitter 31.

Figure 13:
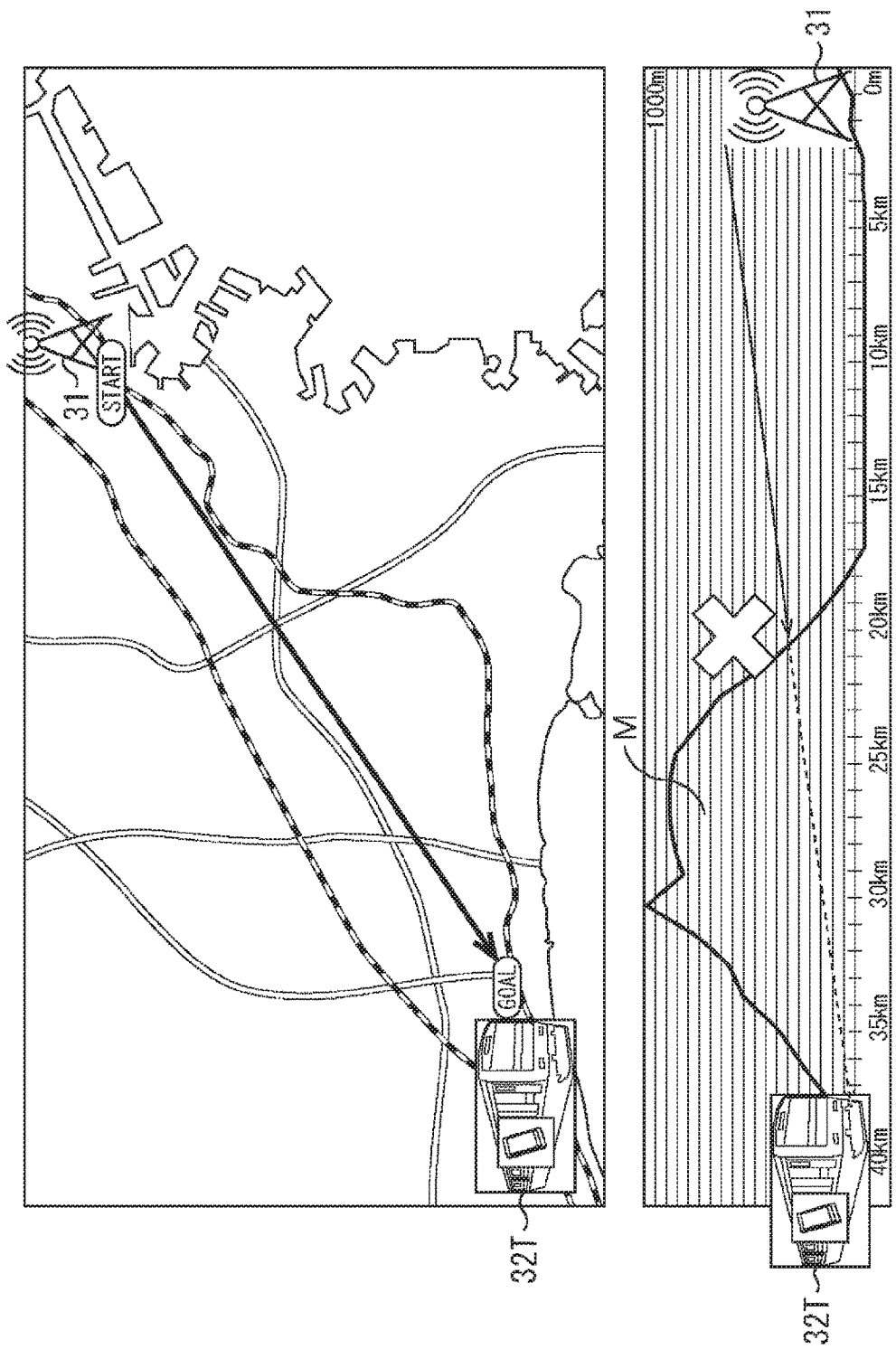
FIG. 13 is a view illustrating difference in altitude between the receiver and a transmitter.

That is, for example, in a case where a mountain M as a shielding object is present between a receiver 32T and the transmitter 31 as illustrated in FIG. 13, it is considered that there is the object having the height such that the communication is disabled. Meanwhile, in an upper part of FIG. 13, the positional relationship between the transmitter 31 and the receiver 32T on the map is illustrated, and in a lower part of FIG. 13, a horizontal cross-section on a straight line between the transmitter 31 and the receiver 32T in the upper part is illustrated. Also, as illustrated in the lower part of FIG. 13, it is illustrated that there is the high mountain M shielding the broadcast wave between the transmitter 31 and the receiver 32. Furthermore, "T" attached to the receiver 32T indicates that the receiver 32 moves by a train car and the like.

At step S16, in a case of FIG. 13, it is regarded that there is the object having the height such that the communication is disabled, and the procedure shifts to step S17.

At step S17, the control unit 72 stops operations of the adaptive equalization filter 124, an error correction unit 106, an ADC 102, and a FFT unit 104, and suppresses power consumption That is, in a state where the communication is difficult, the communication is difficult even if the adaptive equalization filter 124, the error correction unit 106, the ADC 102, and the FFT unit 104 are operated, so that by stopping the operations, the power consumption is decreased.

Figure 14:
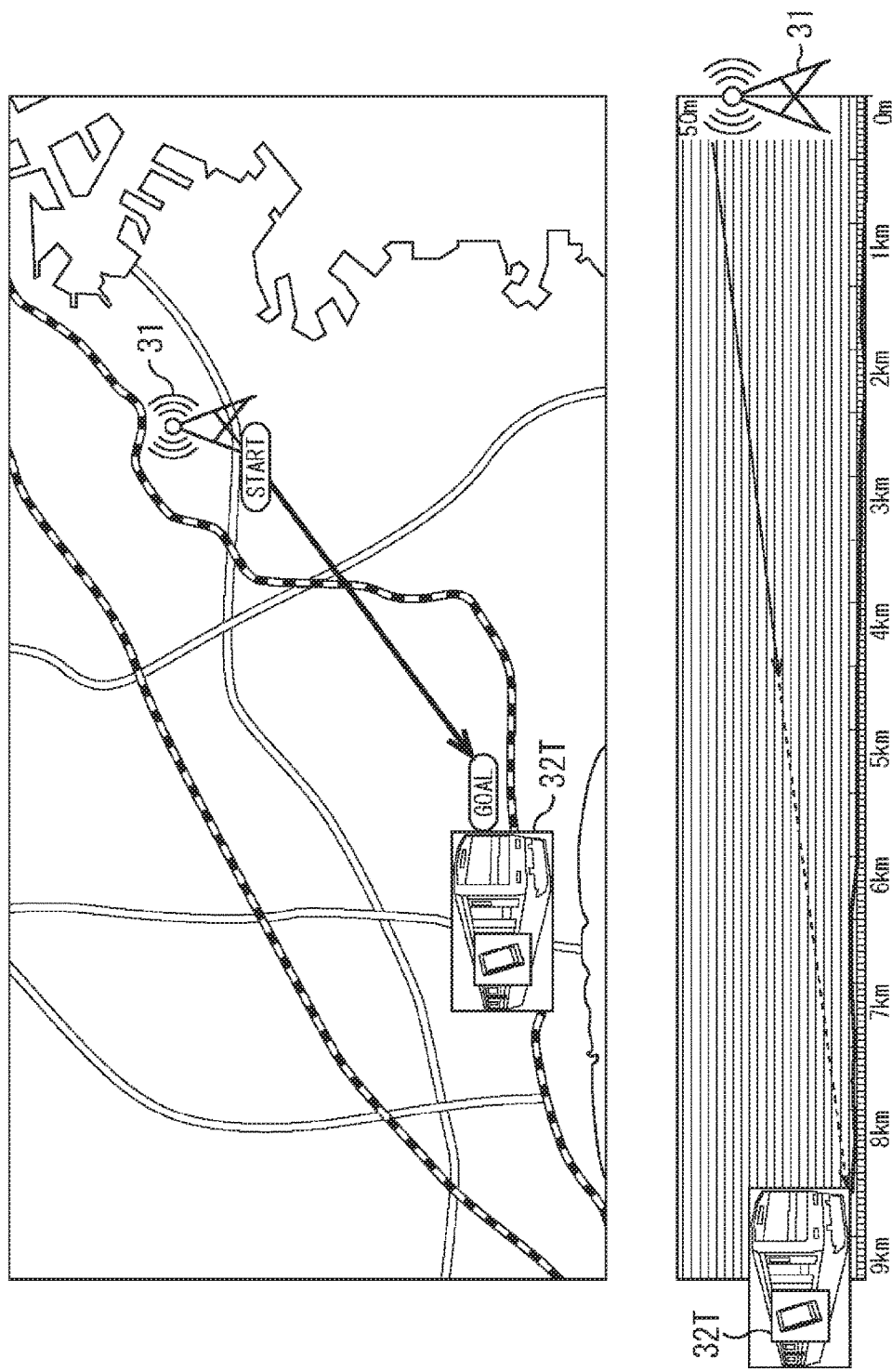
FIG. 14 is a view illustrating the difference in altitude between the receiver and the transmitter.

On the other hand, in a case where it is determined at step S16 that there is no object having the height with which the communication is disabled between the transmitter 31 and the receiver 32T, for example, as illustrated in FIG. 14, the procedure shifts to step S18. Meanwhile, in an upper part of FIG. 14, the positions on the map of the transmitter 31 and the receiver 32T are illustrated, and in a lower part of FIG. 14, a cross-section on a straight line connecting the transmitter 31 and the receiver 32T is illustrated, and it is illustrated that there is no object having a height with which the communication is difficult.

At step S18, the control unit 72 determines whether there is an object having a height that generates a reflection wave on a route between the receiver 32 and the transmitter 31 and around the route.

At step S18, for example, in a case where it is determined that there is no object having the height that generates the reflection wave on the route between the receiver 32 and the transmitter 31 and around the route, the procedure shifts to step S23.

At step S23, the control unit 72 regards that there is no object having the height to generate the reflection wave on the route between the receiver 32 and the transmitter 31 and around the same, determines that the delay wave is not generated, and the like and there is no effect of the delay wave, and minimizes the number of tap coefficients used in the adaptive equalization filter 124 to decrease the power consumption by the adaptive equalization filter 124.

At step S24, the control unit 72 decreases the number of repetitive corrections by the error correction unit 106.

Figure 15:
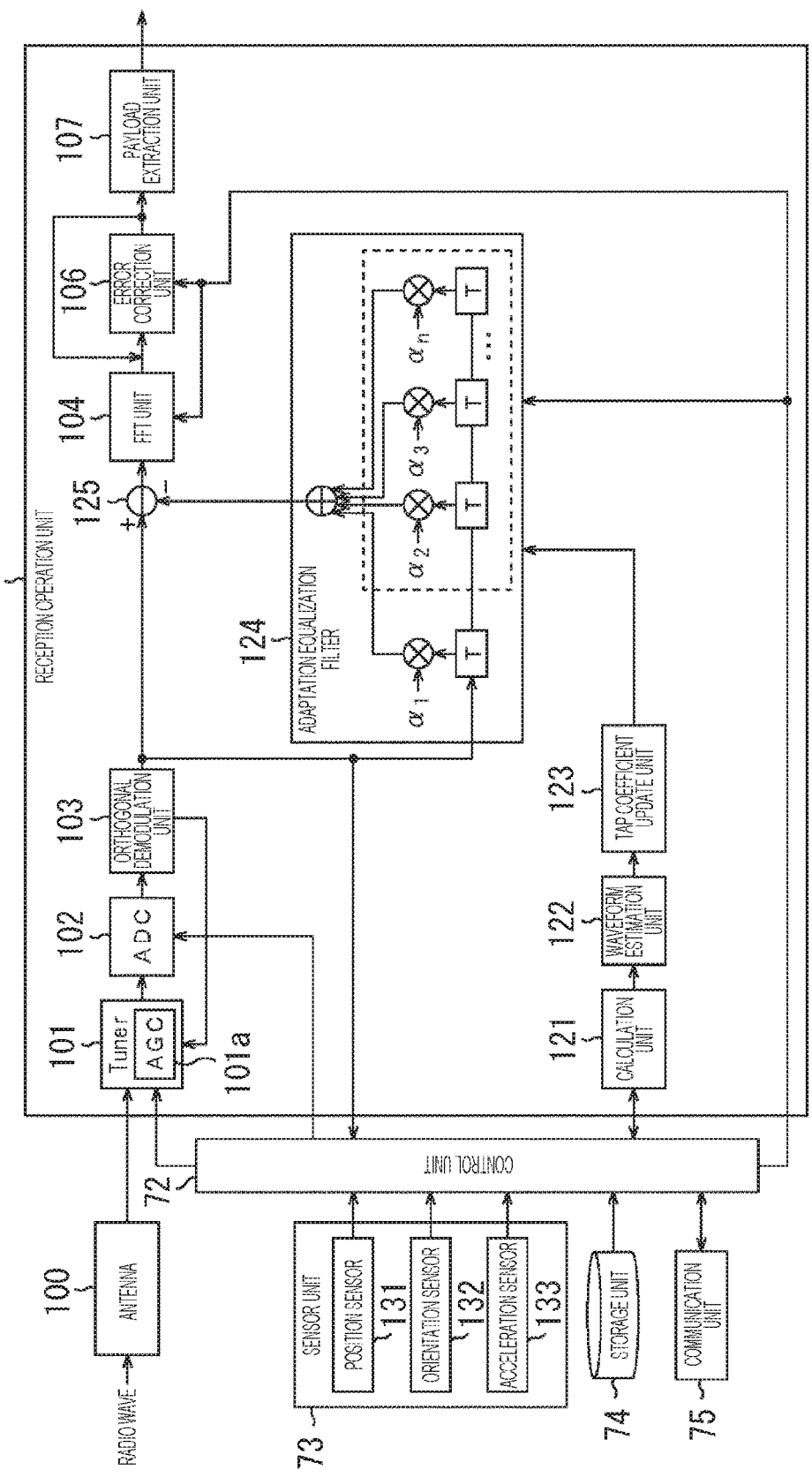
FIG. 15 is a view illustrating operation of stopping a configuration regarding a part of coefficients of an adaptive equalization filter.

That is, as illustrated in FIG. 15, the control unit 72 decreases the power consumption by stopping the operation of a circuit regarding a process after the coefficient α2 in the adaptive equalization filter 124 enclosed by a dotted line, for example. Also, in a case of a DVB-T2 system (LDPC), the control unit 72 may decrease the power consumption by decreasing the number of repetitive corrections in the error correction unit 106.

At steps S25 to S27, the main wave and the delay wave are estimated, and the coefficient in the adaptive equalization filter 124 is updated on the basis of the information of the estimated main wave and delay wave. That is, in a case where it is regarded that there is no object having the height which generates the reflection wave on the route between the receiver 32 and the transmitter 31 and around the same, the broadcast wave from the transmitter 31 is easy to receive, so that the power consumption is decreased by simplifying the processes in the adaptive equalization filter 124 and the error correction unit 106.

Meanwhile, since the processes at steps S25 to S27 are similar to the processes at steps S20 to S22, the description thereof is to be described later.

Figure 16:
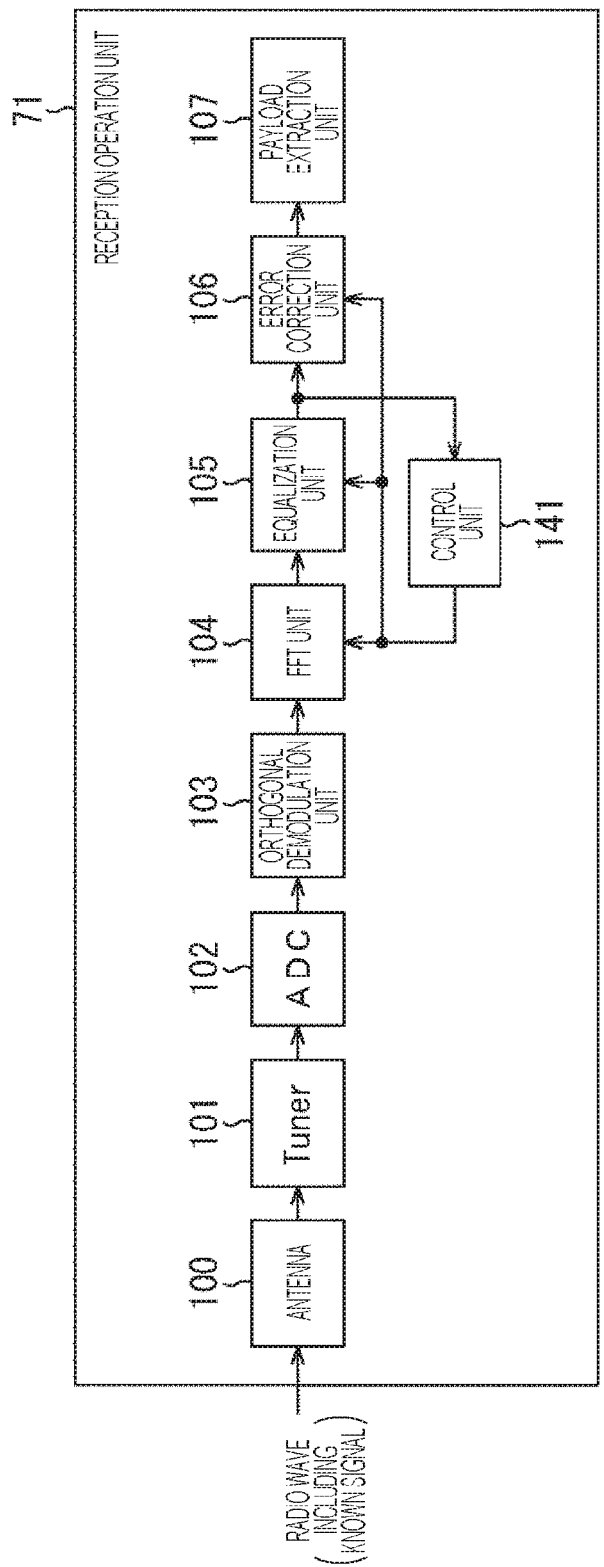
FIG. 16 is a view illustrating low power consumption operation in a reception operation unit of a conventional receiver.

That is, in the conventional technology, for example, on the basis of a carrier to noise ratio (CNR) of the OFDM frequency domain signal output from the equalization unit 105, when the CNR decreases, the operations of the FFT unit 104 and the equalization unit 105 are stopped by the control unit 141 in the reception operation unit 71 as illustrated in FIG. 16. Alternatively, the control unit 141 controls the number of repetitions for improving error correction ability on the basis of a bit error rate (BER) of the error correction code including, for example, a low density parity check (LDPC) output from the error correction unit 106.

In a case where the power consumption is decreased as in the reception operation unit 71 in FIG. 16, when the signal varies drastically, it is sometimes impossible to appropriately stop the operation at an expected timing to stop, and the power consumption cannot be appropriately decreased.

However, in the reception operation unit 71 in FIG. 11 described above, the operation of a required part is stopped from the route of the broadcast wave on the basis of the position information, the map information, and the altitude information, so that the power consumption may be appropriately decreased.

At step S18, for example, in a case where it is determined that there is the object having the height with which the reflection wave is generated on the route between the receiver 32 and the transmitter 31 and around the same, the procedure shifts to step S19.

Figure 17:
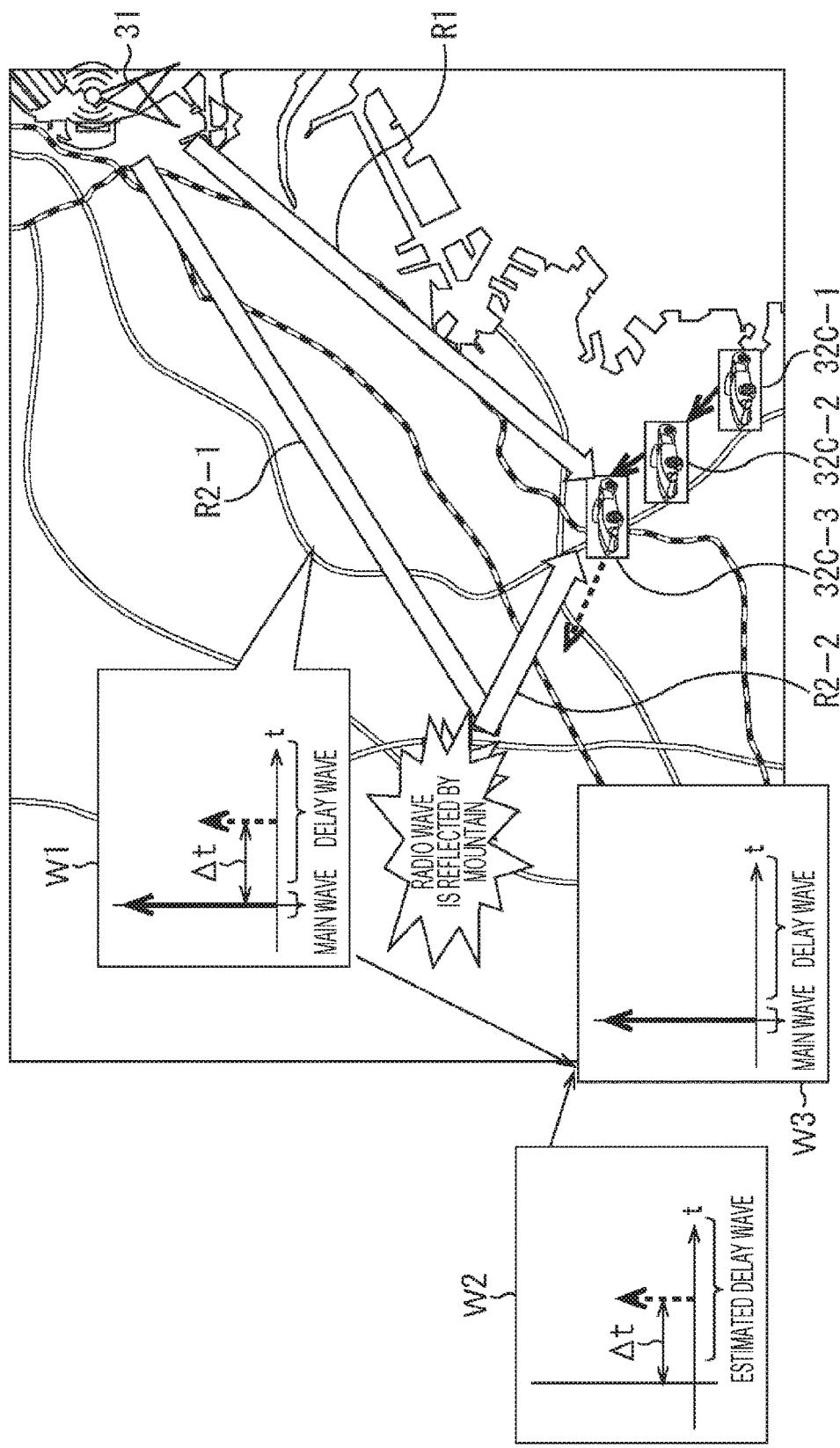
FIG. 17 is a view illustrating a method of removing a delay wave from a relationship between a main wave and the delay wave in multipath.

That is, for example, as illustrated in FIG. 17, in a case where the receiver 32 moves in an upper left direction in the drawing as indicated by receivers 32C-1 to 32C-3 in time series, in a case where there is an object such as the mountain M in a traveling direction, it is regarded that there is a high object causing reflection Meanwhile, "C" in the receiver 32C is intended to mean that the receiver 32 moves by an automobile.

Figure 18:
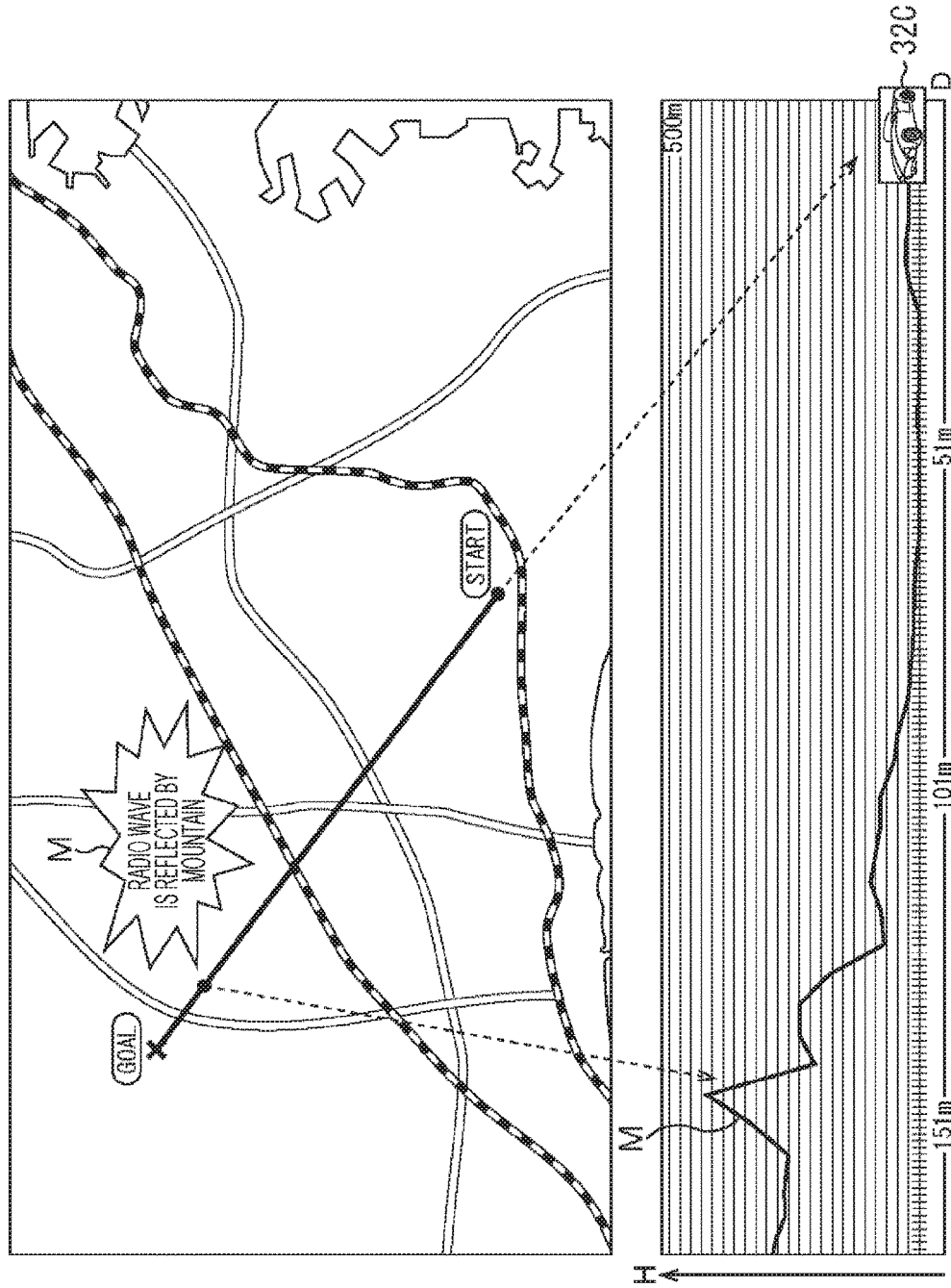
FIG. 18 is a view illustrating that radio waves are reflected by a high mountain

In further detail, as illustrated in FIG. 18, in a case where the mountain M having a predetermined height or higher exists within a predetermined range including the traveling direction of the receiver 32C, it is regarded that the reflection occurs by the mountain M. In FIG. 18, in an upper part, it is illustrated that the mountain M is present on a straight line corresponding to the traveling direction from the receiver 32C, and in a lower part, a cross-section from the receiver 32C to the mountain M is illustrated and it is illustrated that the mountain M is high enough to reflect the radio wave.

At step S19, the control unit 72 operates the adaptive equalization filter 124, the error correction unit 106, the ADC 102, and the FFT unit 104 as usual.

At step S20, the waveform estimation unit 122 estimates the main wave and the delay wave on the basis of the information of the positional relationship between the transmitter 31 and the receiver 32 supplied from the calculation unit 121, and supplies the estimation result to the tap coefficient update unit 123.

That is, for example, as illustrated in FIG. 17, in a case where the receiver 32 moves in an upper left direction (to the northwest) in the drawing as indicated by the receivers 32C-1 to 32C-3, there are two paths which are a path R1 which is a linear transmission path from the transmitter 31 to the receiver 32 and a path R2 including a path R2-1 from the transmitter 31 to the mountain M and a path R2-2 from the mountain M to the receiver 32. In such a case, the main wave reaches via the path R1 substantially linear from the transmitter 31 to the receiver 32, and then the delay wave reaches via the path R2.

As a result, in the receiver 32, as indicated by a waveform W1 in FIG. 17, the delay wave indicated by a dotted line reaches with delay by a delay time Δt with respect to the main wave indicated by a solid line.

Therefore, when estimating the main wave, the waveform estimation unit 122 estimates an arrival time t (=X1/c) by dividing a transmission distance X1 of the path R1 by a light speed c. When estimating the delay wave, the delay time Δt is necessary. The waveform estimation unit 122 divides difference between the transmission distance X1 of the path R1 and a transmission distance X2 of the path R2 by the light speed c from the information on the map to calculate the delay time $\Delta t$ ($=(X2-X1)/c$).

The waveform estimation unit 122 obtains the arrival time t of the main wave and the arrival time of the delay wave ($t+\Delta t$), estimates the waveforms of the main wave and the delay wave from this relationship, and supplies the estimation result to the tap coefficient update unit 123.

At step S21, the tap coefficent update unit 123 updates the coefficient in the adaptive equalization filter 124 on the basis of the estimation result, generates the replica of the delay wave, and outputs the same to the subtraction unit 125.

At step S22, the subtraction unit 125 subtracts the replica of the delay wave from the OFDM time domain signal to leave only the main wave to output. That is, for example, since the replica of the delay wave indicated by a waveform W2 is subtracted from the OFDM time domain signal including the main wave and the delay wave as indicated by the waveform W1 in FIG. 17, it becomes possible to remove the delay wave as indicated by a waveform W3.

By the above-described process, it becomes possible to remove the delay wave on the basis of the positional relationship between the receiver 32 and the transmitter 31, so that it becomes possible to decrease the effect of the multipath.

<Regarding AGC Control>

The tuner 101 provided with the auto gain control (AGC) 101a adjusts a gain so that an input signal has a constant magnitude on the basis of a demodulation result of the orthogonal demodulation unit 103 by controlling the AGC 101a.

Figure 19:
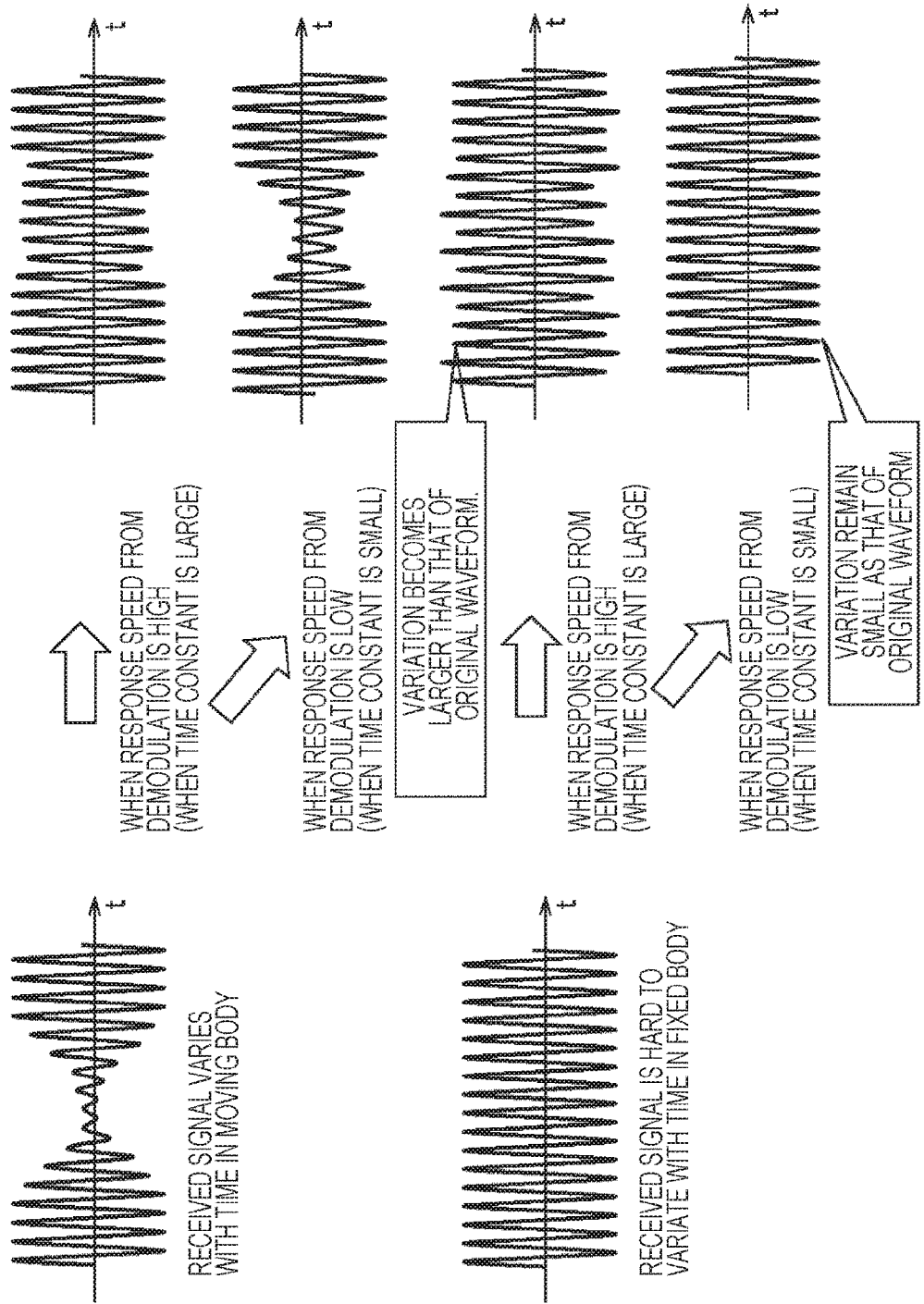
FIG. 19 is a view illustrating difference in response speed of AGC control between a moving body and a fixed body.

In a case where the receiver 32 is used in the moving body, a reception state of a received signal by the tuner 101 significantly changes according to environmental change accompanying with the movement, so that the waveform significantly changes as illustrated in an upper left part of FIG. 19.

Therefore, it becomes possible to appropriately correct a feedback speed, that is, a response speed (time constant) of the orthogonal demodulation unit 103 of the AGC 101a as illustrated in an upper right part of FIG. 19 by setting the same relatively high (making the time constant large). On the other hand, in a case where the response speed of the AGC 101a is low (time constant is small), the correction on the input signal is delayed, so that there is a possibility that sufficient correction cannot be performed as illustrated in a second row from the top in the right part in FIG. 19.

On the other hand, in a case where the receiver 32 is used in a fixed body, the reception state of the received signal by the tuner 101 has almost no environmental change, so that the waveform change is small as illustrated in a lower left part of FIG. 19.

Therefore, there is a possibility that the feedback speed, that is, the response speed (time constant) of the orthogonal demodulation unit 103 of the AGC 101a cannot be appropriately corrected as illustrated in a third row from the top in the right part in FIG. 19 when setting the same relatively high (making the time constant large). On the other hand, in a case where the response speed of the AGC 101a is low (time constant is small), the correction on the input signal conforms, so that it is possible to sufficiently correct as illustrated in a lower right part in FIG. 19.

Therefore, it is necessary to switch a control mode of the AGC 101a depending on whether the receiver 32 is the moving body or the fixed body.

<AGC Control Process>

Figure 20:
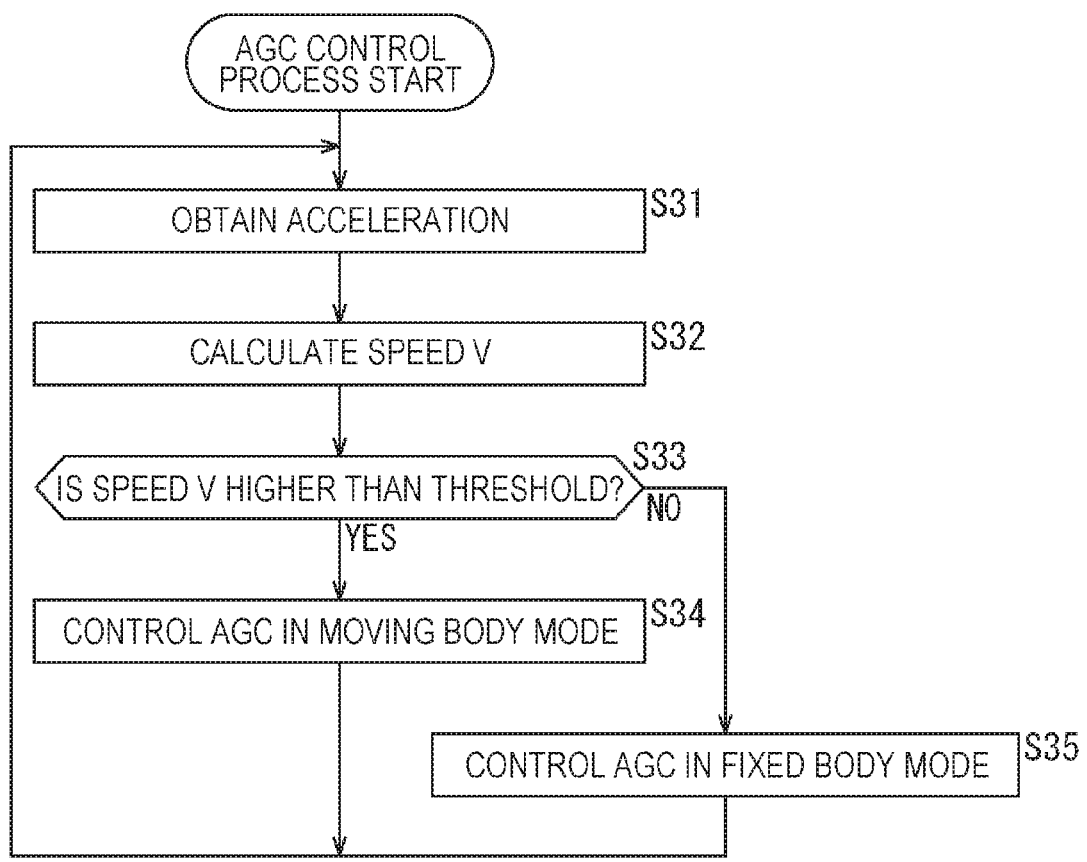
FIG. 20 is a flowchart illustrating an AGC control process by the receiver of FIG. 1.

Next, with reference to a flowchart of FIG. 20, an AGC control process by the reception operation unit 71 of FIG. 11 will be described.

At step S31, the acceleration sensor 133 measures the acceleration of the receiver 32 and supplies the same to the control unit 72.

At step S32, the control unit 72 calculates a speed V of the receiver 32 on the basis of the acceleration.

At step S33, the control unit 72 determines whether the speed V is higher than a predetermined value and the receiver 32 is provided on the moving body. At step S33, in a case where it is determined that the speed V is higher than the predetermined value and the receiver 32 is provided on the moving body, the procedure shifts to step S34.

At step S34, the control unit 72 controls the AGC 101a of the tuner 101 to operate in a moving body mode. That is, the control unit 72 operates the AGC 101a in the operation mode in which the time constant is made large and the response speed is made high.

On the other hand, at step S33, in a case where it is determined that the speed V is lower than the predetermined value and the receiver 32 is provided on the fixed body, the procedure shifts to step S35.

At step S35, the control unit 72 controls the AGC 101a of the tuner 101 to operate in a fixed body mode. That is, the control unit 72 operates the AGC 101a in the operation mode in which the time constant is made small and the response speed is made low.

By the above-described control, it becomes possible to appropriately switch the operation mode depending on whether the receiver 32 is provided on the moving body or the fixed body to operate the AGC 101a, and appropriately control the received signal to a constant state. As a result, the reception state of the receiver 32 may be improved.

<Sampling Frequency Error Correction in Resampling>

As specified is ARIB STD-B31 in ISDB-T, a sampling frequency in an input to the FFT unit 104 is defined as fs=8.126984 MHz.

However, since a sampling frequency $f_{ADC}$ of the ADC unit 102 and a sampling frequency $f_s$ in the input to the FFT unit 104 are normally different from each other, it is necessary to convert (resample) the sampling frequency $f_{ADC}$ on a subsequent stage of the ADC unit 102.

Figure 21:
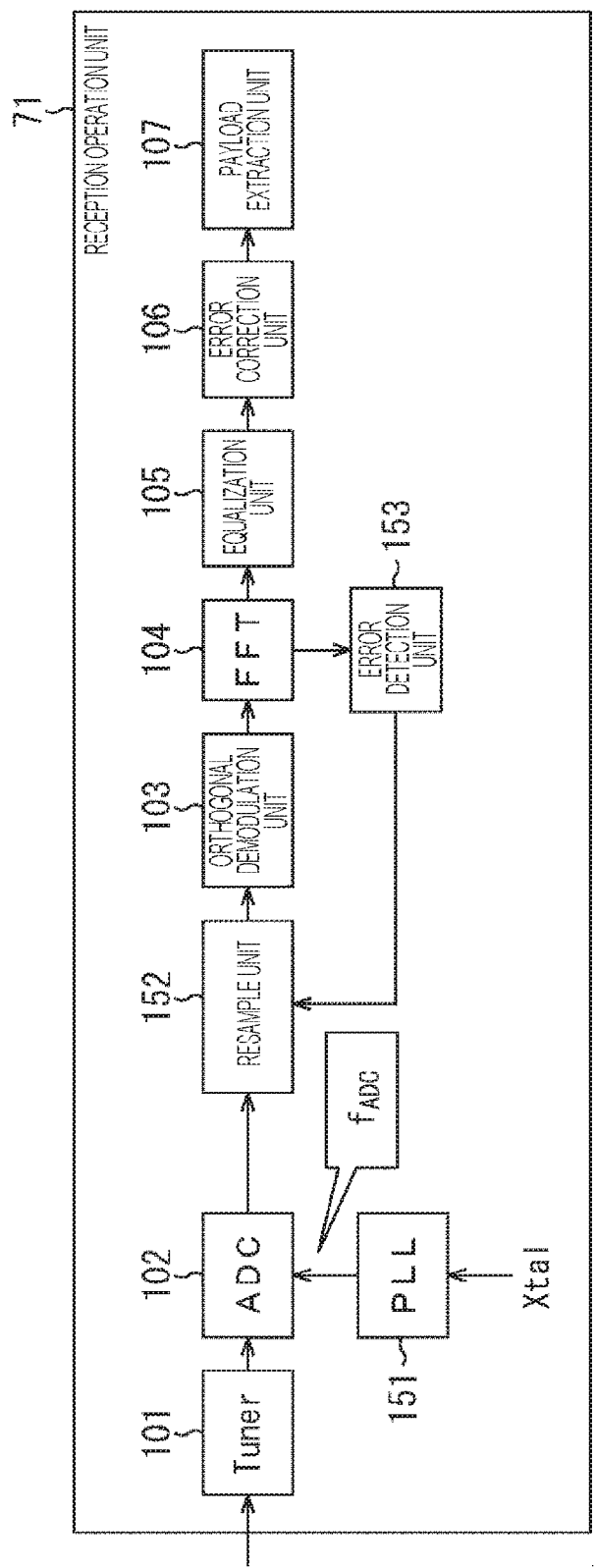
FIG. 21 is a view illustrating a configuration example of a reception operation unit of a receiver provided with a conventional resample unit.

Herein, referring to an upper left part of FIG. 21, a configuration example of the conventional reception operation unit 71 will be described. Meanwhile, with reference to FIG. 5, the description of the configuration having the function the same as that of the above-described configuration is not repeated appropriately. That is, in the reception operation unit 71 in FIG. 21, a clock signal generation unit (phase locked loop (PLL)) 151 which generates a clock signal of the frequency $f_{ADC}$ supplied to the ADC 102, a resample unit 152 which resamples an output signal of the ADC 102, and an error detection unit 153 which obtains a frequency error of the input signal to the FFT unit 104 are provided.

Figure 22:
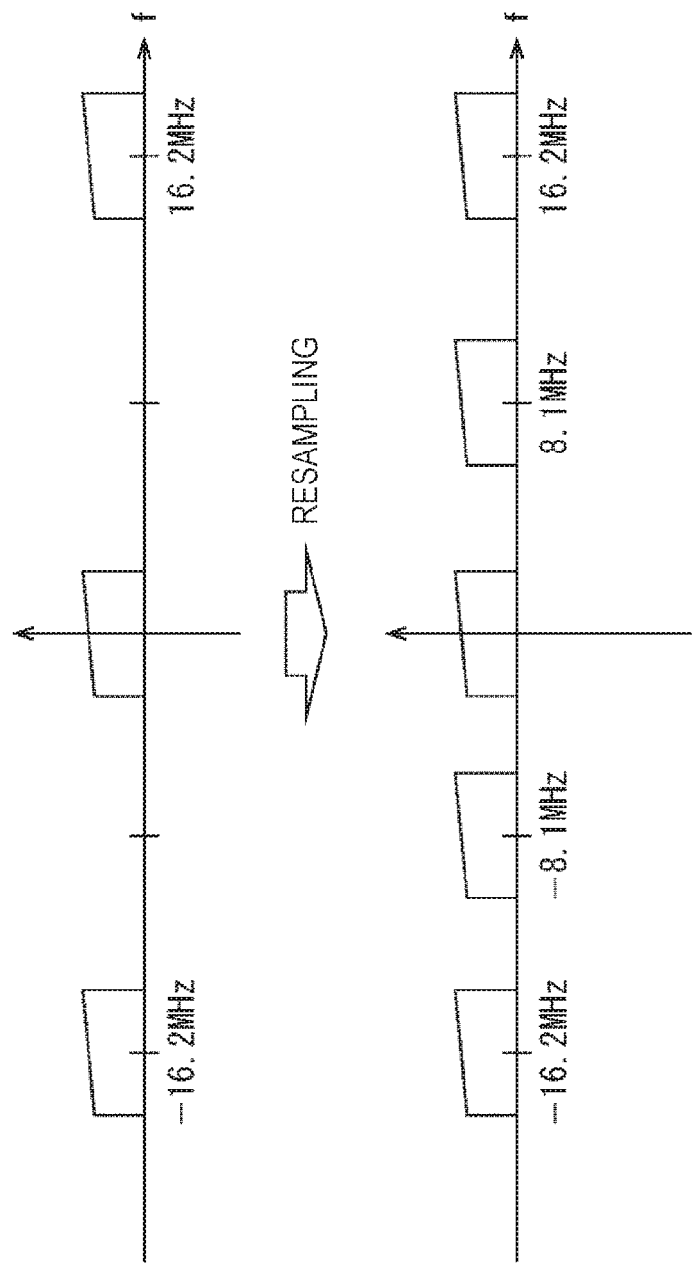
FIG. 22 is a view illustrating resampling by the resample unit in the reception operation unit of the conventional receiver.

In further detail, for example, in a case where the frequency $f_{ADC}$ in the clock signal generation unit 151 oscillated by crystal (Xtal) is 16.2 MHz as illustrated in an upper part of FIG. 22, the resample unit 152 resamples the signal supplied from the ADC 102 by the frequency $f_s$ as illustrated in a lower part of FIG. 22. In further detail, the resample unit 152 resamples by $f_{nominarate}$ ($=f_s/f_{ADC}$) obtained by normalizing the frequency $f_{ADC}$ at the resampled frequency $f_s$.

Also, the error detection unit 153 obtains a frequency error Δf on the basis of phase difference in the input signal of the FFT unit 104, and corrects the resampling frequency of the resample unit 152.

At the time of resampling, when temperature change occurs in the clock signal generation unit 151, the oscillation frequency of crystal (Xtal) and the like changes, and the frequency error Δf is added to the frequency $f_{ADC}$, the resampling cannot be performed correctly. Therefore, it is necessary to detect the frequency error Δf.

Figure 23:
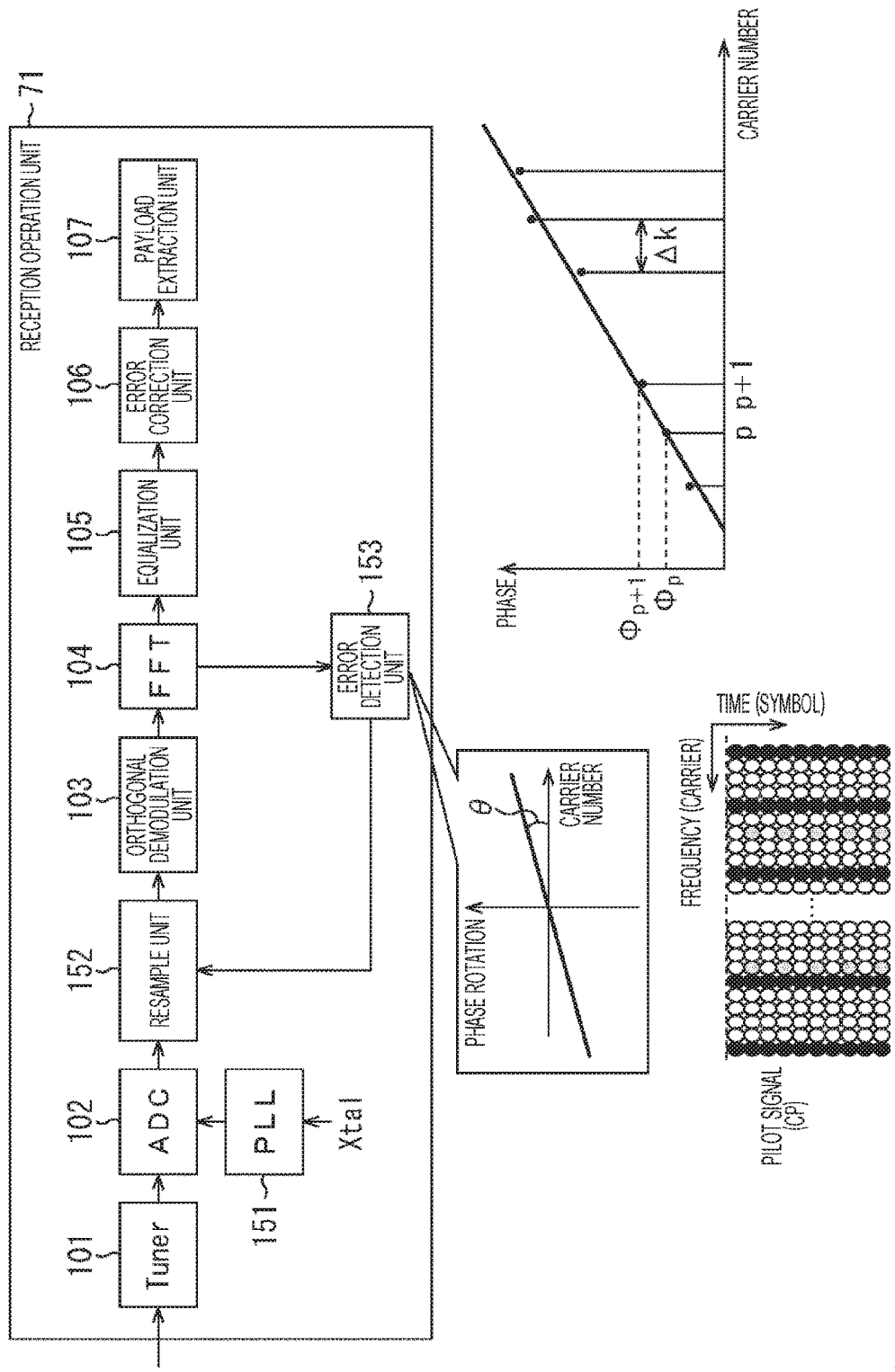
FIG. 23 is a view illustrating a method of correcting a resampling frequency error when resampling in the reception operation unit of FIG. 21 by using phase difference in a pilot pattern.

For example, when a pilot pattern is such that as illustrated in a lower left part of FIG. 23, the error detection unit 153 obtains the frequency error Δf from the phase difference obtained by using the phase according to inclination of a straight line in phase distribution at each frequency (carrier) as illustrated in a left middle part of FIG. 23.

The error detection unit 153 calculates the phase difference by following equation (1), for example, on the basis of the distribution as illustrated in a lower right part of FIG. 23.

[Expression 1]

$$\Phi_{m,p} - \Phi_{m,p+1} = -2\pi \Delta k \Delta t / N \quad (1)$$

Herein, $\Phi_{m,p}$ represents a pth pilot subcarrier in an mth OFDM symbol, and $\Phi_{m,p+1}$ represents the phase of a (p+1)th pilot subcarrier. In addition, Δk represents an interval between the pilot subcarriers, Δt represents a sampling time error, and N represents a FFT window size.

Herein, the sampling time error Δt in the phase difference of Expression (1) is as represented by following Expression (2).

[Expression 2]

$$\Delta t_{p,p+1} = -\frac{\Phi_{m,p} - \Phi_{m,p+1}}{-2\pi \Delta k / N} \quad (2)$$

The error detection unit 153 estimates the error of the sampling frequency by estimating the inclination of the phase by calculating the error of the sampling time as represented by Expression (2). Meanwhile, regarding the estimation of the error of the sampling frequency, please refer to the background art in Japanese Patent Application Laid-Open No. 2007-028636.

Figure 24:
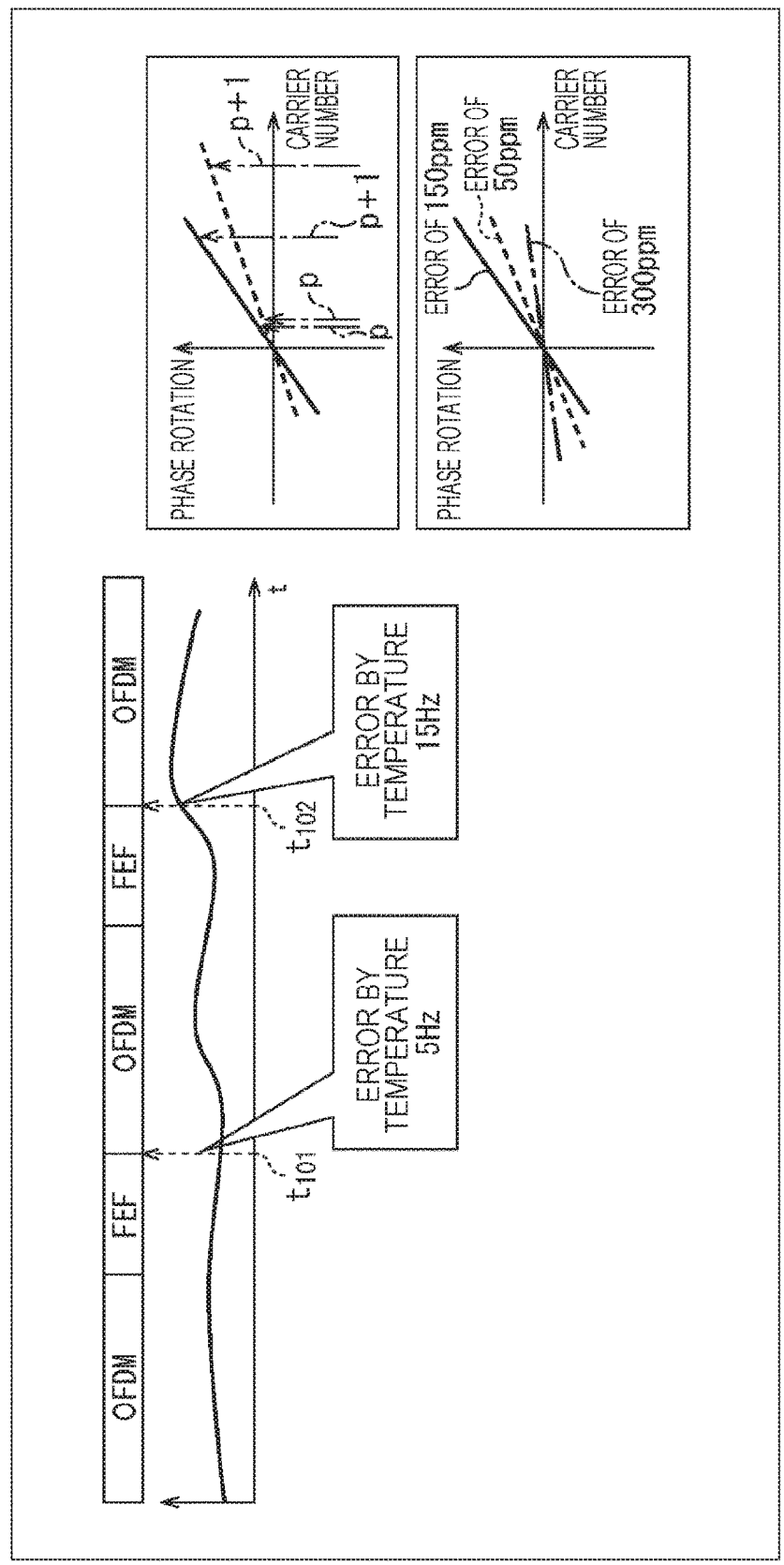
FIG. 24 is a view illustrating a problem in a case where the resampling frequency error when resampling in the reception operation unit of FIG. 21 is corrected using the phase difference in the pilot pattern.

However, as illustrated in a left part of FIG. 24, the actual ODFM signal is such that a future extension frame (FEE) being a period for service transmission different from future DVB-T2 is provided between the OFDM signals. For this reason, every time it enters a period of the OFDM signal, it might take time to follow for detecting the frequency error. However, in a case where the error changes depending on the temperature, at a timing when it switches from the FEF at the head to the OFDM signal of in a left part FIG. 24, for example, the frequency error Δf is 5 Hz, and at a timing when it switches from a second FEF to the OFDM signal in the drawing, the frequency error Δf is 15 Hz, so that a previous value cannot be used as it is.

Also, in a case where an interval in a frequency direction is wide and the number is small such as pilot signals (CP) indicated by a dotted line as compared with pilot signals (CP) indicated by a solid line in an upper right part of FIG. 24, even with a small frequency error, the phase difference between the pth and (p+1)th pilots may exceed one rotation and there is a risk that the correct error cannot be estimated.

Furthermore, as illustrated in a lower right part of FIG. 24, there is no problem in a case where the inclination increases according to the magnitude of the error, such as when the clock error is 50 ppm and 150 ppm, but when the clock error becomes large such as 300 ppm, the phase of the pilot signal (CP) makes one rotation or more, and the frequency error Δf cannot be correctly detected. That is, since there is a limit value for detecting the frequency error, it is not always possible to obtain an appropriate frequency error.

Second Embodiment

<Receiver Which Corrects Sampling Frequency Error of Resampling>

Next, a configuration example of a receiver capable of correcting the above-described sampling frequency error is described with reference to FIG. 25. Meanwhile, in FIG. 25, the configuration having the same function as that of the configuration of a receiver 32 in FIG. 11 is assigned with the same reference sign and the same name and the description thereof is appropriately omitted. In addition, in FIG. 25, a configuration in a control unit 72 is a functional block diagram functionally illustrating a process executed by the control unit 72; this may also be hardware having a configuration having the same function, or a configuration such that the same function may be realized functionally by software. Furthermore, in the configuration of the sensor unit 73, only a temperature sensor 134 is herein used, so that the description of the configuration other than that is omitted.

That is, the control unit 72 is provided with a subtraction unit 171, a table 172, and an arithmetic unit 173.

The subtraction unit 171 obtains temperature difference T1 between temperature at a timing at which reception of an immediately preceding received signal ends (immediately before reception of non-received signal starts) supplied from the temperature sensor 134 of the sensor unit 73 and a reference temperature, and temperature difference T2 between temperature at a timing at which a next received signal starts (immediately before the reception of the non-received signal ends) and the reference temperature. Herein, the received signal is, for example, an OFDM signal, and the non-received signal is, for example, a FEF signal. That is, for example, as illustrated in FIG. 26, when the subtraction unit 171 receives the OFDM signal being a new received signal at time t112, this calculates the temperature difference T1 from the reference temperature at immediately preceding time t111 and the temperature difference T2 from the reference temperature at time t112 at present n.

Figure 26:
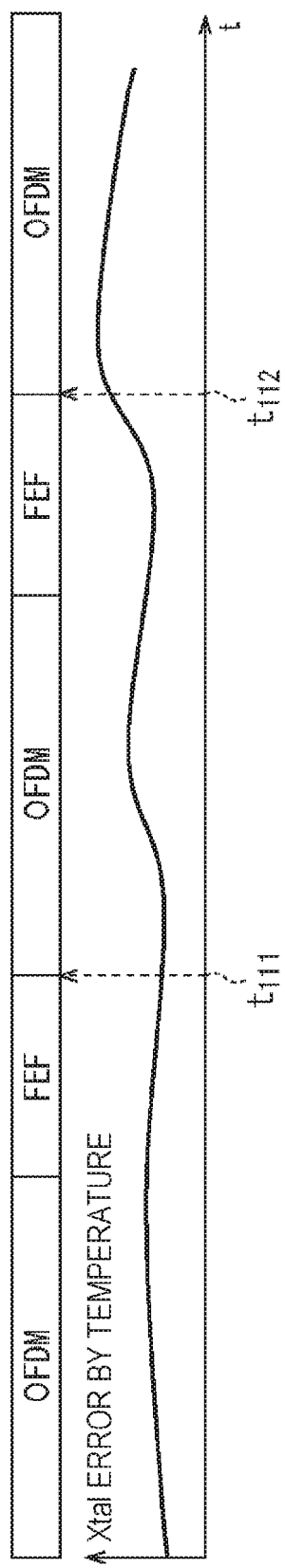
FIG. 26 is a view illustrating resampling by a reception operation unit of FIG. 25.

Meanwhile, in FIG. 26, an upper row illustrates whether the signal to be transmitted is the OFDM signal being the received signal or the FEE signal being the non-received signal as a time series type. Also, a waveform in a second row indicates change of a frequency error in time series in accordance with the temperature in crystal (Xtal) in a clock signal generation unit 151 supplied to an ADC 102 in time series. Furthermore, in a third row, a time axis representing the time series is illustrated.

The table 172 is stored in a storage unit 74 in which a correspondence between the temperature difference and the frequency error is recorded; the control unit 72 reads the information in the table 172 to read frequency errors Δ1 and Δ2 of the crystal for the temperature differences T1 and T2, respectively, and outputs them to the arithmetic unit 173.

Using a sampling frequency error Δm1 and the frequency errors Δ1 and Δ2 immediately before the reception of the immediately preceding received signal ends stored in the storage unit 74 and read by an error detection unit 162, the arithmetic unit 173 estimates a sampling frequency error Δm2 at the time when the next received signal starts receiving, and supplies the same to an error correction unit 161.

The error correction unit 161 controls a resample unit 152 by using the sampling frequency error Δm2 to resample.

Figure 25:
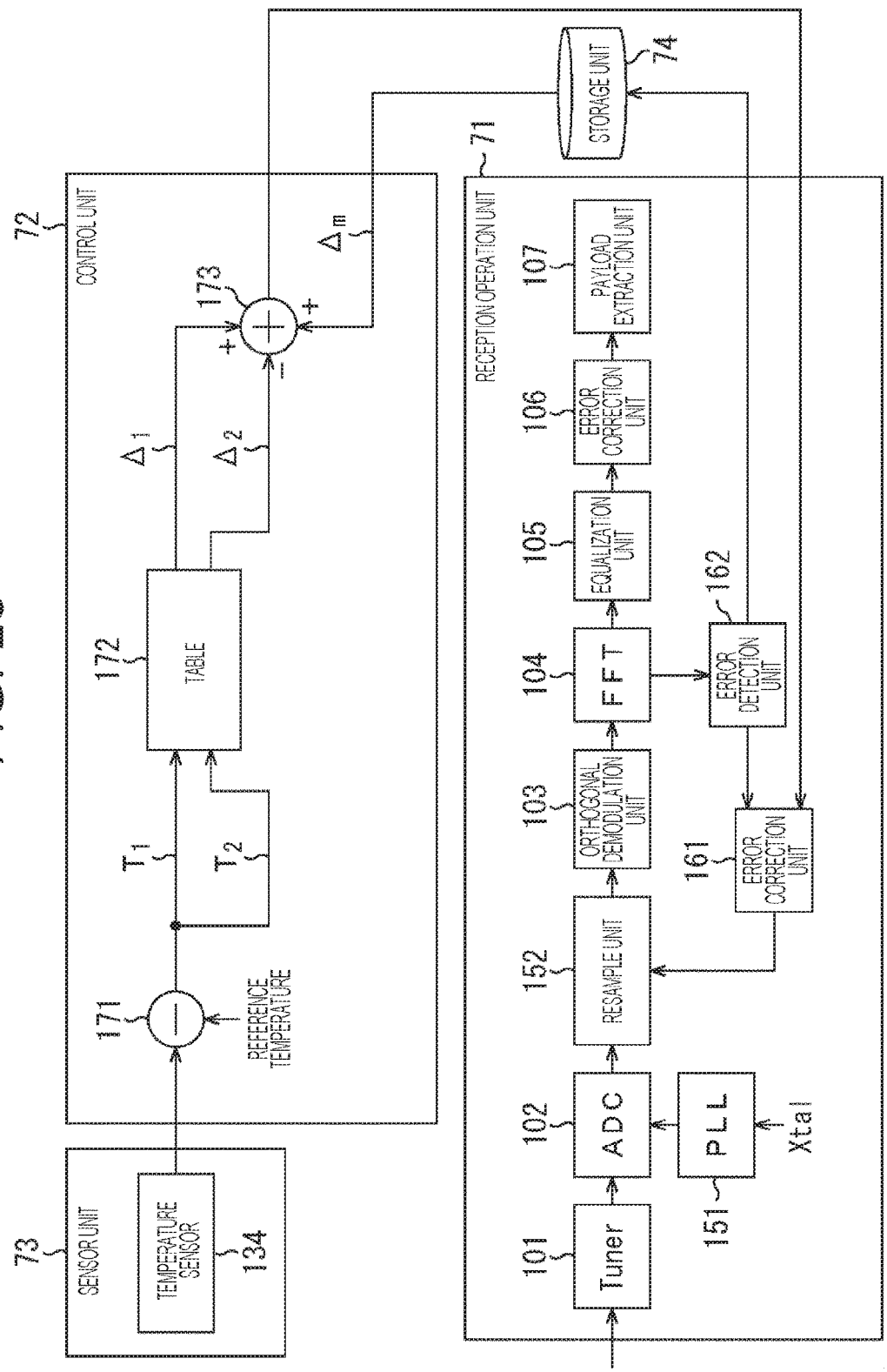
FIG. 25 is a view illustrating a configuration example of a second embodiment of a receiver to which the present technology is applied.

<Sampling Frequency Error Correction Process in Receiver 32 in FIG. 25>

Figure 27:
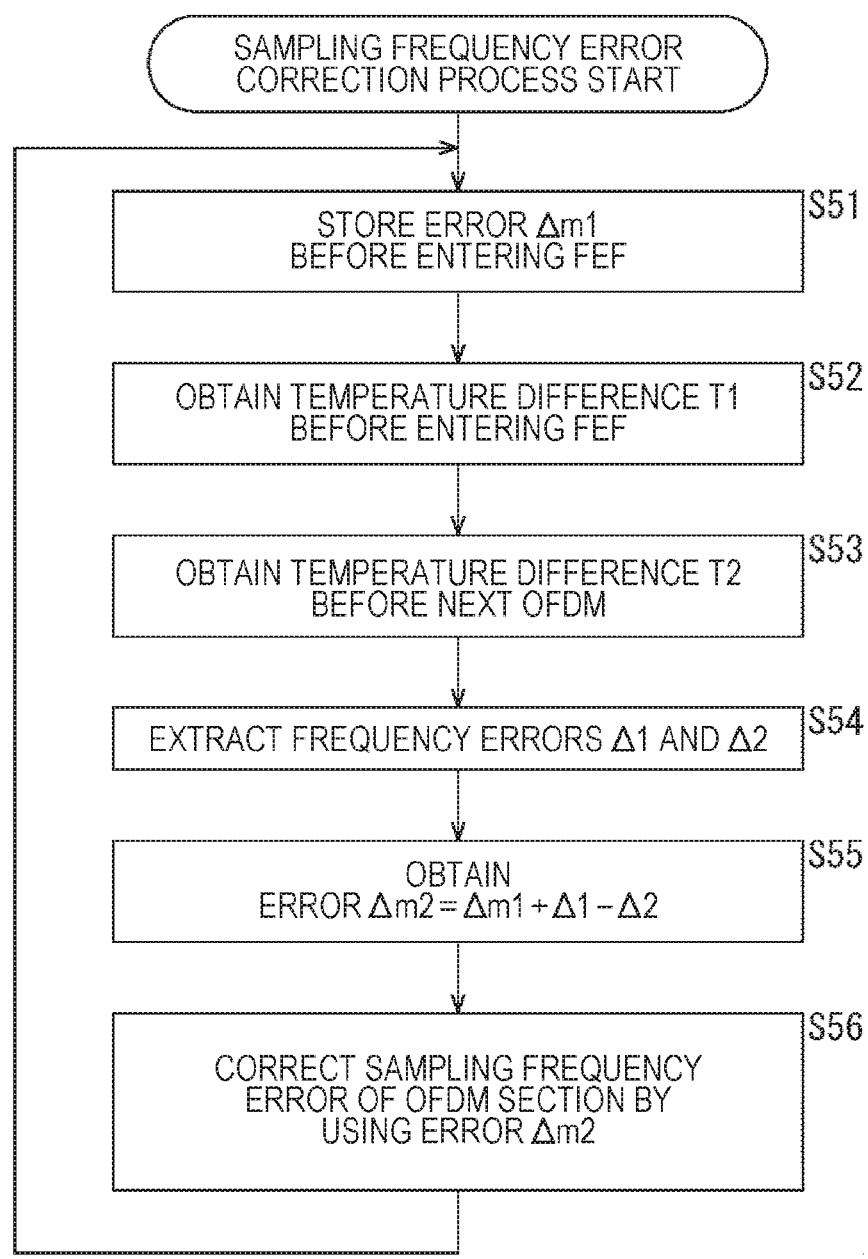
FIG. 27 is a flowchart illustrating a sampling frequency error correction process in the resampling by the reception operation unit of FIG. 25.

Next, a sampling frequency error correction process in the receiver 32 in FIG. 25 will be described with reference to a flowchart of FIG. 27.

At step S51, the error detection unit 162 measures the sampling frequency error Δm1 at the timing immediately before the reception of the OFDM signal being the received signal ends, and allows the storage unit 74 to store a measurement result.

At step S52, the subtraction unit 171 performs arithmetic operation of the temperature difference T1 from the reference temperature when allowing the crystal (Xtal) in the clock signal generation unit 151 to oscillate to operate on the basis of the information of the temperature measured by the temperature sensor 134 of the sensor unit 73 at the timing immediately before the reception of the OFDM signal being the received signal ends.

At step S53, the subtraction unit 171 performs arithmetic operation of the temperature difference T2 from the reference temperature when allowing the crystal (Xtal) in the clock signal generation unit 151 to oscillate to operate on the basis of the information of the temperature measured by the temperature sensor 134 of the sensor unit 73 at the timing immediately before the reception of the OFDM signal being the next received signal starts.

At step S54, the control unit 72 reads the table 172 from the storage unit 74, and extracts information of the frequency errors Δ1 and Δ2 of the crystal corresponding to the temperature differences T1 and T2, respectively.

At step S55, the arithmetic unit 173 adds difference (=Δ1−Δ2) between the frequency errors Δ1 and Δ2 of the crystal to the sampling frequency error Δm1 at the timing immediately before the reception of the OFDM signal being the received signal ends and estimates the sampling frequency error Δm2 of the OFDM signal being the received signal the reception of which nest starts to supply to the error correction unit 161. More specifically, the arithmetic unit 173 estimates the frequency error of the OFDM signal being the received signal the reception of which starts next, by performing arithmetic operation to obtain as Δm2=Δm1+(Δ1−Δ2).

At step S56, the error correction unit 161 controls the resample unit 152 with the sampling frequency error of Δm2 to resample while correcting the sampling frequency.

By the above-described processes, it becomes possible to correct the sampling frequency so as to appropriately correspond to temperature change of the crystal in the clock signal generation unit 151, so that it becomes possible to resample at an appropriate sampling frequency, and as a result, at becomes possible to improve a reception state of the receiver 32.

<Variation of Second Embodiment>
<Variation of Receiver Which Corrects Sampling Frequency Error of Resampling>

In the above description, the example in which the frequency errors are obtained from the temperature difference immediately before the reception of the received signal ends and the temperature difference immediately before the reception starts, and the difference between the frequency errors is added to the actually measured sampling frequency error, thereby correcting the sampling frequency error is described. However, if a relationship between current temperature difference and the sampling frequency error is stored in a table in advance, or the like, a similar process may be realized only by reading the same.

Figure 28:
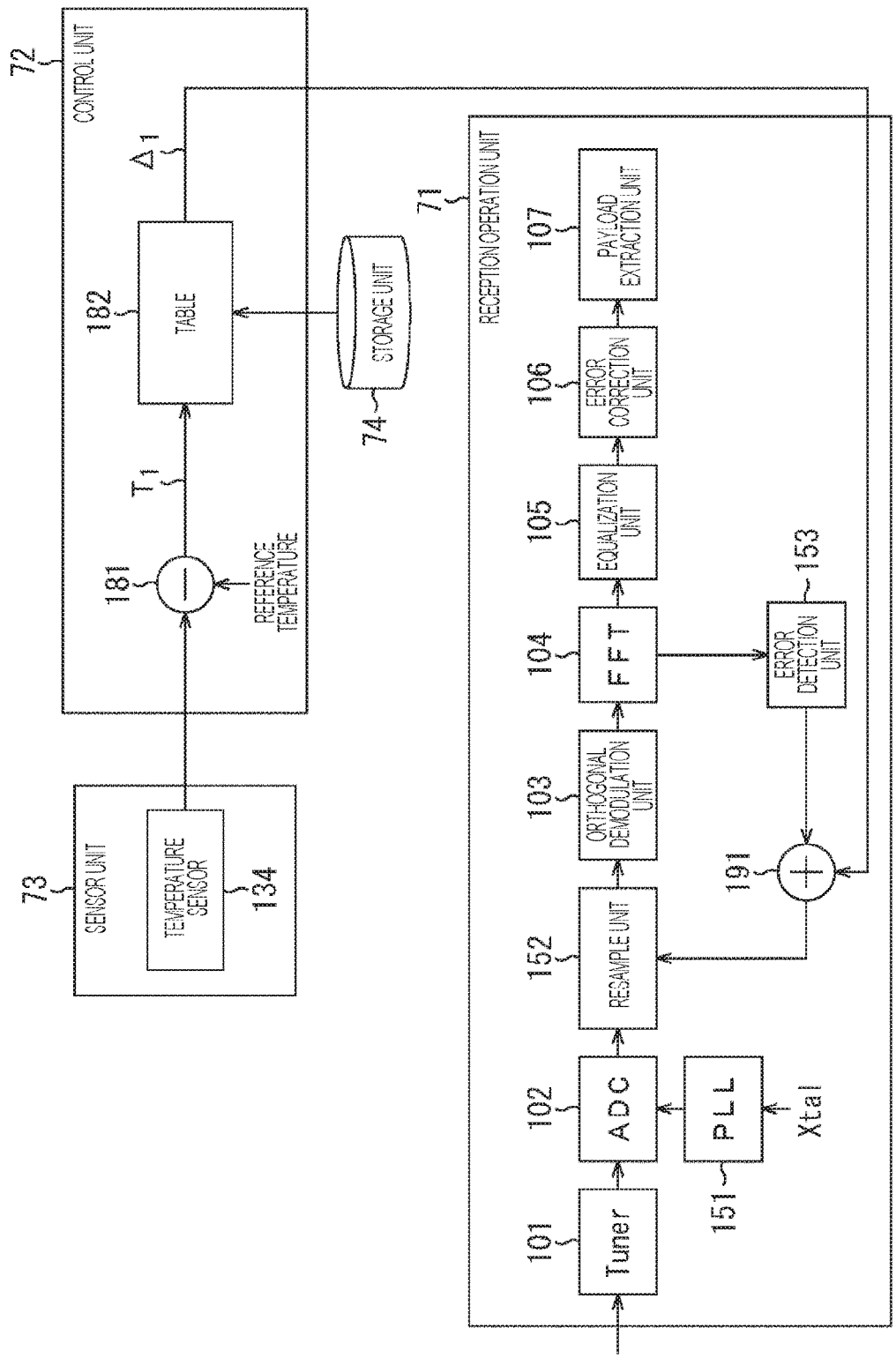
FIG. 28 is a view illustrating a variation of the second embodiment of the receiver to which the present technology is applied.

FIG. 28 illustrates a configuration example of a receiver 32 provided with a table in which the relationship between the current temperature difference and the sampling frequency error is stored in advance. Meanwhile, in FIG. 28, a configuration having the function similar to that of the receiver in FIG. 25 is assigned with the same reference sign and the same name and the description thereof is appropriately omitted.

The receiver 32 in FIG. 28 differs from the receiver 32 in FIG. 25 in that a table 182 in which a correspondence relationship between the temperature difference when receiving the OFDM signal and the sampling frequency error is stored is provided in place of a table 172 in which the correspondence relationship between the temperature difference and the frequency error is stored. Meanwhile, a subtraction unit 181 is the same as a subtraction unit 171.

That is, in a control unit 72 in the receiver 32 in FIG. 28, the subtraction unit 181 performs arithmetic operation of the temperature difference between the temperature supplied from a temperature sensor 134 and the reference temperature. The control unit 72 reads the table 182 in which the temperature difference and the sampling frequency error are stored in association with each other stored in advance in the storage unit 74, and reads the sampling frequency error on the basis of the temperature difference supplied from the subtraction unit 181 to supply to an arithmetic unit 191.

The arithmetic unit 191 adds the sampling frequency error read in accordance with the temperature difference to an actual sampling frequency error detected by an error detection unit 153 and outputs the same to a resample unit 152, and allows the same to correct the sampling frequency and resample.

With such a configuration, it becomes possible to correct the sampling frequency error according to the temperature in resampling, and improve a reception performance of the receiver 32.

<Sampling Frequency Correction Process in Receiver 32 in FIG. 28>

Figure 29:
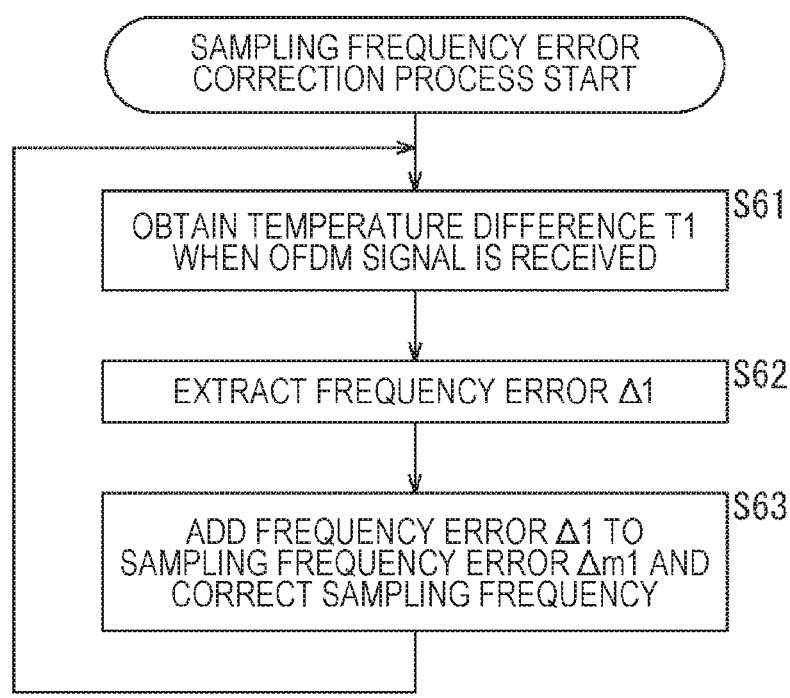
FIG. 29 is a flowchart illustrating a sampling frequency error correction process when resampling by a reception operation unit of FIG. 28.

Next, with reference to a flowchart in FIG. 29, a sampling frequency correction process in the receiver 32 in FIG. 28 will be described.

At step S61, the subtraction unit 181 performs arithmetic operation of the temperature difference T1 from the reference temperature when allowing crystal (Xtal) in a clock signal generation unit 151 to oscillate to operate on the basis of the information of the temperature measured by the temperature sensor 134 of the sensor unit 73 when the OFDM signal is received.

At step S62, the control unit 72 reads the table 182 from the storage unit 74 and extracts information of a sampling frequency error Δ1 corresponding to temperature difference T1.

At step S63, the arithmetic unit 191 adds the sampling frequency error Δ1 to a sampling frequency error Δm1 detected by the error detection unit 153 and supplies the same to the resample unit 152 to allow the same to correct the sampling frequency to resample.

By the above-described process, it becomes possible to correct the sampling frequency error without being conscious of a crystal error due to the temperature, and to decrease the sampling frequency error from the original state. Therefore, it becomes possible to compensate for the error even if the pilot carrier interval is wide, and to correct even the large sampling frequency error. As a result, a reception state of the receiver 32 may be improved.

Third Embodiment

The example of improving the reception state of the receiver 32 by the operation which the receiver 32 may independently perform illustrated in the area A enclosed by the dotted line in the receiver 32 in FIG. 1 is described above. An example of improving the reception state by cooperation of the receiver 32 and a management device 33 illustrated in an area B enclosed by a dotted line in FIG. 1 is next described.

Figure 30:
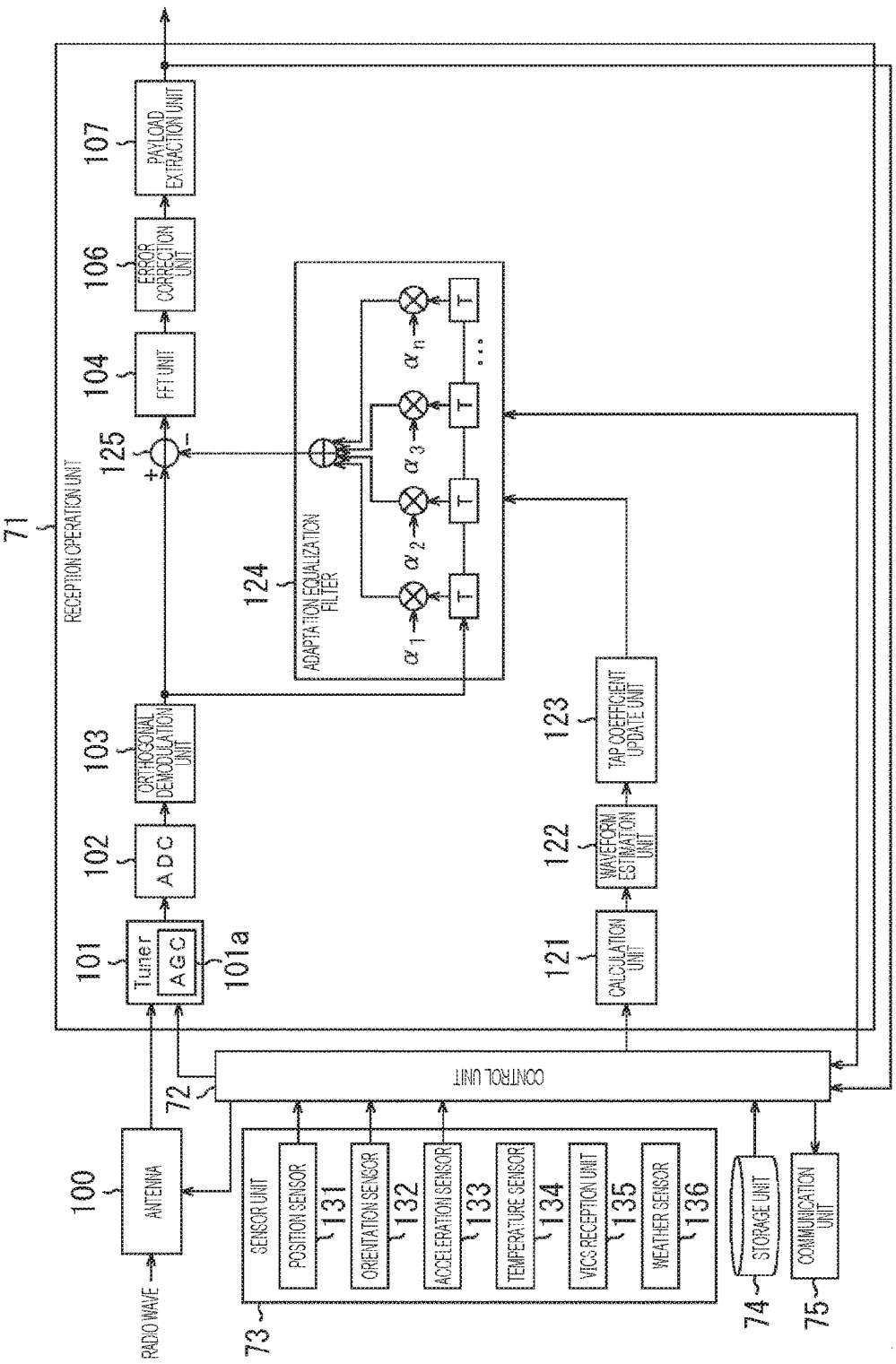
FIG. 30 is a view illustrating a third embodiment of a receiver to which the present technology is applied.

FIG. 30 illustrates a configuration example of the receiver 32 which cooperates with the management device 33 to improve the reception state. Meanwhile, in FIG. 30, the configuration having a function similar to that of the receiver 32 in FIG. 11 is assigned with the same reference sign and the same name and the description thereof is appropriately omitted. That is, the receiver 32 in FIG. 30 basically has the function similar to that of the receiver 32 in FIG. 11, and further has a function for cooperating with the management device 33.

That is, a control unit 72 controls a communication unit 75 to transmit to the management device 33 receiver information such as a career to noise ratio (C/N) and a bit error rate (BER) based on a reception result, and sensor information including a moving direction and a moving speed based on a detection result detected by a position sensor 131, an orientation sensor 132, and an acceleration sensor 133, surrounding traffic information received by a VICS reception unit 135, information indicating weather detected by a weather sensor 136 and the like of the sensor unit 73. The control unit 72 also controls the communication unit 75 to receive a parameter for setting including information of a coefficient used in an adaptive equalization filter 124 transmitted from the management device 33 on the basis of the receiver information and the sensor information of the receiver 32, and set the coefficient of the adaptive equalization filter 124 on the basis of the received parameter.

The management device 33 accumulates the receiver information and the sensor information transmitted by the receiver 32 in an accumulation unit 91 while associating them with the receiver 32 in time series, and controls a receiver parameter analysis unit 92 to analyze the receiver information and the sensor information of a plurality of receivers 32 to obtain an optimum coefficient for the adaptive equalization filters 124 of many receivers 32, and allows a parameter storage unit 93 to store the same. The management device 33 controls a parameter supply unit 94 to transmit to the receiver 32 information of the parameter including information of the optimum coefficient information used in the adaptive equalization filter 124 stored in the parameter storage unit 93 via a communication unit 95.

For example, the receiver parameter analysis unit 92 recognizes a positional relationship with a transmitter 31 from position information on a map of the receiver 32, estimates a propagation route of a radio wave from the transmitter 31 to the receiver 32 from surrounding landform, a shape of a building, and the like, and calculates the optimum coefficient for the adaptive equalization filter 124 as the parameter on the basis of an estimation result. As an analyzing method in the receiver parameter analysis unit 92, for example, "Radio Propagation Analysis Tool RapLab™ (KOZO KEIKAKU ENGINEERING Inc.)" and the like may be used.

<Optimization Process by Receiver and Management Device>

Figure 31:
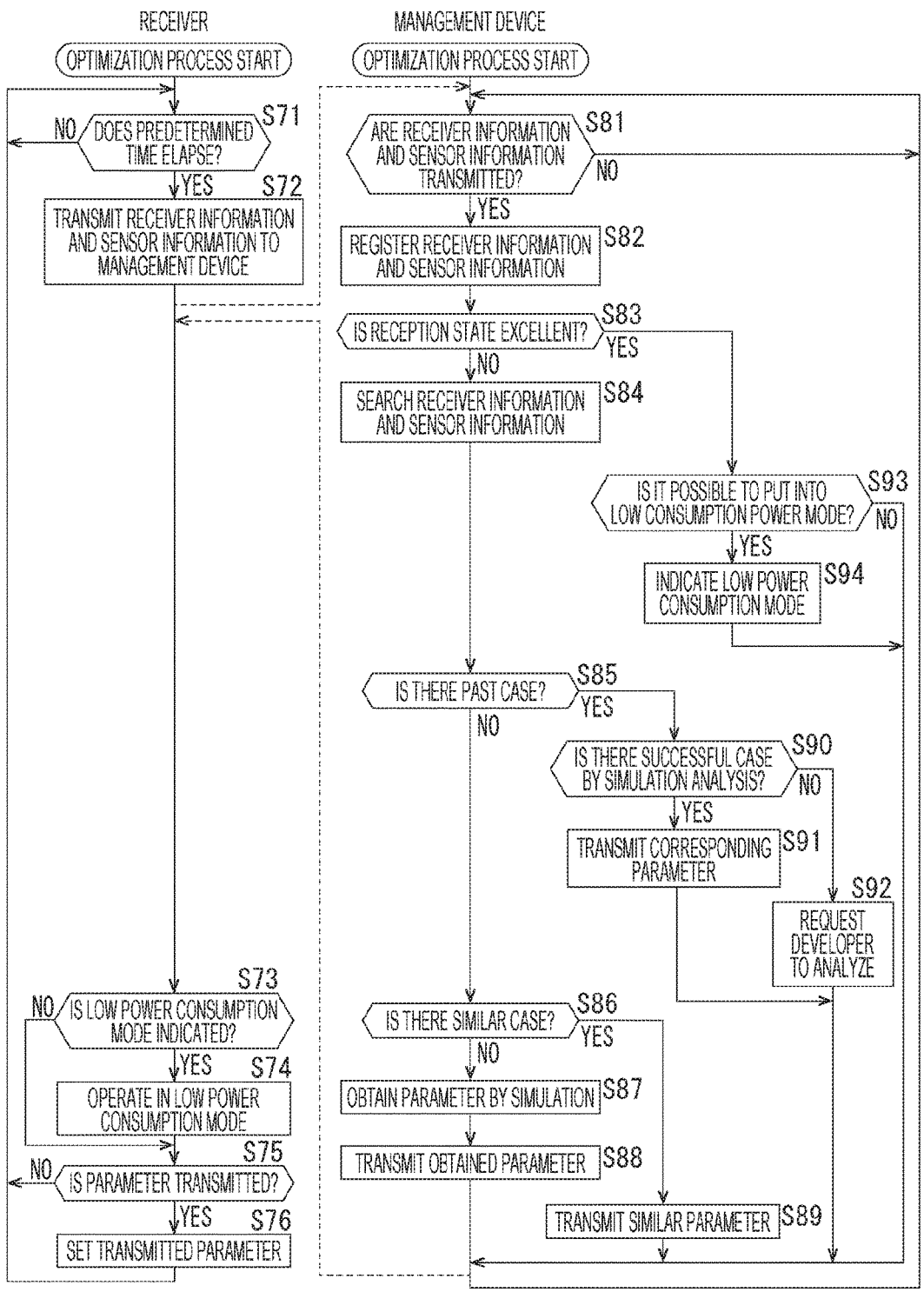
FIG. 31 is a flowchart illustrating an optimization process of a transmission/reception process by the receiver of FIG. 30 and a management device of FIG. 1.

Next, with reference to a flowchart of FIG. 31, an optimization process including multipath countermeasures and power saving countermeasures by the receiver 32 and the management device 33 in FIG. 30 is described.

At step S71, the control unit 72 determines whether a predetermined time elapses, and repeats the similar process until a predetermined time elapses. Then, at step S71, when a predetermined time elapses, the procedure shifts to step S72.

At step S72, the control unit 72 controls the communication unit 75 to transmit to the management device 33 the receiver information such as the career to noise ratio (C/N) and the bit error rate (BER) based on the reception result and the sensor information including the moving direction and the moving speed based on the detection results detected by the position sensor 131, the orientation sensor 132, and the acceleration sensor 133, the surrounding traffic information received by the VICS reception unit 135 of the sensor unit 73, and the like.

At that time, when transmitting the receiver information and the sensor information, the control unit 72 also transmits information for identifying the receiver 32, information of a transmission time and the like together.

At step S81, the communication unit 95 of the management device 33 determines whether the receiver information and the sensor information are transmitted from the receiver 32, and repeats the similar processing until they are transmitted. At step S81, for example, in a case where the receiver information and the sensor information are transmitted from the receiver 32, the procedure shifts to step S82.

At step S82, the communication unit 95 receives the transmitted receiver information and sensor information, and registers them in the accumulation unit 91.

At step S83, the receiver parameter analysis unit 92 analyzes the receiver information and the sensor information, and determines whether a reception state is excellent. At step S83, in a case where the C/N is 20 dB, the BER is $1 \times 10^{-4}$, the date and time is 9:00 on Monday as the receiver information, and it is determined that the reception status is not excellent, for example, the procedure shifts to step S84.

At step S84, the receiver parameter analysis unit 92 searches for the receiver information and the sensor information in the accumulation unit 91, and specifies a cause therefor. For example, the receiver parameter analysis unit 92 specifies, from the sensor information, the cause that interference due to multipath occurs from the positional relationship between the transmitter 31 and the receiver 32 or that a response speed of an AGC 104a is inappropriate.

At step S85, the receiver parameter analysis unit 92 determines whether it is registered as a past case in the accumulation unit 91 on the basis of the cause specified on the basis of the transmitted receiver information and sensor information. At step S85, if it is determined that this is not registered as the past case, the procedure shifts to step S86.

At step S86, the receiver parameter analysis unit 92 determines whether the receiver information and sensor information similar to the transmitted receiver information and sensor information are registered in the accumulation unit 91 or whether there is a case the cause of which is similar. At step S85, in a case where it is determined that it is not registered as the similar receiver information and sensor information or there is no case the cause of which is similar, the procedure shifts to step S87.

At step S87, the receiver parameter analysis unit 92 obtains the parameter by simulating the propagation route of the radio wave by using its own tool, and the like on the basis of the transmitted receiver information and sensor information, and stores the same in the parameter storage unit 93. At that time, the receiver parameter analysis unit 92 stores the obtained parameter in the parameter storage unit 93 in association with information identifying the receiver information and information stored in the accumulation unit 91. That is, the parameter corresponding to the receiver information and the sensor information the same as or similar to the receiver information and the sensor information registered in the accumulation unit 91 or the parameter having the same or similar cause from the parameter storage unit 93.

At step S88, the communication unit 95 reads the parameter stored in the parameter storage unit 93 and transmits the same to the receiver 32, and the procedure returns to step S81.

Figure 32:
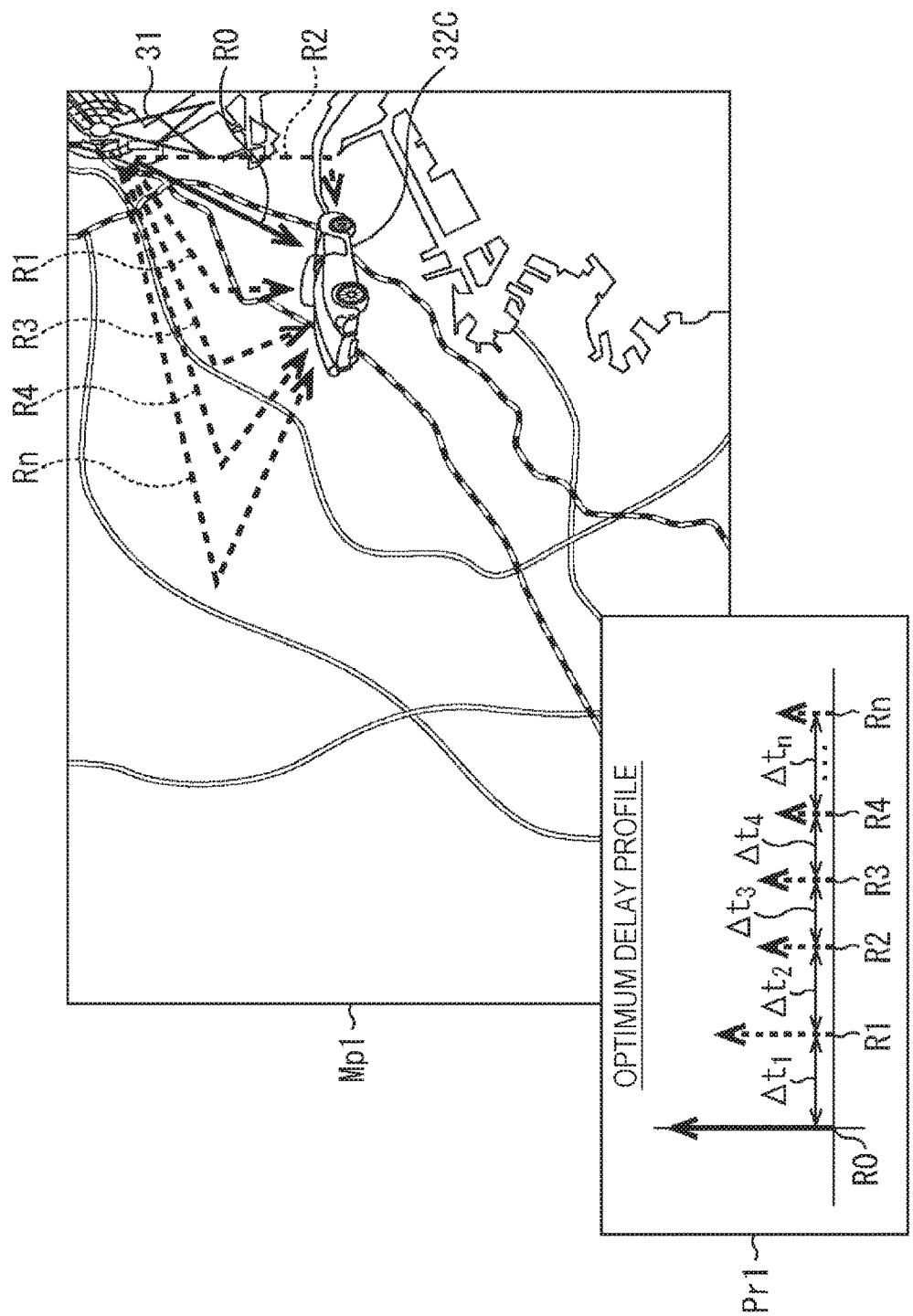
FIG. 32 is a view illustrating an example of a profile of a main wave and a delay wave when a positional relationship between the receiver and the transmitter is relatively close and there is multipath.

For example, as illustrated in an upper right part of FIG. 32, if a receiver 32C mounted on a vehicle is in a position relatively close to the transmitter 31 and a situation is such that reflection easily occur by a surrounding high building and the like, a profile as illustrated in a lower left part of FIG. 32 is obtained.

That is, as illustrated in the upper right part of FIG. 32, paths that are transmission paths from the transmitter 31 to the receiver 32C are paths R0 to Rn, and delay times Δt1 to Δtn are obtained according to distances of the transmission paths from the transmitter 31 to the receiver 32C.

In this case, as illustrated in the upper right part of FIG. 32, as the transmission paths from the transmitter 31 to the receiver 32C, a route of a main wave corresponding to the path R0 and routes of delay waves corresponding to the paths R1 to Rn are obtained. Therefore, the receiver parameter analysis unit 92 calculates the coefficient of the adaptive equalization filter 124 as the parameter on the basis of the paths R1 to Rn determined in this manner. Also, in this case, it is also obtained that an optimum direction of an antenna 100 is the northeast direction from the direction of the transmitter 31 as seen from the receiver 32C, and this is also included in the parameter.

Figure 33:
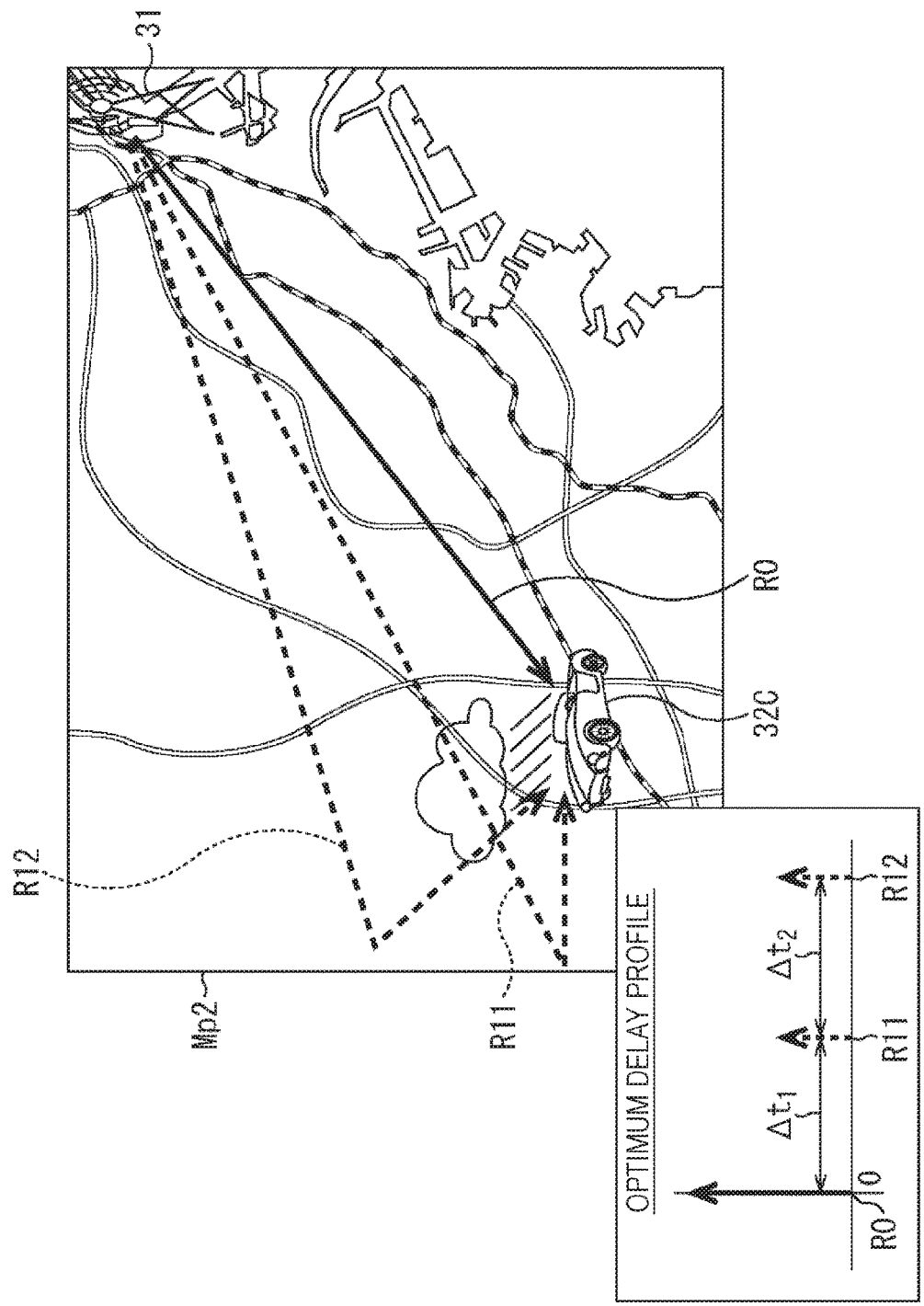
FIG. 33 is a view illustrating an example of a profile of the main wave and the delay wave when the positional relationship between the receiver and the transmitter is relatively far and there is the multipath.

Also, as illustrated in an upper right part of FIG. 33, also in a case in which the transmission path from the transmitter 31 to the receiver 32C is relatively long, and an effect of noise by the reflection wave is conventionally large, the paths R0, R1, and R2 are obtained and the delay times Δt1 and Δt2 are obtained according to the distances of the transmission paths from the transmitter 31 to the receiver 32C.

In this case, as illustrated in the upper right part of FIG. 33, as the transmission paths from the transmitter 31 to the receiver 32C, the route of the main wave corresponding to the path R0 and the routes of the delay waves corresponding to the paths R1 and R2 are obtained. Therefore, the receiver parameter analysis unit 92 calculates the coefficient of the adaptive equalization filter 124 corresponding to the profile illustrated in a lower left part of FIG. 33 as the parameter. Also, it is herein obtained that the optimum direction of the antenna 100 is in the northeast direction corresponding to the direction from the receiver 32C to the transmitter 31 and this is included in the parameter. In addition, in a case where heavy rain is detected by the weather sensor 136, this information is also included in the sensor information and is used when obtaining the parameter for setting the coefficient in the adaptive equalization filter 124.

Figure 34:
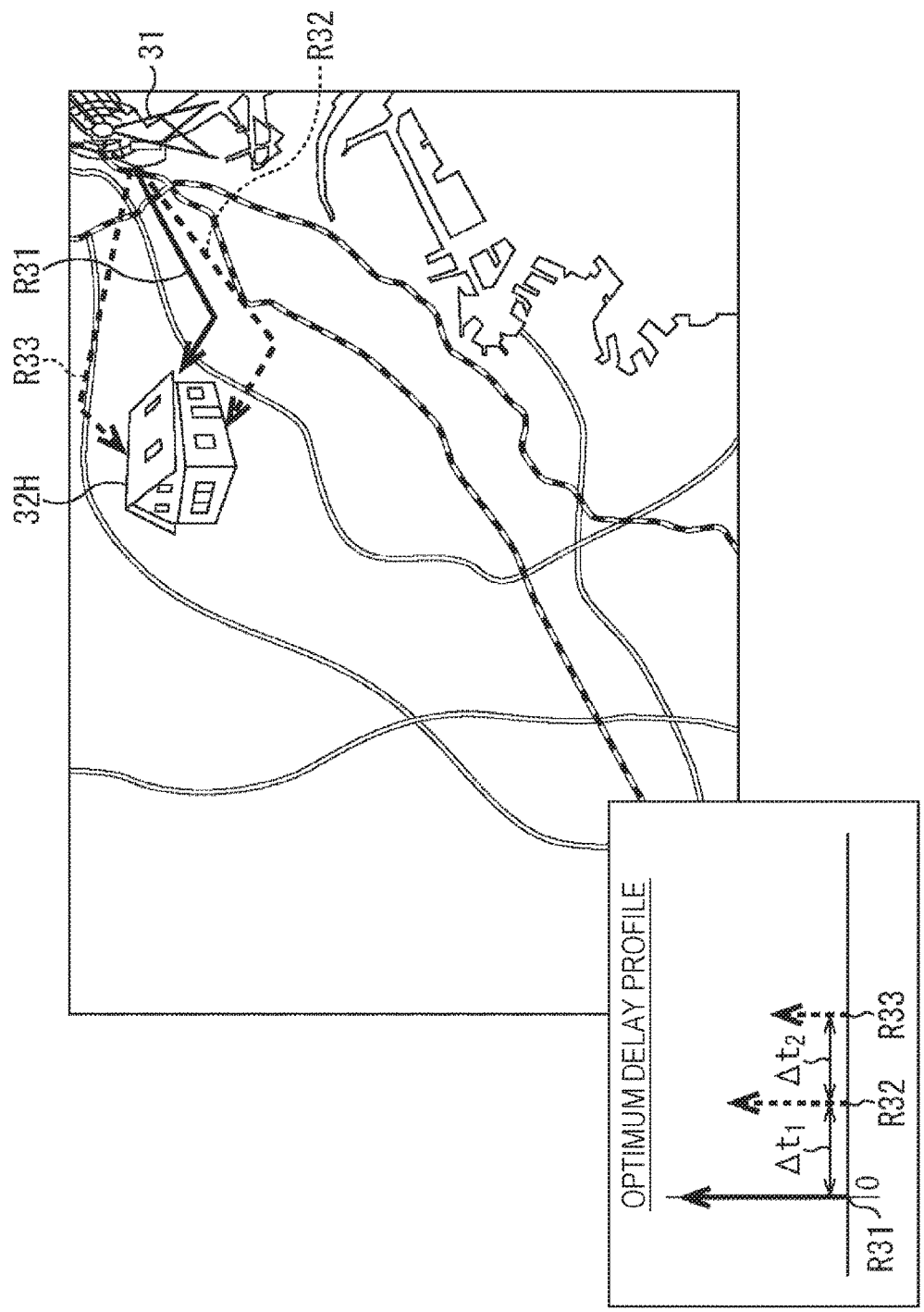
FIG. 34 is a view illustrating an example of a profile in which the positional relationship between the receiver and the transmitter is relatively close, but there is no main wave, and there is only the delay wave.

Furthermore, as illustrated in an upper right part of FIG. 34, the transmission path from the transmitter 31 to the receiver 32H is relatively short but there is no main wave, the paths R31, R32, and R33 are obtained, and delay times Δt1 and Δt2 are obtained according to the distances of the transmission paths from the transmitter 31 to the receiver 32H. Herein, in a case where it is detected that a traveling speed is 0 km by the positron sensor 131, the orientation sensor 132, and the acceleration sensor 133 in the sensor unit 73, the receiver 32 is regarded to be provided in a fixed house.

In this case, as illustrated in the upper right part of FIG. 34, as the transmission path from the transmitter 31 to the receiver 32H, only the routes of the delay waves corresponding to the paths R32 and R33 are obtained. Therefore, the receiver parameter analysis unit 92 calculates the paths R32 and R33 of the adaptive equalization filter 124 corresponding to the profile illustrated in a lower left part of FIG. 34 as the parameter. Also, herein, although there is no optimum direction of the antenna 100, this is obtained to be the southeast direction in which the delay wave is transmitted via R31 with the shortest route, and it is included in the parameter. Meanwhile, "H" of the receiver 32H in FIG. 34 indicates that this is the receiver 32 provided in a building such as a house.

Figure 35:
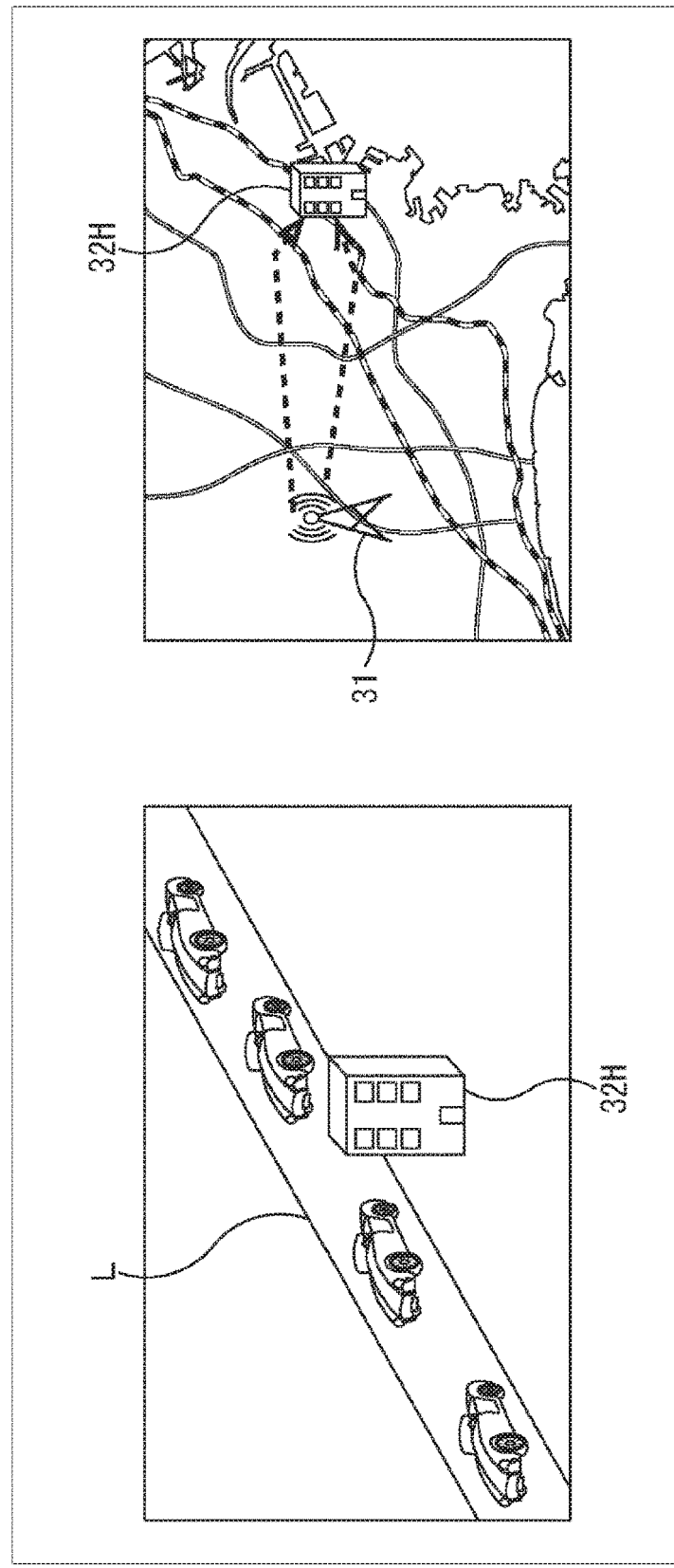
FIG. 35 is a view illustrating an example of AGC control according to the receiver and a traffic situation around the same.

Also, as illustrated in FIG. 35, in a case where the main wave cannot be received and only the delay wave is received by the receiver 32H provided in the building, and when there is a large road L in the vicinity, a reception status of the receiver 32H is affected by a traffic volume of the road L. More specifically, if a moving speed of a vehicle on the road L is high, the receiving status is deteriorated. Therefore, in a state where there is no vehicle on the road such as at night or in a situation where the vehicle cannot move at a sufficient moving speed due to congestion, the communication status is improved, and when it is possible to travel at a sufficiently high speed with an appropriate number of vehicles, the communication status is deteriorated.

Therefore, in such a situation, in a case where it is recognized that the receiver 32H is in the vicinity of the road L, on the basis of the position information, the receiver parameter analysis unit 92 may set the control of the AGC 101a described above to a fixed body mode in a case where the traffic status received by the VICS reception unit 135 is such that the traffic volume is small and the traffic is congested, and may set the control of the AGC 101a to a moving body mode in a case where the traffic volume is large.

Herein, the flowchart of FIG. 31 is described again.

In contrast, in a case where it is regarded at step S86 that there is the similar case, at step S89, the receiver parameter analysis unit 92 reads the parameter similar to the receiver information and the sensor information accumulated in the accumulation unit 91, or the parameter having the similar cause from the parameter storage unit 93, and controls the communication unit 95 to transmit the same to the receiver 32.

Also, in a case where it is regarded at step S85 that there is the past case, the procedure shifts to step S90.

At step S90, the receiver parameter analysis unit 92 determines whether there is any parameter with the excellent reception state out of the parameters obtained by the simulation analysis. In further detail, since the receiver information and the sensor information are accumulated in time series in the process at step S82, the receiver parameter analysis unit 92 searches the receiver information and the sensor information of the same receiver the reception state of which becomes better than the past one, and if there is the parameter newly stored in the parameter storage unit 93 at the timing when the reception state is improved, it is determined that there is the parameter the reception state of which becomes excellent out of the parameters obtained by the simulation analysis.

At step S90, in a case where there is the parameter the reception state of which becomes excellent out of the parameters obtained by the simulation analysis, the procedure shifts to step S91.

At step S91, the receiver parameter analysis unit 92 reads the parameter searched as the parameter the reception state of which becomes excellent among the parameters obtained by the simulation analysis from the parameter storage unit 93, and controls the communication unit 95 to transmit the same to the receiver 32.

On the other hand, at step S90, if there is no parameter the reception state of which becomes excellent out of the parameters obtained by the simulation analysis, the procedure shifts to step S92.

At step S92, the receiver parameter analysis unit 92 controls the communication unit 95 to present the receiver information and the sensor information to a developer and requests the developer to develop a method of improving the reception state by the receiver 32.

Figure 36:
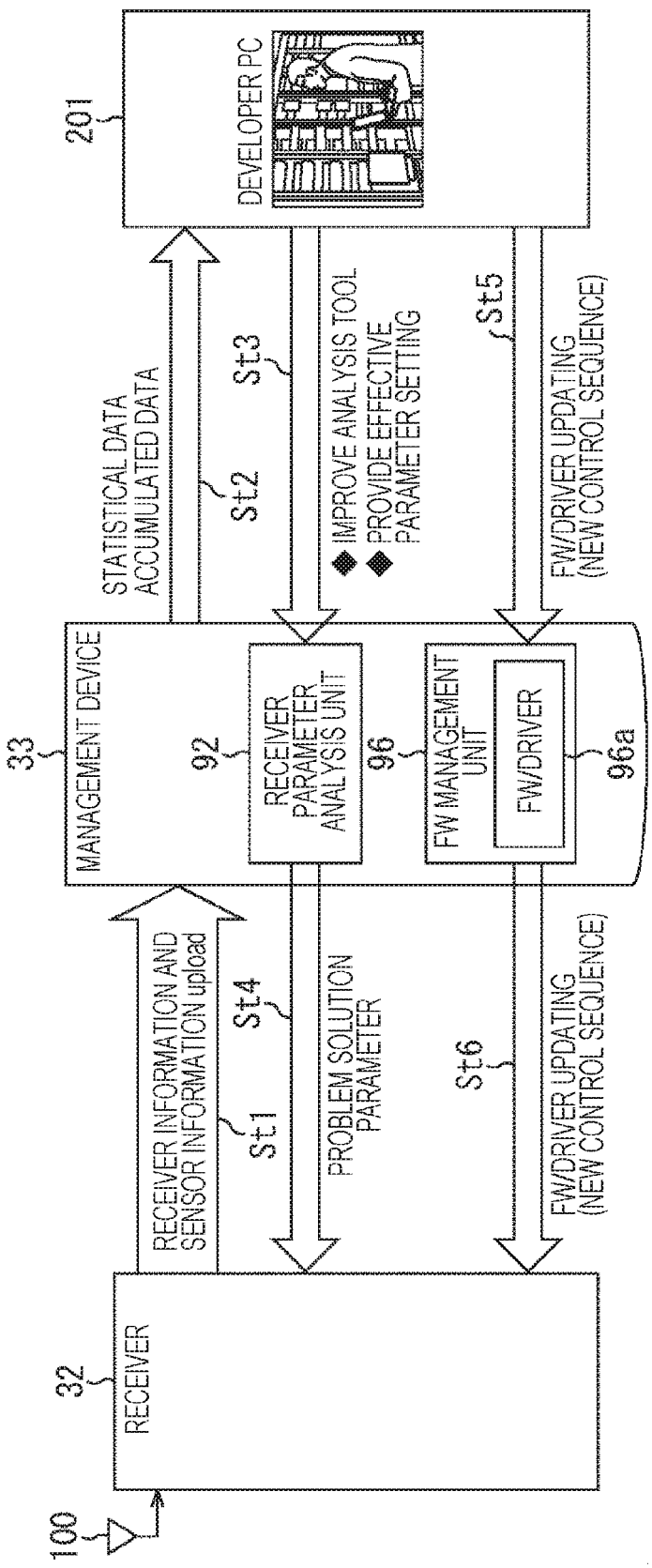
FIG. 36 is a view illustrating a relationship of a receiver, a management device, and a developer PC.

That is, as illustrated in FIG. 36, first, when the receiver information and the sensor information are transmitted from the receiver 32 to the management device 33 at step St1 (process corresponding to step S72), this is accumulated in the accumulation unit 91.

Then, in a case where the parameter for improving the reception state cannot be found by the receiver parameter analysis unit 92, at second step St2 (process corresponding to step S92), the receiver parameter analysis unit 92 transmits the receiver information and the sensor information accumulated in the accumulation unit 91 the reception state of which cannot be improved to a developer PC 201.

Herein, the developer PC 201 is used to promote analysis and development by the developer. Those developed by the developer may be the parameter itself or may be improvement such as version upgrade of the analysis tool used in the receiver parameter analysis unit 92. When the development is completed, at step St3, a version upgrading tool for improving the receiver parameter analysis unit 92 itself and the parameter itself including the coefficient used in the adaptive equalization filter 124 being a development result is transmitted from the developer PC 201 to the management device 33.

As a result, the receiver parameter analysis unit 92 in the management device 33 is upgraded and the parameter which becomes an analysis result is generated. Alternatively, the parameter obtained by the developer PC 201 is received.

Then, at step St4, the communication unit 95 of the management device 33 transmits the parameter which newly becomes the analysis result by the receiver parameter analysis unit 92 or the parameter generated by the developer PC 201 to the receiver 32.

Also, the developer may develop not only the version upgrade of the receiver parameter analysis unit 92 and the parameter itself including the coefficient used by the adaptive equalization filter 124 but also, for example, the firmware (FW), a driver and the like of the receiver 32; when they are developed, at step St5, the developed firmware (FW) and driver are transmitted from the developer PC 201 to the management device 33. A FW management unit 96 of the management device 33 obtains the developed FW and driver.

Then, at step St6, the FW management unit 96 of the management device 33 may control the communication unit 95 to transmit the firmware (FW) and the driver to the receiver 32, and the firmware (FW) and the driver may be installed in the receiver 32.

Herein, the flowchart of FIG. 31 is described again

At step S83, in a case where it is regarded that the reception state is excellent, the procedure shifts to step S93.

At step S93, the receiver parameter analysis unit 92 determines whether it may enter a low power consumption mode on the basis of the receiver information and the sensor information.

Figure 37:
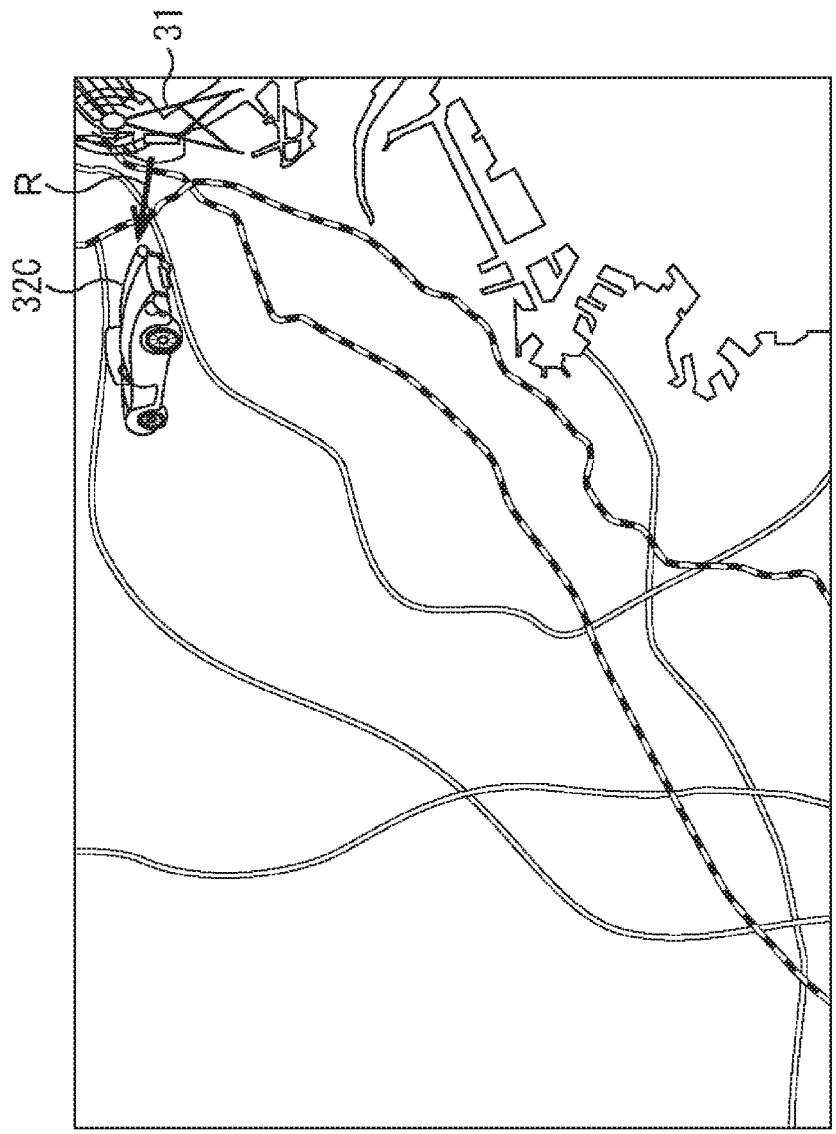
FIG. 37 is a view illustrating an example in which the positional relationship between the receiver and the transmitter is close and operation of the adaptive equalization filter is unnecessary.

For example, as illustrated in FIG. 37, in a case where the distance between the transmitter 31 and the receiver 32C is short and only the main wave is received, the antenna direction is the southeast direction, the direction of the transmitter 31 as viewed from the receiver 32, and in this case, since the effect due to multipath is small, it is possible to set to the low power consumption mode in which the operation of the adaptive equalization filter 124 turned off. Therefore, in such a case, it is determined that the low power consumption mode is possible, and the procedure shifts to step S94.

At step S94, on the basis of the receiver information and the sensor information, the receiver parameter analysis unit 92 sets the parameter to set to the low power consumption mode in which the operation of the adaptive equalization filter 124 is turned off in the case illustrated in FIG. 37, and controls the communication unit 95 to transmit the same to the receiver 32.

At step S73, the control unit 72 controls the communication unit 75 to determine whether the low power consumption mode is indicated by the management device 33. At step S73, for example, in a case where the low power consumption mode is indicated by a process at step S94, the procedure shifts to step S74.

At step S74, the control unit 72 stops the operation by the adaptive equalization filter 124 and sets to the low power consumption mode. Meanwhile, in this case, since occurrence of errors also decreases, the number of repetitions of the operation in the error correction unit 106 may be decreased. By such a process, the power consumption may be reduced within a range that does not affect reception performance.

Meanwhile, in a case where the low power consumption mode is not indicated at step S73, the process at step S74 is skipped.

At step S75, the control unit 72 controls the communication unit 75 to determine whether the parameter for setting the operation of the receiver 32 is transmitted by the management device 33. At step S75, for example, the parameters transmitted by the processes at steps S88, S89, and S91 are received and the received parameters are set. For example, in a case of the parameter regarding the coefficient in the adaptive equalization filter 124, a corresponding coefficient is set.

For example, in a case illustrated in the upper right part of FIG. 32, the control unit 72 controls to set coefficients $\alpha 1$, $\alpha 2$, ..., and $\alpha n$ in the adaptive equalization filter 124 to values according to the delay waves corresponding to the paths R1 to Rn illustrated in the lower left part in FIG. 32, set a replica of the delay wave, and remove the delay wave from the input signal.

Similarly, in a case illustrated in the upper right part of FIG. 33, the control unit 72 controls to set the coefficients $\alpha 1$ and $\alpha 2$ in the adaptive equalization filter 124 to values according to the delay waves corresponding to the paths R1 to R2, set the replica of the delay wave, and remove the delay wave from the input signal.

Furthermore, in a case illustrated in the upper right part of FIG. 34, the control unit 72 controls to set the coefficients α1 and α2 in the adaptive equalization filter 124 to values according to the delay waves corresponding to the paths R32 and R33, set the replica of the delay wave, and remove the delay wave from the input signal.

Also, in a case illustrated in FIG. 35, the control mode of the AGC 101a is set to either the moving body mode or the fixed body mode according to the traffic volume.

At step S75, in a case where the parameter is not transmitted, the process at step S76 is skipped.

Meanwhile, at step S72, since the process of transmitting the receiver information and the sensor information from the receiver 32 to the management device 33 is repeated at a predetermined time interval and they are accumulated in the accumulation unit 91 at step S83, it is possible to recognize whether the reception state is improved by newly setting the parameter by analyzing the accumulated information, so that this is regarded to be feedback to the management device 33. Also, even if the reception state is deteriorated with the lapse of time, since it is repeated that parameter is set under a new condition and the reception state is improved, the reception state may be dynamically and sequentially improved repeatedly.

Also, in a case where there is no parameter capable of improving the reception state, the developer is notified of this state, so that it is possible to urge prompt development of the parameter for improvement. Furthermore, improved parameter may be quickly distributed to the receiver 32.

Figure 38:
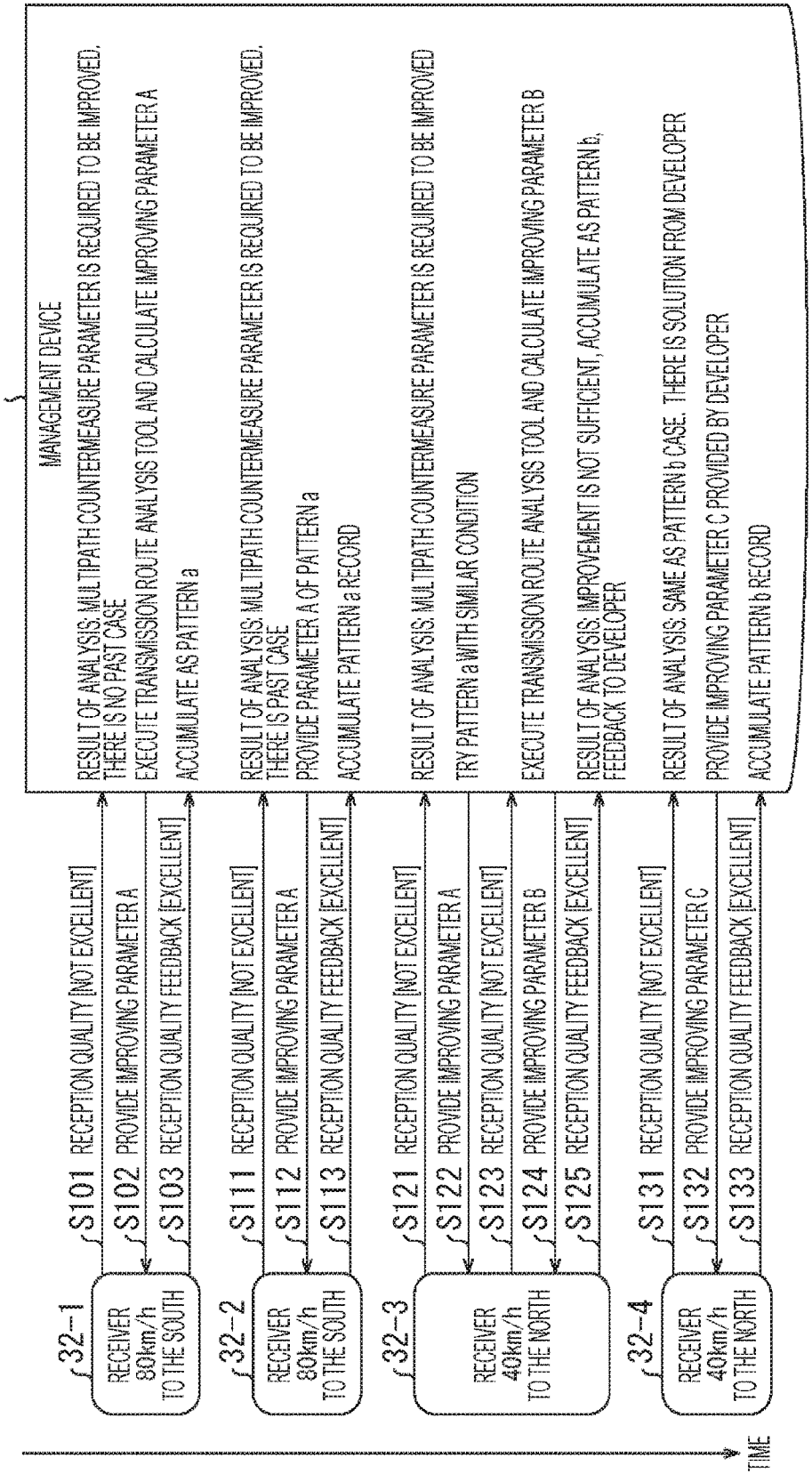
FIG. 38 is a flowchart illustrating an optimization process of a plurality of receivers and the management device.

With such an operation, the following process as illustrated in FIG. 38 becomes possible. Meanwhile, in the process of FIG. 38, there are receivers 32-1 to 32-4, and the optimization process of FIG. 31 is executed between each of them and the management device 33. Also, the receiver information of the receivers 32-1 and 32-2 indicates that they move to the south at 80 km/h, and the receiver information of the receivers 32-3 and 32-4 indicates that they move to the south at 40 km/h.

That is, at step S101 (step S72), the receiver 32-1 transmits the receiver information and the sensor information in which the reception state is not excellent to the management device 33.

In the management device 33, it is recognized that the cause is the parameter of the multipath countermeasures from the receiver information and the sensor information and it is required to improve the same, but there is no past case, and the receiver parameter analysis unit 92 calculates the parameter for improving the reception state (steps S81 to S88), and at step S102, this provides a calculated parameter A to the receiver 32-1.

At step S103 (step S72 of next time), the receiver 32-1 transmits the receiver information and the sensor information the reception state of which is improved to the management device 33. As a result, improvement by the parameter A is fed back to the management device 33 and is accumulated in the accumulation unit 91 as a pattern a.

At step S111 (step S72), the receiver 32-2 transmits the receiver information and the sensor information of which the reception state is not excellent to the management device 33.

In the management device 33, it is recognized that the cause is the parameter as the multipath countermeasures from the receiver information and the sensor information and improvement is required. Herein, since the receiver 32-2 has the same receiver information as that of the receiver 32-1, it is regarded that there is the past case corresponding to the pattern a, and the receiver parameter analysis unit 92 reads the parameter A corresponding to the pattern an accumulated in the parameter storage unit 32 (step S91) and provides the same to the receiver 32-1 at step S112.

At step S113 (step S72 of next time), the receiver 32-2 transmits the receiver information and the sensor information the reception state of which is improved to the management device 33, thereby feeding back the improvement by the parameter A. As a result, improvement by the parameter A is fed back to the management device 33 and is accumulated in the accumulation unit 91 as a pattern a.

At step S121 (step S72), the receiver 32-3 transmits the receiver information and the sensor information the reception state of which is not excellent to the management device 33.

In the management device 33, it is recognized that the cause is the parameter being the multipath countermeasures from the receiver information and the sensor information and it is required to improve the same, but there is a similar example of the pattern a, the receiver parameter analysis unit 92 reads the corresponding parameter A for improving the reception state (steps S81 to S86 and S89), and at step S122, this provides the similar parameter A to the receiver 32-1.

At step S123 (step S72), the receiver 32-3 transmits the receiver information and the sensor information the reception state of which is not excellent to the management device 33.

In the management device 33, it is recognized from the receiver information and the sensor information that the parameter A of the multipath countermeasure is the cause and needs improvement, but since there is no improved past case, the receiver parameter analysis unit 92 calculates a corresponding parameter B for improving the reception state (steps S81 to S88) and provides the calculated parameter B to the receiver 32-3 at step S124.

At step S125 (step S72 of next time), the receiver 32-3 transmits the receiver information and the sensor information the reception state of which is not excellent to the management device 33. As a result, it is fed back to the management device 33 that it is not improved by the parameter B, so that the developer is indicated to develop an improving method together with the receiver information and the sensor information (step S92). In response to this, it is assumed that a parameter C is developed from the developer later.

At step S131 (step S72), the receiver 32-4 transmits the receiver information and the sensor information the reception state of which is not excellent to the management device 33.

In the management device 33, since the receiver 32-4 has the same receiver information as that of the receiver 32-3, it is regarded that there is a past case corresponding to a pattern b, and the receiver parameter analysis unit 92 reads the parameter C developed by the developer later (step S91) and provides the same to the receiver 32-4 at step S132.

At step S133 (step S72 of next time), the receiver 32-4 transmits the receiver information and the sensor information the reception state of which becomes excellent to the management device 33, thereby feeding back the improvement, by the parameter C. As a result, the improvement by the parameter C is fed back to the management device 33 and this is accumulated in the accumulation unit 91 as a pattern c.

By the above-described process, it becomes possible to improve reception performance of the receiver 32 by cooperation of the receiver 32 and the management device 33 on the basis of the receiver information and the sensor information.

Fourth Embodiment

In the description above, the example in which the reception performance of the receiver 32 is improved by the cooperation of the receiver 32 and the management device 33 is described. However, it is also possible that the management device 33 calculates an optimum transmitter parameter for a transmitter 31 on the basis of receiver information and sensor information of the receiver 32, transmits the same to the transmitter 31, and transmits a broadcast wave according to the transmitter parameter. That is, it is also possible to optimize a transmitting method from the transmitter 31 by cooperation of the receiver 32, the management device 33, and the transmitter 31, and optimize a receiving method by the receiver 32, thereby improving a reception state of the receiver 32.

<Optimization Process by Cooperation of Receiver 32, Management Device 33, and Transmitter 31>

Figure 39:
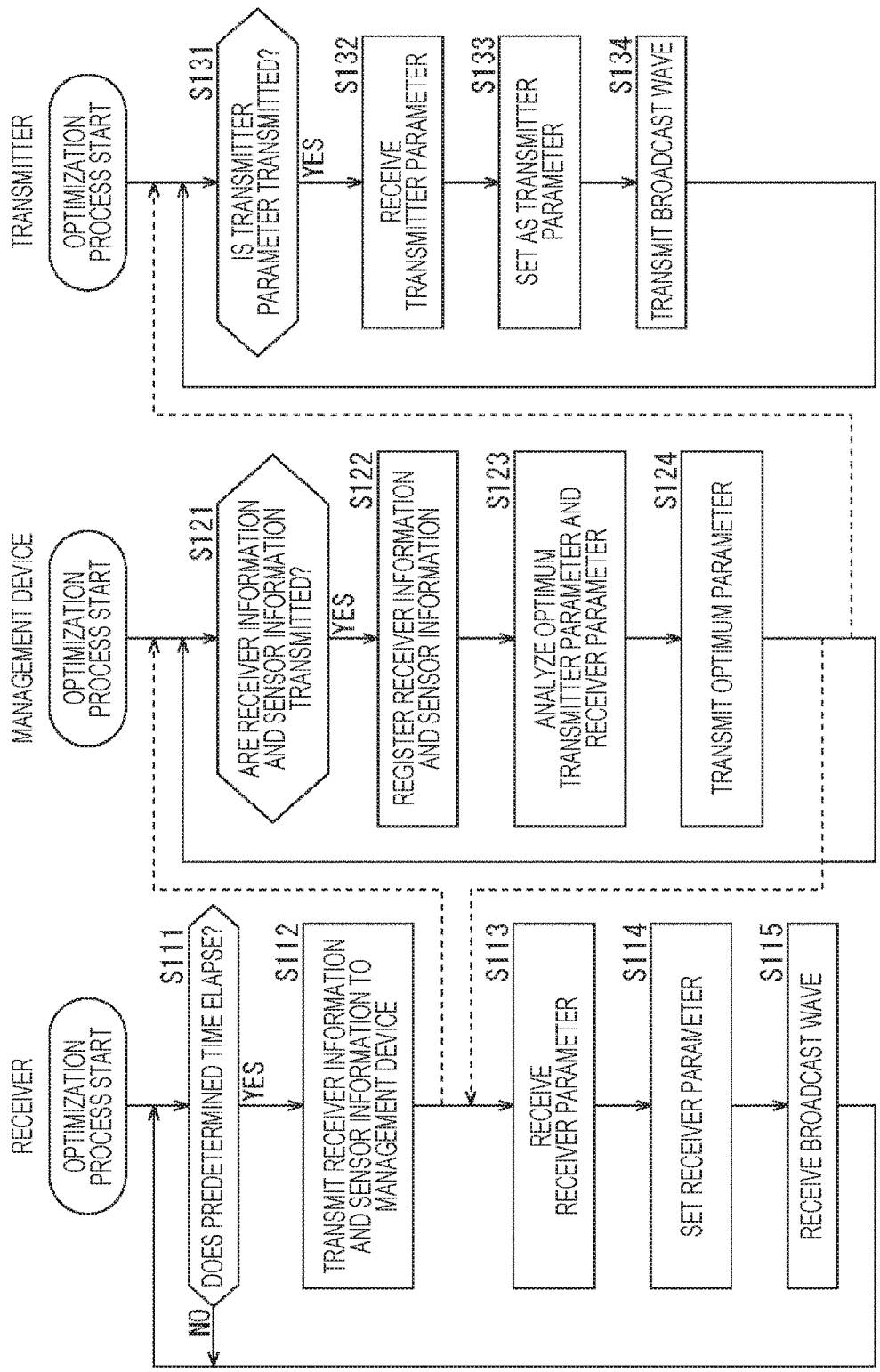
FIG. 39 is a flowchart illustrating the optimization process of a transmission/reception process by the receiver of FIG. 30 and the management device and transmitter of FIG. 1.

Herein, an optimization process of optimizing a transmission wave from the transmitter 31 by cooperation of the receiver 32, the management device 33, and the transmitter 31 is described with reference to a flowchart of FIG. 39. Meanwhile, processes at steps S111, S112, S121, and S122 in the flowchart of FIG. 39 are similar to those at steps S71, S72, S81, and S82 in FIG. 31, so that description thereof is omitted. That is, the receiver information and sensor information are repeatedly transmitted from the receiver 32 to the management device 33 at predetermined time intervals, to be accumulated in an accumulation unit 91.

At step S123, a transmitter parameter analysis unit 97 analyzes the transmitter parameter by analyzing the receiver information and the sensor information from a plurality of receivers 32, and sets an optimum transmitter parameter with which the number of viewers becomes the maximum, and allows a parameter storage unit 93 to store the same. Similarly, a receiver parameter analysis unit 92 analyzes a receiver parameter by analyzing the receiver information and the sensor information from a plurality of receivers 32, and sets an optimum receiver parameter with which the number of viewers becomes the maximum, and allows the parameter storage unit 93 to store the same.

At step S124, the transmitter parameter analysis unit 97 controls a communication unit 95 to transmit the transmitter parameter stored in the parameter storage unit 93 to the transmitter 31. Similarly, the receiver parameter analysis unit 92 controls the communication unit 95 to transmit the receiver parameter stored in the parameter storage unit 93 to the receiver 32.

At step S131, a control unit 52 of the transmitter 31 controls a communication unit 53 to determine whether the transmitter parameter is transmitted, and repeats the similar process until this is transmitted. Then, at step S131, in a case where the transmitter parameter is transmitted, the procedure shifts to step S132.

At step S132, the control unit 52 controls the communication unit 53 to receive the transmitted transmitter parameter.

At step S133, the control unit 52 sets the received transmitter parameter in a transmission operation unit 51.

At step S134, the control unit 52 controls the transmission operation unit 51 set by the transmitter parameter to transmit the broadcast wave.

At step S113, a control unit 72 controls a communication unit 75 to receive the transmitted receiver parameter.

At step S114, the control unit 72 sets the received receiver parameter in a reception operation unit 71.

At step S115, the control unit 72 controls the reception operation unit 71 set by the receiver parameter to receive the broadcast wave.

By setting the optimum parameter for the receiver 32 in the transmission operation unit 51 of the transmitter 31 by the above-described process, the broadcast wave is transmitted in an optimum state. Also, by setting the optimum parameter for the receiver 32 in the reception operation unit 71 of the receiver 32, the broadcast wave is received in the optimum state. Since both the transmitter 31 and the receiver 32 or at least one of them is set to the optimum state, as a result, a reception state of a plurality of receivers 32 may be improved.

<Example of Setting Mod and Cod by Transmitter Parameter>

Figure 40:
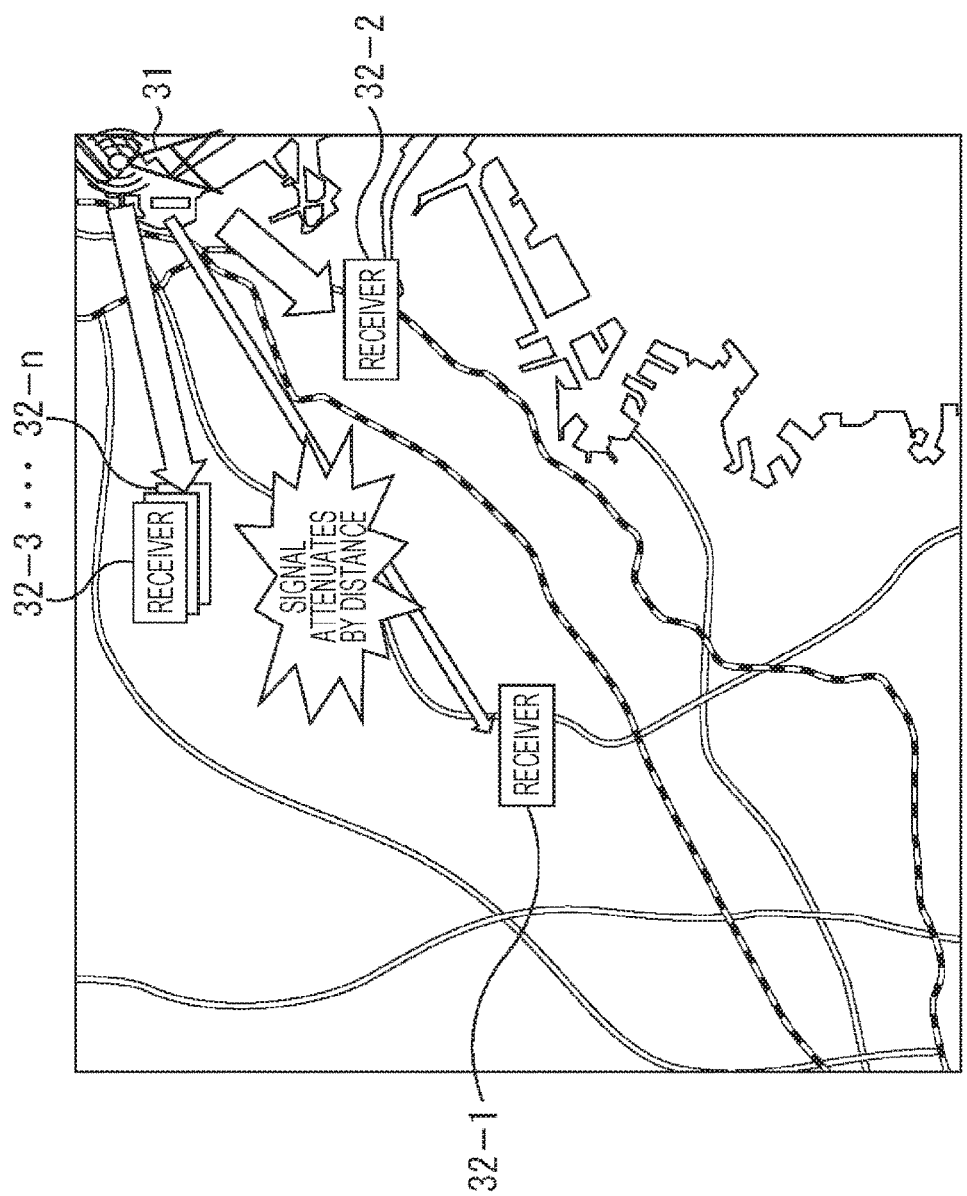
FIG. 40 is a view illustrating setting of a demodulation system and an error code rate in the optimization process of FIG. 39.

For example, as illustrated in FIG. 40, the receiver information and the sensor information of receivers 32-1 to 32-$n$ to the transmitter 31 are sequentially accumulated at predetermined time intervals. That is, in a case of FIG. 40, the receiver 32-2 is relatively close to the transmitter 31 and is in an excellent reception state, but since the receiver 32-1 is separated from the transmitter 31, the reception state lowers due to attenuation accompanying with propagation. Also, each of the receivers 32-3 to 32-$n$ is in a relatively excellent reception state equivalent to the receiver 32-2.

At step S123, for example, in a case where the transmitter parameter is for setting a modulation system. (Modulation: Mod) (hereinafter also simply referred to as Mod) and an error correction code rate (Code Rate: Cod) (hereinafter also simply referred to as Cod), an SNR (dB) with which communication without an error is possible combination of Mod and Cod based on accumulated receiver information and sensor information is illustrated in FIG. 41.

That is, in FIG. 41, this is 7 dB when the combination of Mod and Cod (Mod, Cod) is (16 QAM, 1/2), 10 dB when this is (16 QAM, 2/3), 11 dB when this is (16 QAM, 3/4), 12 dB when (Mod, Cod) is (64 QAM, 1/2) 15 dB when this is (64 QAM, 2/3), and 16 dB when this is (64 QAM, 3/4).

Herein, assuming that the conditions of the receivers 32-1 and 32-3 to 32-$n$ are almost the same, and in a case where Mod and Cod are set by comparing the SNRs of the receivers 32-1 and 32-2, when the SNR in the receiver 32-1 is 13 dB from the receiver information, and the SNR in the receiver 32-2 is 17 dB from the receiver information, the transmitter parameter analysis unit 97 sets (Mod, Cod) to (64 QAM, 1/2) the SNR of which is 12 dB with which both the receivers 32-1 and 32-2 may receive.

By such a process, in the area where the SNR is low, the transmitter parameter with a small information amount but is strong against noise is set, and the broadcast wave is transmitted from the transmitter 31. As a result, it becomes possible to improve the reception state in a plurality of receivers 32.

<Example of Setting FFT Size and Guard Interval (GI) by Transmitter Parameter>

Figure 42:
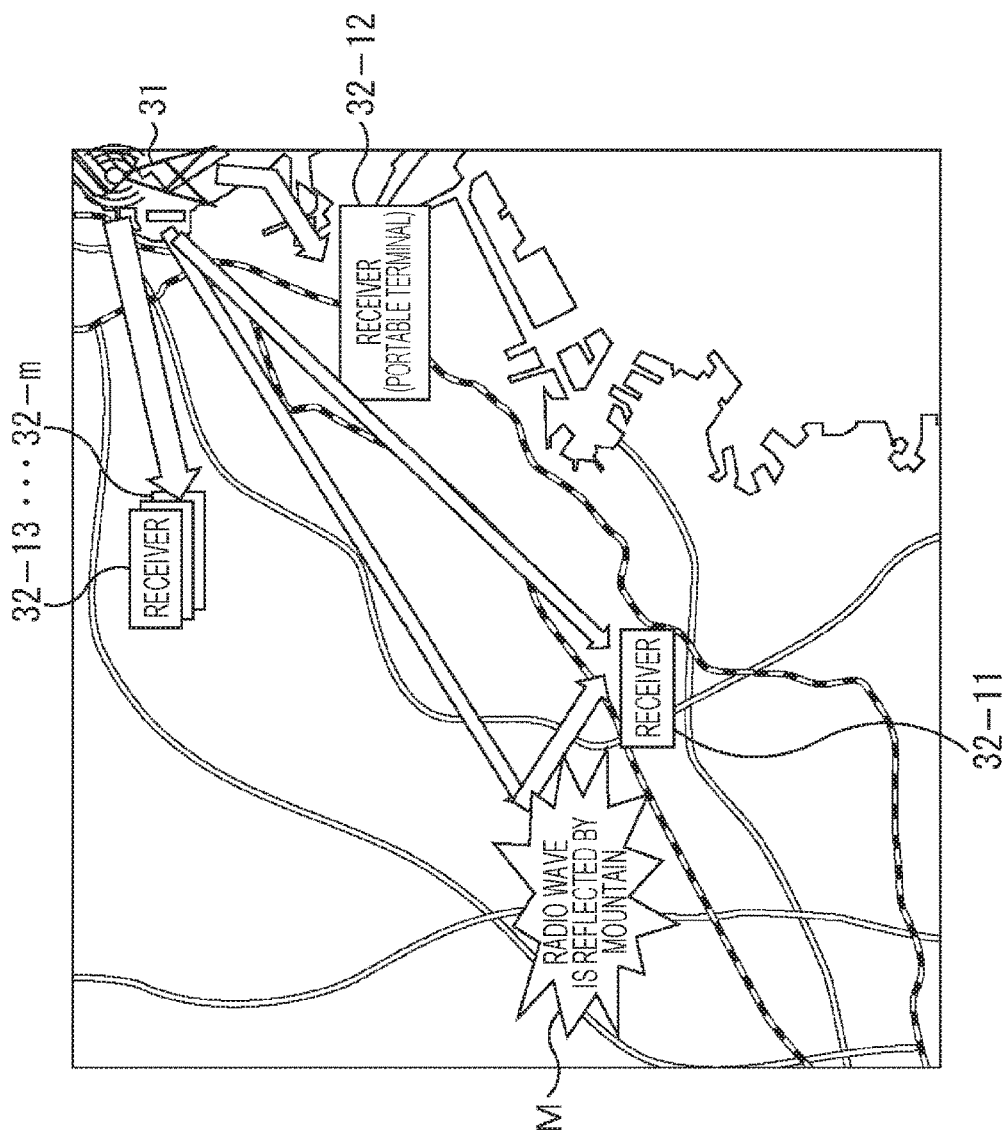
FIG. 42 is a view illustrating setting of a FIT size and a guard interval in the optimization process of FIG. 39.

For example, as illustrated in FIG. 42, the receiver information and sensor information of the receivers 32-11 to 32-$m$ to the transmitter 31 are sequentially accumulated at predetermined time intervals. That is, in a case of FIG. 42, the receiver 32-12 is relatively close to the transmitter 31 and is in an excellent reception state, but the receiver 32-11 is separated from the transmitter 31, and furthermore, this is affected by multipath by reflection from a mountain M. Also, each of the receivers 32-13 to 32-$m$ is in a relatively excellent reception state equivalent to the receiver 32-12.

Herein, at step S123, for example, in a case where the transmitter parameter is for setting a FFT size and a guard interval (GI), maximum disturbance wave estimated time in the combination of the FFT size and the GI calculated in consideration of the multipath and the like according to an estimated delay profile on the basis of the receiver information and the sensor information is illustrated in FIG. 43 on the basis of the receiver information from the receivers 32-11 to 32-*m* of FIG. 42.

That is, in FIG. 43, this is 7 usec when the combination of the GI size and the FFT size (GI, FFD) is (1/32, 2k), 28 usec when this is (1/8, 2k), 56 usec when this is (1/4, 2k), 56 usec when this is (1/32, 8k), 112 msec when this is (1/8, 8k), and 224 usec when this is (1/4, 8k).

Herein, assuming that the conditions of the receivers 32-11 and 32-13 to 32-*m* are almost the same, and in a case where the GI size and the FFT size are set by comparing the disturbance estimated delay waves of the receivers 32-11 and 32-12, when the disturbance estimated delay wave in the receiver 32-11 is 100 usec from the receiver information, and the disturbance estimated delay wave in the receiver 32-12 is 50 usec from the receiver information by the calculation taking the multipath in FIG. 42 into consideration, the transmitter parameter analysis unit 97 sets (GI, FFT) to (1/8, 8k) with which both the receivers 32-11 and 32-12 may receive. Meanwhile, although not illustrated, there is directly reaching one.

By such a process, the transmitter parameter is set on the basis of the signal quality considering the multipath, and the broadcast wave is transmitted from the transmitter 31. As a result, it becomes possible to improve the reception state in a plurality of receivers 32.

<Example of Setting Antenna of Transmitter and Receiver by Transmitter Parameter and Receiver Parameter>

Also, at step S123, for example, in a case where the transmitter parameter is for setting any one of antennas 31*a*-1 and 31*a*-2 (FIG. 8) of the transmitter 31 and the receiver parameter is for setting any one of antennas 100-1 and 100-2 (FIG. 8) of the receiver 32, gains in respective combinations calculated in consideration of the multipath and the like according to the estimated delay profile on the basis of the receiver information and the sensor information are illustrated in FIG. 44.

That is, in FIG. 44, magnitude of the gains for each transmission path between the antennas based on the receiver information is illustrated. When the gain in the combination of the antenna of the transmitter 31 and the antenna of the receiver 32 (transmission antenna, reception antenna) in FIG. 44 is large when (antenna 31*a*-1, 100-1), medium when (antenna 31*a*-1, 100-2), medium when (antenna 31*a*-2, 100-1), and small when (antenna 31*a*-2, 100-2).

Herein, in a case of setting the combination (transmission antenna, reception antenna) of the antenna of the transmitter 31 and the antenna of the receiver 32, as illustrated in FIG. 44, it is set in the transmitter 31 that power of the antenna 31*a*-1 is increased to increase a transmission output, and reception power in the antenna 100-1 of the receiver 32 is increased to increase reception sensitivity.

By such a process, the transmitter parameter and the receiver parameter are set on the basis of the signal quality taking the multipath into consideration, and the broadcast wave is transmitted from the transmitter 31 to be received by the receiver 32. As a result, it becomes possible to improve the reception state in a plurality of receivers 32.

<Example of Setting MISO Code Rate by Receiver Parameter>

Furthermore, at step S123, for example, in a case where the transmitter parameter is for setting a MISO code rate of the receiver 32, a MISO code rate with which each receiver may receive is illustrated in FIG. 45.

That is, in FIG. 45, for example, the MISO code rates with which the two receivers 32-51 and 32-52 may receive are illustrated. Herein, the receiver 32-51 may receive with any of the MISO code rates of 1/2, 2/3, and 3/4, and the receiver 32-51 may receive only with the MISO code rates of 1/2 and 2/3.

Herein, in a case of setting the MISO code rate when transmitting by the transmitter 31 as the transmitter parameter, according to the condition in FIG. 45, in the transmitter 31, 2/3 with which both the receivers 32-51 and 32-52 may receive with the highest MISO code rate is set.

By such a process, the parameter with which a plurality of receivers 32 may receive and the highest MISO code rate is set, the broadcast wave is transmitted from the transmitter 31, the code rate of the antenna is optimized, and is received by the receiver 32. As a result, it becomes possible to improve the reception state in a plurality of receivers 32.

Meanwhile, in the above description, the example in which the management device 33 obtains the receiver parameter and the transmitter parameter on the basis of the receiver information and the sensor information and transmits the same to each of them is described. However, as in the case of cooperation of the management device 33 and the receiver 32, if there are receiver information, sensor information, and the like registered as a past case or a similar case, the receiver parameter and the transmitter parameter of the past case or the similar case may also be used. Also, in a case where the reception state cannot be improved with the receiver parameter and the transmitter parameter obtained by the receiver parameter analysis unit 92 and the transmitter parameter analysis unit 97 in the management device 33, it is possible to supply the receiver information and the sensor information as the condition to the developer PC and requests the development, and the receiver parameter and the transmitter parameter developed in this manner may be transmitted to the receiver 32 and the transmitter 31 to be used.

In addition, in the above description, the three types of examples of the process of improving the reception performance by the receiver 32 alone, the process of improving the reception performance of the receiver 32 by the cooperation of the receiver 32 and the management device 33, and the process of improving the reception performance of the receiver 32 by the cooperation of the transmitter 31, the receiver 32, and the management device 33 are described. However, since all of them are the processes capable of independently improving the reception performance of the receiver 32, it becomes possible to further improve the reception performance in the receiver 32 by combining all the processes or some of them.

<Example of Execution by Software>

The series of processes described above may be executed by hardware or by software. In a case where the series of processes is executed by the software, a program which forms the software is installed from a recording medium on a computer built in dedicated hardware or a general-purpose personal computer, for example, capable of executing various functions with various programs installed.

Figure 46:
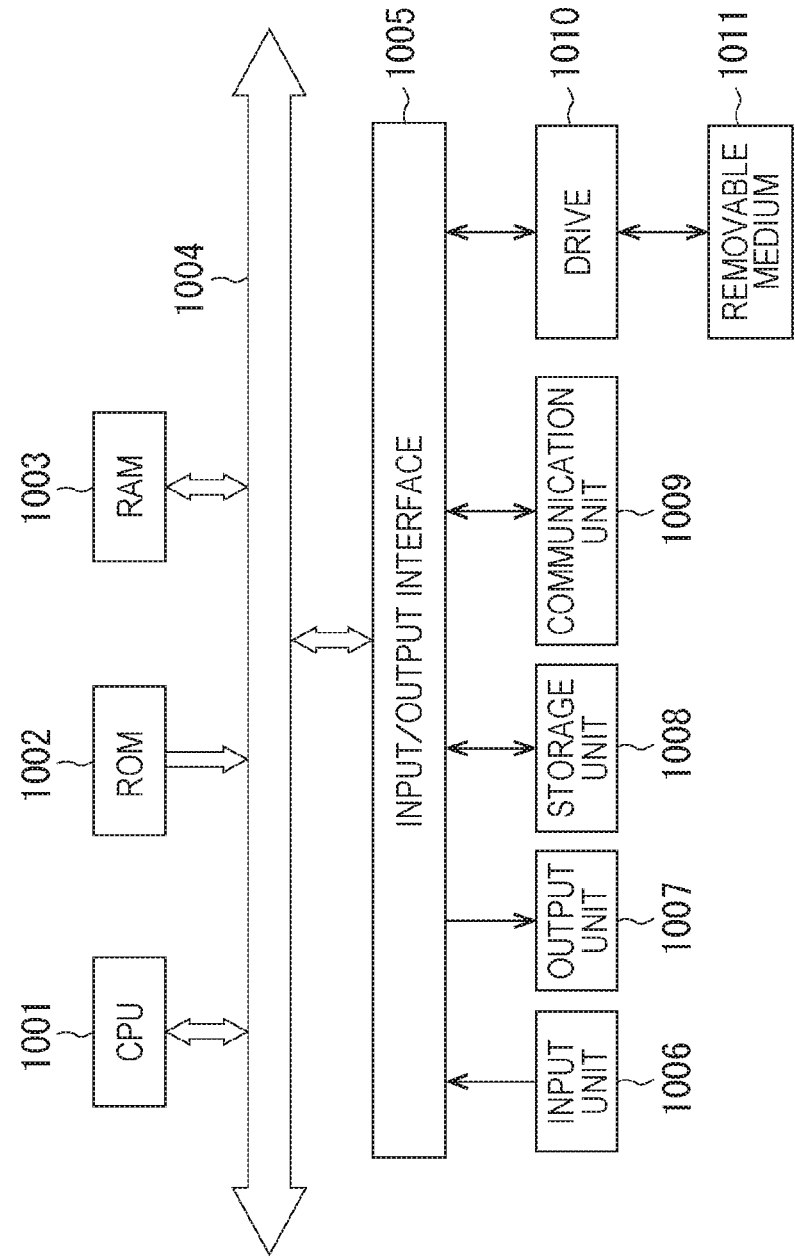
FIG. 46 is a view illustrating a configuration example of a general-purpose personal computer.

FIG. 46 illustrates a configuration example of the general-purpose personal computer. The personal computer includes a central processing unit (CPU) 1001 built-in. An input/output interface 1005 is connected to the CPU 1001 through a bus 1004. A read only memory (ROM) 1002 and a random access memory (RAM) 1003 are connected to the bus 1004.

An input unit 1006 including an input device such as a keyboard and a mouse with which a user inputs an operation command, an output unit 1007 which outputs a processing operation screen and an image of a processing result to a display device, a storage unit 1008 including a hard disk drive and the like which stores the program and various data, and a communication unit 1009 including a local area network (LAN) adopter and the like which executes a communication process through a network represented by the Internet are connected to the input/output interface 1005. Also, a drive 1010 which reads/writes data from/to a removable medium 1011 such as a magnetic disk (including a flexible disk), an optical disk (including a compact disc-read only memory (CD-ROM) and a digital versatile disc (DVD)), a magneto-optical disk (including a Mini Disc (MD)), or a semiconductor memory is connected.

The CPU 1001 executes various processes according to the program stored in the ROM 1002 or the program read from the removable medium 1011 such as the magnetic disk, the optical disk, the magneto-optical disk, or the semiconductor memory to be installed on the storage unit 1008 and loaded from the storage unit 1008 on the RAM 1003. Data required for the CPU 1001 to execute the various processes, and the like also are appropriately stored in the RAM 1003.

In the computer configured in the above-described manner, the CPU 1001 loads the program stored in the storage unit 1008, for example, on the RAM 1003 through the input/output interface 1005 and the bus 1004 to execute, and according to this, the series of processes described above is performed.

The program executed by the computer (CPU 1001) may be recorded in the removable medium 1011 as a package medium and the like to be provided, for example. Also, the program may be provided by means of a wired or wireless transmission medium such as a local region network, the Internet, and digital broadcasting.

In the computer, the program may be installed on the storage unit 1008 through the input/output interface 1005 by mounting the removable medium 1011 on the drive 1010. Also, the program may be received by the communication unit 1009 by means of the wired or wireless transmission medium to be installed on the storage unit 1008. In addition, the program may be installed in advance on the ROM 1002 and the storage unit 1008.

Meanwhile, the program executed by the computer may be the program of which processes are performed in chronological order in the order described in this specification or may be the program of which processes are performed in parallel or at required timing such as when a call is issued.

Also, in this specification, a system is intended to mean assembly of a plurality of components (devices, modules (parts) and the like) and it does not matter whether all the components are in the same casing. Therefore, a plurality of devices stored in different casings connected through the network and one device obtained by storing a plurality of modules in one casing are the systems.

Meanwhile, the embodiments of the present technology are not limited to the above-described embodiments and various modifications may be made without departing from the scope of the present technology.

For example, the present technology may be configured as cloud computing in which a function is shared by a plurality of devices through the network to process together.

Also, each step described in the above-described flowchart may be executed by one device or executed by a plurality of devices in a shared manner.

Furthermore, in a case where a plurality of processes is included in one step, a plurality of processes included in one step may be executed by one device or by a plurality of devices in a shared manner.

Meanwhile, the present, technology may also have a following configuration.

<1> A reception device provided with:
a sensor unit that detects a state inside and outside the device; and
a reception unit that receives a transmission wave transmitted from a transmitter as a reception wave,
in which the reception unit switches operation on the basis of sensor information detected by the sensor unit.

<2> The reception device according to <1>, further provided with:
a storage unit that stores map information, in which the sensor unit
detects a position, orientation, and altitude as the sensor information, and
the reception unit includes
a waveform estimation unit that estimates a delay wave by multipath on the basis of the reception wave, the map information, and the information of the position, the orientation, and the altitude,
a filter that generates a replica of the delay wave by a sum of products of a coefficient for each delay wave and a signal of a reception wave according to delay time on the basis of the delay wave by the multipath estimated by the waveform estimation unit, and
a delay wave removal unit that subtracts the replica of the delay wave generated by the filter from the signal of the reception wave.

<3> The reception device according to <2>,
in which the waveform estimation unit estimates a transmission path of the multipath on the basis of the reception wave, the map information, and the information of the position, the orientation, and the altitude, and estimates the delay wave corresponding to the transmission path of the estimated multipath.

<4> The reception device according to <2>,
in which, in a case where it is estimated that the multipath is scarcely present by the waveform estimation unit, the filter stops operation regarding a part of coefficients among the coefficients for respective delay waves.

<5> The reception device according to any one of <1> to <4>, further provided with:
a gain control unit that adjusts a gain of the received signal to be constant,
in which the sensor unit
detects acceleration as the sensor information, and
the reception unit calculates a speed on the basis of the acceleration and controls a response speed of the gain control unit on the basis of information of information of the calculated speed.

<6> The reception device according to <5>,
in which, in a case where the speed is higher than a predetermined value and it is regarded that the reception unit is provided on a moving body, the reception unit makes the response speed high to control the gain control unit, and
in a case where the speed is lower than a predetermined value and it is regarded that the reception unit is provided on a fixed body, the reception unit makes the response speed low to control the gain control unit.

<7> The reception device according to any one of <1> to <6>,
in which the sensor unit
detects temperature as sensor information, the reception unit further includes a resample unit that resamples the signal of the reception wave digitalized by a predetermined clock signal by crystal oscillation at a predetermined frequency, and an error detection unit that detects an error between the signal resampled by the resample unit and the predetermined sampling frequency, and the reception unit corrects the error of the sampling frequency on the basis of the temperature.

<8> The reception device according to <7>, in which, in the signal of the reception wave, a received signal to be received and a non-received signal which is not required to be received are alternately arranged in time series, and the reception unit corrects the error of the sampling frequency by adding difference in frequency error in the crystal oscillation corresponding to each of first difference between temperature at a timing at which reception of the received signal immediately preceding ends and reference temperature in the crystal oscillation and second difference between temperature at a timing at which reception of a next received signal starts and the reference temperature to the sampling frequency error at the timing at which the reception of the immediately preceding received signal ends.

<9> The reception device according to <8>, further provided with:

a table that stores a frequency error of the crystal corresponding to the difference between the temperature and the reference temperature.

<10> The reception device according to <7>, in which the reception unit corrects the error of the sampling frequency by adding the sampling frequency error corresponding to difference between temperature at a timing at which the received signal is received and reference temperature in the crystal oscillation to the sampling frequency error at the timing at which the received signal is received.

<11> The reception device according to <10>, further provided with:

a table that stores the sampling frequency error corresponding to the difference between the temperature and the reference temperature.

<12> A receiving method, in which a sensor unit detects a state inside and outside a device, a reception unit includes a step of receiving a transmission wave transmitted from a transmitter as a reception wave, and a process of the step of receiving switches operation on the basis of sensor information detected by the sensor unit.

<13> A program that allows a computer to serve as:

a sensor unit that detects a situation inside and outside a device; and a reception unit that receives a transmission wave transmitted from a transmitter as a reception wave, in which the reception unit switches operation on the basis of sensor information detected by the sensor unit.

REFERENCE SIGNS LIST

11 Broadcasting system
31 Transmitter
31a-1, 31a-n Antenna, 31-2
32 Receiver
33 Management device
51 Transmission operation unit
52 Control unit
53 Communication unit
71 Reception operation unit
72 Control unit
73 Sensor unit
74 Storage device
75 Communication unit
100, 100-1, 100-2 Antenna
101 Tuner
102 ADC
103 Orthogonal demodulation unit
104 FFT unit
105 Equalization unit
106 Error correction unit
107 Payload extraction unit
121 Calculation unit
122 Waveform estimation unit
123 Tap coefficient update unit
124 Adaptive equalization filter
125 Subtraction unit
131 Position sensor
132 Orientation sensor
133 Acceleration sensor
134 Temperature sensor
135 VICS reception unit
136 Weather sensor
141 Control unit
151 PLL
152 Resample unit
153 Error detection unit

The invention claimed is:

1. A reception device comprising:
a storage unit that stores map information;
a sensor unit that detects a state inside and outside the device, detects a position, orientation, and altitude as the sensor information; and
a reception unit that receives a transmission wave transmitted from a transmitter as a reception wave,
wherein the reception unit includes:
a waveform estimation unit that estimates a delay wave by multipath on the basis of the reception wave, the map information, and the information of the position, the orientation, and the altitude,
a filter that generates a replica of the delay wave by a sum of products of a coefficient for each delay wave and a signal of a reception wave according to delay time on the basis of the delay wave by the multipath estimated by the waveform estimation unit, and
a delay wave removal unit that subtracts the replica of the delay wave generated by the filter from the signal of the reception wave,
wherein the reception unit switches operation on the basis of sensor information detected by the sensor unit.

2. A reception device comprising:
a sensor configured to perform a measurement that detects a physical condition pertaining to an environment around the reception device, the sensor is configured to output the measurement as sensor information; and
a controller configured to output an instruction that is based on the sensor information, the instruction controls reception circuitry in a manner that causes the reception circuitry to perform an operation,
wherein the reception circuitry is configured to receive a radio wave from a transmitter and convert the radio wave into an RF signal, the reception circuitry is configured to receive the RF signal from the reception antenna, and
wherein when the physical condition is a shielding object between the reception device and the transmitter, the operation halts processing on the RF signal and decreases power consumption by the reception circuitry.

3. The reception device according to claim 2, wherein when the physical condition is an object having a height that generates a reflection wave so that the radio wave reaches the reception device via a plurality of paths, the operation produces a main wave by subtracting the RF signal that is received later by the reception circuitry from the RF signal that is received earlier by the reception circuitry.

4. The reception device according to claim 2, wherein the reception circuitry comprises a gain control unit that is configured to adjust a gain of the RF signal to be constant.

5. The reception device according to claim 4, wherein when the physical condition is a speed at which the reception device travels, the operation controls a response speed of the gain control unit.

6. The reception device according to claim 2, wherein when the physical condition is a temperature, the operation corrects an error of a sampling frequency.

7. A reception method comprising:
  performing, by a sensor, a measurement that detects a physical condition pertaining to an environment around the reception device;
  outputting, by the sensor, the measurement as sensor information;
  outputting, by a controller, an instruction that is based on the sensor information;
  controlling, by the instruction from the controller, reception circuitry in a manner that causes the reception circuitry to perform an operation; and
  converting, by a reception antenna, a radio wave into an RF signal when the reception antenna receives the radio wave from a transmitter,
  wherein when the physical condition is a shielding object between the reception device and the transmitter, the operation halts processing on the radio wave and decreases power consumption by the reception circuitry.

8. The reception method according to claim 7, wherein when the physical condition is an object having a height that generates a reflection wave so that the radio wave reaches the reception device via a plurality of paths, the operation produces a main wave by subtracting the radio wave that is received later by the reception circuitry from the radio wave that is received earlier by the reception circuitry.

9. The reception method according to claim 7, further comprising:
  outputting an RF signal from the reception antenna to the reception circuitry.

10. The reception method according to claim 9, further comprising:
  adjusting, by a gain control unit in the reception circuitry, a gain of the RF signal to be constant.

11. The reception method according to claim 10, wherein when the physical condition is a speed at which the reception device travels, the operation controls a response speed of the gain control unit.

12. The reception method according to claim 7, wherein when the physical condition is a temperature, the operation corrects an error of a sampling frequency.

13. A computer program product embodied on a non-transitory computer-readable data storage device, the computer program product comprising:
  computer code for causing a controller to receive sensor information from a sensor, the sensor performs a measurement that detects a physical condition pertaining to an environment around the reception device and outputs the measurement as the sensor information; and
  computer code for causing the controller to output an instruction that is based on the sensor information, the instruction controls reception circuitry in a manner that causes the reception circuitry to perform an operation,
  wherein a reception antenna receives a radio wave from a transmitter and converts the radio wave into an RF signal, the reception circuitry receives the RF signal from the reception antenna, and
  wherein when the physical condition is a shielding object between the reception device and the transmitter, the operation halts processing on the RF signal and decreases power consumption by the reception circuitry.

14. The computer program product according to claim 13, wherein when the physical condition is an object having a height that generates a reflection wave so that the radio wave reaches the reception device via a plurality of paths, the operation produces a main wave by subtracting the RF signal that is received later by the reception circuitry from the RF signal that is received earlier by the reception circuitry.

15. The computer program product according to claim 13, wherein a gain control unit in the reception circuitry adjusts a gain of the RF signal to be constant.

16. The computer program product according to claim 15, wherein when the physical condition is a speed at which the reception device travels, the operation controls a response speed of the gain control unit.

17. The computer program product according to claim 13, wherein when the physical condition is a temperature, the operation corrects an error of a sampling frequency.

* * * * *